US012662499B2

(12) United States Patent
Van Meurs et al.

(10) Patent No.: US 12,662,499 B2
(45) Date of Patent: Jun. 23, 2026

(54) PHOSPHORUS COMPOUNDS AND METHODS THEREOF

(71) Applicant: Agency for Science, Technology and Research, Connexis North Tower (SG)

(72) Inventors: Martin Van Meurs, Jurong Island (SG); James David Nobbs, Jurong Island (SG); Sigit Sugiarto, Jurong Island (SG)

(73) Assignee: Agency For Science, Technology And Research, Singapore (SG)

( * ) Notice: Subject to any disclaimer, the term of this patent is extended or adjusted under 35 U.S.C. 154(b) by 414 days.

(21) Appl. No.: 18/267,416

(22) PCT Filed: Dec. 14, 2021

(86) PCT No.: PCT/SG2021/050788
§ 371 (c)(1),
(2) Date: Jun. 14, 2023

(87) PCT Pub. No.: WO2022/132048
PCT Pub. Date: Jun. 23, 2022

(65) Prior Publication Data
US 2024/0083926 A1 Mar. 14, 2024

(30) Foreign Application Priority Data
Dec. 15, 2020 (SG) ........................... 10202012539U

(51) Int. Cl.
*C07F 9/6568* (2006.01)
*C07F 15/00* (2006.01)

(52) U.S. Cl.
CPC ........ *C07F 9/65683* (2013.01); *C07F 9/6568* (2013.01); *C07F 9/65685* (2013.01); *C07F 15/0033* (2013.01); *C07F 15/0046* (2013.01); *C07F 15/0066* (2013.01); *C07F 15/0073* (2013.01)

(58) Field of Classification Search
CPC ........................... C07F 9/65683; C07F 9/6568
See application file for complete search history.

(56) References Cited

U.S. PATENT DOCUMENTS

| | | | |
|---|---|---|---|
| 4,642,382 | A | 2/1987 | Spivack et al. |
| 2004/0059157 | A1 | 3/2004 | Slany et al. |
| 2012/0330016 | A1 | 12/2012 | Eastham et al. |
| 2013/0217876 | A1 | 8/2013 | Shekhar et al. |

FOREIGN PATENT DOCUMENTS

| | | | |
|---|---|---|---|
| WO | 2009010782 | A1 | 1/2009 |
| WO | 2013093472 | A1 | 6/2013 |
| WO | 2017135897 | A1 | 8/2017 |

OTHER PUBLICATIONS

Laffoon, J.D. et al. (Oct. 29, 2019). "Pd-Catalyzed Cross-Coupling Reactions Promoted by Biaryl Phosphorinane Ligands," ACS Catalysis 9:11691-11708.
Ortial, S. et al. (Jun. 4, 2013). "Hydrophosphinylation of Unactivated Terminal Alkenes Catalyzed by Nickel Chloride," The Journal of Organic Chemistry 78:6599-6608.
Tatarinov, D.A. et al. (2018). "Reactions of Unsaturated Ketones with Bis(trimethylsilyl) Hypophosphite," Russian Journal of General Chemistry 88(1):90-95.

*Primary Examiner* — Adam C Milligan
*Assistant Examiner* — Karen Cheng
(74) *Attorney, Agent, or Firm* — MORRISON & FOERSTER LLP

(57) ABSTRACT

The disclosure concerns phosphorus compounds of formula (I), (II) and (III) and methods of synthesising these compounds. The phosphorus compound can be a cyclic phosphorus compound. The method comprises reacting a compound having two Michael acceptor groups with a hypophosphite ester, acid, salt or solvate thereof and an optional organosilicon compound. The diene can be a cyclodiene.

(I)

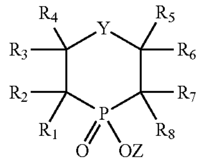

(II)

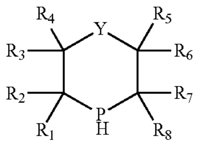

(III)

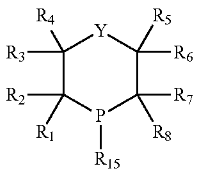

17 Claims, No Drawings

PHOSPHORUS COMPOUNDS AND METHODS THEREOF

CROSS REFERENCE TO RELATED APPLICATIONS

This application is a national stage application under 35 U.S.C. § 371 of International Application No. PCT/SG2021/050788, filed internationally on Dec. 14, 2021, which claims priority to Singapore Patent Application No. 10202012539U, filed Dec. 15, 2020, each of which is hereby incorporated by reference in its entirety.

TECHNICAL FIELD

The present invention relates, in general terms, to phosphorus compounds and methods of synthesising these compounds.

BACKGROUND

Tetramethylpiperidine has been known for over a century, yet surprisingly its phosphine analogues (for example, 2,2,6,6-tetramethylphosphinane; TMP) are not as commonly used. Further, while some of the phosphorus compounds such as TMP are known, there is no known synthesis. The amine version (2,2,6,6-tetramethylpiperidine) has widespread application as a base, and nitrogen heterocycle in organic chemistry. Closely related to TMP is di-tert-butylphosphine, a specialty phosphine synthon equivalent, again having widespread application in organic chemistry as well as several commercial phosphine ligands, including: JohnPhos (cross-coupling chemistry) as well as DTBPX (Mitsubishi-Lucite Alpha Process).

The synthesis of organophosphorus compounds often requires the use of highly reactive (toxic) precursors such as phosphine gas ($PH_3$) or phosphorus trichloride ($PCl_3$). For example, di-tert-butylphosphine can be obtained from the reduction of di-tert-butylchlorophosphine which is itself obtained from phosphorus trichloride and the corresponding Grignard reagent.

Di-tert-butylchlorophosphine and phosphorus trichloride are a skin irritant and toxic when inhaled. As such, given the hazardous nature of phosphorus precursors and the need to enforce health and safety measures on an industrial level, a pragmatic approach taken is often to use a non-phosphine alternative which is generally safer to handle.

Current methodology for introducing a TMP synthon in a molecule involves incorporating the phosphorus early as R-$PH_2$ which is then subsequently condensed with phorone. This results in a low yield and potentially high impurity content.

Further, current methods for synthesising phosphorus compounds are lengthy (many reaction steps) and are also not suitable for synthesising bulky phosphorus heterocycles; i.e. low yields are reported.

It is desirable to develop synthetic routes from more benign air stable phosphorus precursors.

It would be desirable to overcome or ameliorate at least one of the above-described problems.

SUMMARY

The present invention is predicated on the understanding that there are a number of primary phosphine surrogates that can be generated in situ from less reactive, air-stable precursors. One example is bis(trimethylsilyl) phosphonite which can be derived from derivatives of commercially available and relatively benign hypophosphorous acid or its salts.

The present invention provides a method of synthesising a phosphorus compound of Formula (I), a salt, solvate or isomer thereof:

(I)

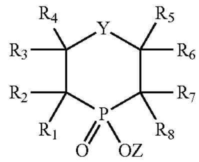

wherein Y is selected from an optionally substituted $C_{1-10}$ alkylene, optionally substituted alkenylene, optionally substituted silylene, optionally substituted aminoylene, acylene, thioacylene, sulfinylene, sulfonylene, —P(O)(OZ)— or —$P^+(R_9R_{10})$—;

Z is selected from H, optionally substituted alkyl or a metal cation;

$R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_8$ can be linked to form an optionally substituted cycloalkyl; $R_3$, $R_4$, $R_5$, and $R_6$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_9$ and $R_{10}$ are independently selected from H, optionally substituted alkyl, optionally substituted cycloalkyl, optionally substituted heterocycloyl, optionally substituted aryl, optionally substituted heteroaryl; the method comprising:

a) reacting a compound of Formula (A) with a hypophosphite ester, acid, salt or solvate thereof and an optional organosilicon compound, the compound of Formula (A) is (A)

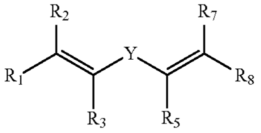

wherein Y is selected from an optionally substituted $C_{1-10}$ alkylene, optionally substituted $C_{1-10}$ alkenylene, optionally substituted silylene, optionally substituted amino, acylene, thioacylene, sulfinylene, sulfonylene, —P(O)(OZ)— or —$P^+(R_{13}R_{14})$—;

wherein $R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_8$ can be linked to form an optionally substituted cyclo moiety; $R_3$ and $R_5$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl.

In some embodiments, the hypophosphite ester, acid, salt or solvate thereof is selected from hypophosphorous acid ($H_3PO_2$), ammonium hypophosphite ($NH_4H_2PO_2$) and sodium hypophosphite ($NaPO_2H_2$), potassium hypophosphite, calcium bis(hypophosphite), copper hypophosphite, nickel(II) bis(hypophosphite), magnesium hypophosphite, anilinium hypophosphite, methyl hypophosphite, ethyl hypophosphite, or a combination thereof.

In some embodiments, the organosilicon compound is selected from bis(trimethylsilyl)amine (HMDS), N,N-Bis (trimethylsilyl)methylamine, bis(dimethylamino)dimethylsilane, N,O-bis(trimethylsilyl)acetamide (BSA), N,O-bis (trimethylsilyl)trifluoroacetamide (BSTFA), N,N-dimethyltrimethylsilylamine, hexamethyldisiloxane, N,N-diethyltrimethylsilylamine 1-(trimethylsilyl)pyrrolidine trimethylsilyl chloride (TMSCI), trimethylsilyl bromide (TMSBr), chlorotriethylsilane, and a combination thereof.

Further advantageously, these phosphorus compounds, and in particular ammonium hypophosphite, are stable in air.

In some embodiments, a molar ratio of hypophosphite ester, acid, salt or solvate thereof to the organosilicon compound is about 1:10 to about 1:1.

In some embodiments, the step of reacting a compound of Formula (A) with the hypophosphite ester, acid, salt or solvate thereof and the organosilicon compound further comprises a base.

In some embodiments, the base is selected from triethylamine, diethylamine, Hünigs base, pyrrolidine, pyridine, lutidine, piperidine 1,8-diazabicyclo[5.4.0]undec-7-ene (DBU), 1,4-diazabicyclo[2.2.2]octane (DABCO), sodium hydroxide, potassium hydroxide, ammonium hydroxide, sodium carbonate, sodium hydrogen carbonate, barium hydroxide, calcium carbonate, caesium carbonate, or a combination thereof.

In some embodiments, the step of reacting a compound of Formula (A) with the hypophosphite ester, acid, salt or solvate thereof and the organosilicon compound further comprises a solvent.

In some embodiments, the solvent is selected from tetrahydrofuran (THF), toluene, xylenes, methylene chloride, dichloroethane, tetrachloroethane, ethers, dimethylacetamide (DMA), or a combination thereof.

In some embodiments, the method further comprises a step of treating a product of step (a) with an acid.

In some embodiments, the compound of Formula (A) is reacted with the hypophosphite ester, acid, salt or solvate thereof and the organosilicon compound at a temperature of about 70° C. to about 150° C.

Further advantageously, the higher temperature promotes the ring closure reaction such that a bulky heterocyclyl compound of formula (I) can be formed.

In some embodiments, the method further comprises a step (b) after (a) of modifying the compound of formula (I) at the Y moiety.

In some embodiments, the method further comprises a step (b) after (a) of modifying the compound of formula (I) with a protecting group compound.

In some embodiments, the protecting group compound is selected from ethylene glycol, methanol, ethanol, propylene glycol, 2,2-dimethyl-1,3-propanediol (neopentylglycol), dimethyl hydrazine, 1,2-ethanedithiol and 1,3-propanedithiol.

In some embodiments, the method further comprises a step of reducing the compound of formula (I). This reduction step can take place after step (a) or after the modification step (b).

In some embodiments, the method further comprises a step reducing the phosphorus compound of Formula (I) in order to form a phosphorus compound of Formula (II):

(II)

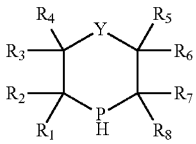

wherein $R_1$, $R_2$, $R_3$, $R_4$, $R_5$, $R_6$, $R_7$, $R_8$, $R_9$, $R_{10}$ and Y are as disclosed herein.

In some embodiments, the method further comprises of functionalising the compound of Formula (II) in order to form a phosphorus compound of Formula (III):

(III)

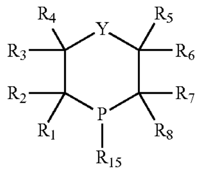

wherein $R_1$, $R_2$, $R_3$, $R_4$, $R_5$, $R_6$, $R_7$, $R_8$, $R_9$, $R_{10}$ and Y are as disclosed herein;

$R_{15}$ is selected from halo, oxo, optionally substituted amino, optionally substituted alkyl, optionally substituted alkenyl, optionally substituted cycloalkyl, optionally substituted cycloalkenyl, optionally substituted heterocyclyl, optionally substituted aryl, and optionally substituted heteroaryl.

In some embodiments, the optional substituent at $R_{15}$ comprises another compound of Formula (III).

In some embodiments, the optional substituent at $R_{15}$ is selected from:

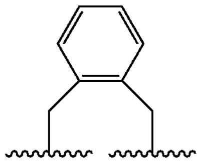

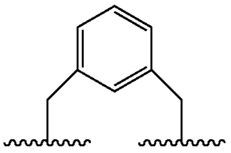

-continued

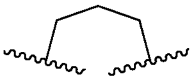

n = 1-20

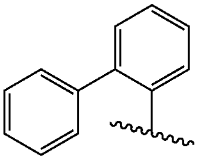
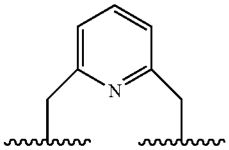
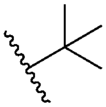
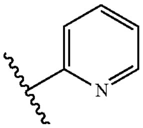
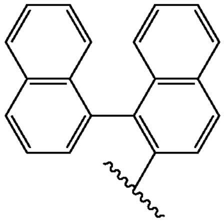
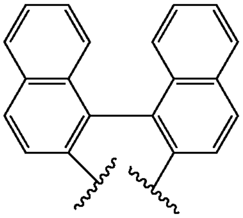
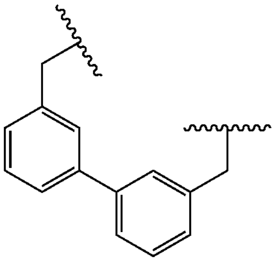
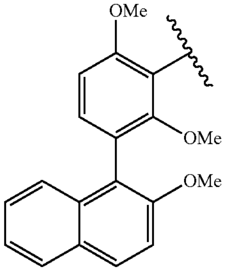
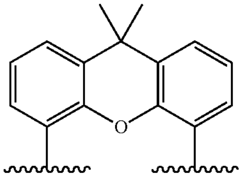
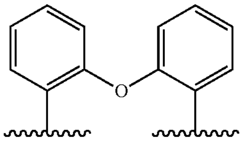
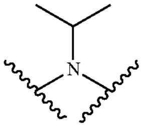
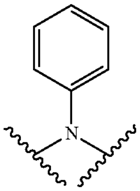
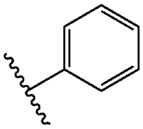
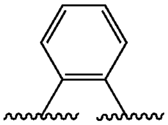
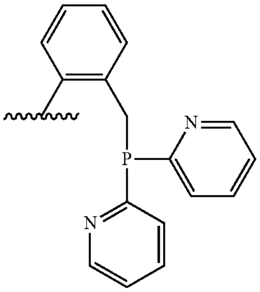
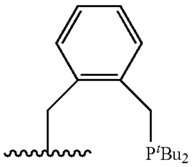
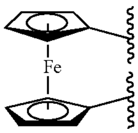

-continued

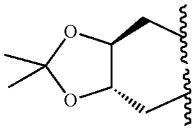
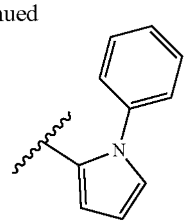
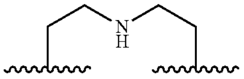
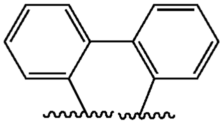
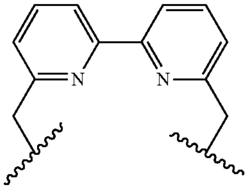
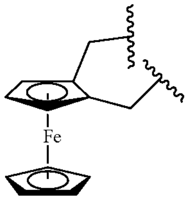
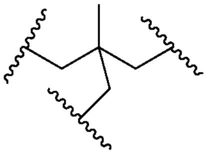
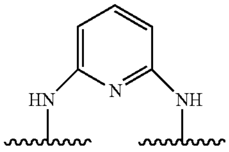

wherein ~ represents a bond to $R_{15}$ of compound of Formula (III).

The present invention also provides a phosphorus compound of Formula (I), a salt, solvate or isomer thereof:

(I)

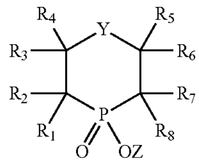

wherein Y is selected from an optionally substituted $C_{1-10}$ alkylene, optionally substituted $C_{1-10}$ alkenylene, optionally substituted silylene, optionally substituted amino, thioacylene, sulfinylene, sulfonylene, —P(O)(OZ)— or —$P^{+}(R_9R_{10})$—;

Z is selected from H, optionally substituted alkyl or a metal cation;

$R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_8$ can be linked to form an optionally substituted cycloalkyl;

$R_3$, $R_4$, $R_5$, and $R_6$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl; and $R_9$ and $R_{10}$ are independently selected from H, optionally substituted alkyl, optionally substituted cycloalkyl, optionally substituted heterocycloyl, optionally substituted aryl, optionally substituted heteroaryl.

In some embodiments, the compound of Formula (I) is selected from:

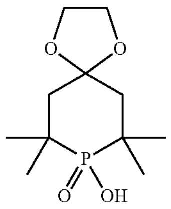
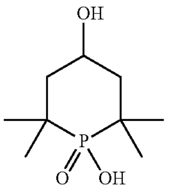
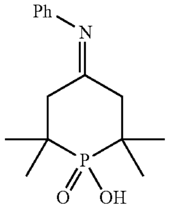
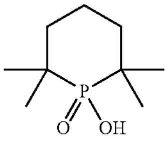
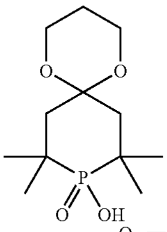
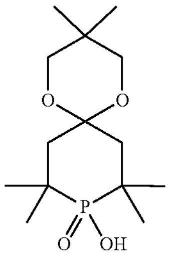
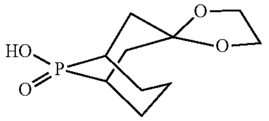
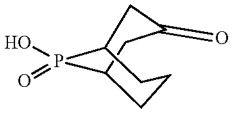
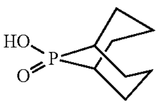
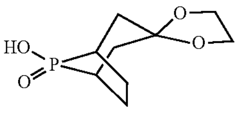
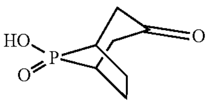
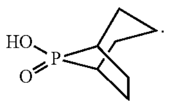

The present invention also provides a phosphorus compound of Formula (II), a salt, solvate or isomer thereof:

(II)

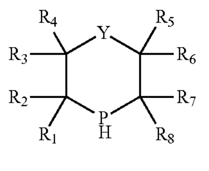

wherein Y is selected from an optionally substituted $C_{1-10}$ alkylene, optionally substituted $C_{1-10}$ alkenylene, optionally substituted silylene, optionally substituted amino, thioacylene, sulfinylene, sulfonylene, —P(O)(OZ)— or —$P^+(R_9R_{10})$—;

$R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_8$ can be linked to form an optionally substituted cycloalkyl;

$R_3$, $R_4$, $R_5$, and $R_6$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_9$ and $R_{10}$ are independently selected from H, optionally substituted alkyl, optionally substituted cycloalkyl, optionally substituted heterocycloyl, optionally substituted aryl, optionally substituted heteroaryl.

The present invention also provides a phosphorus compound of Formula (III), a salt, solvate or isomer thereof:

(III)

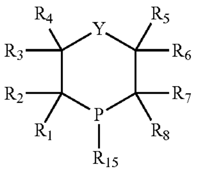

wherein Y is selected from an optionally substituted $C_{1-10}$ alkylene, optionally substituted $C_{1-10}$ alkenylene, optionally substituted silylene, optionally substituted amino, thioacylene, sulfinylene, sulfonylene, —P(O)(OZ)— or —$P^+(R_9R_{10})$—;

$R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_8$ can be linked to form an optionally substituted cycloalkyl;

$R_3$, $R_4$, $R_5$, and $R_6$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_9$ and $R_{10}$ are independently selected from H, optionally substituted alkyl, optionally substituted cycloalkyl, optionally substituted heterocycloyl, optionally substituted aryl, optionally substituted heteroaryl; and $R_{15}$ is selected from halo, oxo, optionally substituted amino, optionally substituted alkyl, optionally substituted alkenyl, optionally substituted cycloalkyl, optionally substituted cycloalkenyl, optionally substituted heterocyclyl, optionally substituted aryl, and optionally substituted heteroaryl.

DETAILED DESCRIPTION

Current methods of synthesising secondary phosphorus compounds of type (II) are rare. For example, a lithium cleavage of a P-phenyl bond had previously been proposed. However, in this example, the lithium cleavage of phenylphosphorinone is both atomically uneconomical (generating lots of waste) and unselective, due to the preference of the lithium cleavage to occur at the P-alkyl bond instead of the P-aryl bond, giving yields of only 27%.

The present invention is based on the understanding that bis(trimethylsilyl) phosphonite can react with primary alkyl halides to give alkyl substituted primary and secondary phosphinic acids. Bis(trimethylsilyl) phosphonite can also react with one equivalent of an α,β-unsaturated ketone to furnish primary phosphinic acids, or two equivalents of an α,β-unsaturated ketone to furnish secondary phosphinic acids.

The present invention utilises a group linking together two Michael acceptor groups e.g. such as dienones to react with a silylphosphonite to access phosphorus heterocycles. In particular, the consecutive reaction at two geminally substituted alkenes to give a high yield of final product. It was further found that the silylphosphonite can be generated in situ in the presence of a phosphorus precursor, such as ammonium hypophosphite, and a silyl precursor.

In addition, and advantageously, the present invention enables reaction at sterically hindered disubstituted alkenes. When compared with previous synthetic reactions, because of the additional steric hindrance of geminally di-substituted alkenes, the previous reactions are sluggish, and give products with low yields or no reaction whatsoever. For example, the hydrophosphination of alkenes does not generally occur at germinally disubstituted alkenes, often resulting in no reaction. Further advantageously, a bulky cyclyl phosphorus compound can be synthesised with two equivalents of an α,β-unsaturated ketone which are at least di-substituted on both alkenes. In particular, the second addition of an α,β-unsaturated ketone containing the substituted alkene can progress smoothly to give a product with good yield.

Heterocyclic phosphorus compounds possess unique properties and have increasing applications, for example as ligands. It would therefore be desirable to have a method which both tolerates substituted α,β-unsaturated ketones and leads to the formation of heterocyclic phosphinic acids. The use of dienones as an alternative substrate and the application of specific reaction conditions is believed to enable the practical synthesis of heterocyclic phosphinic acids in this manner. By providing a phosphorus synthon equivalent that is readily modifiable, a convergent synthetic approach can be taken to streamline the number of reactions required in the synthesis.

In some embodiments, heterocyclic secondary phosphinic acid 2,2,6,6-tetramethylphosphorinic acid (P1), derivatives (P2, P3, TMP, ATMP and KTMP) and methods to synthesise them are disclosed. Reduction of the phosphinic acid groups generates secondary phosphines which can be readily transformed into useful phosphine ligands by reaction of the P-H ligand to generate tertiary phosphines.

"Alkyl" refers to monovalent alkyl groups which may be straight chained or branched and preferably have from 1 to 10 carbon atoms or more preferably 1 to 6 carbon atoms. Examples of such alkyl groups include methyl, ethyl, n-propyl, iso-propyl, n-butyl, iso-butyl, n-hexyl, and the like.

"Alkylene" refers to divalent alkyl groups preferably having from 1 to 10 carbon atoms and more preferably 1 to 6 carbon atoms. Examples of such alkylene groups include methylene ($-CH_2-$), ethylene ($-CH_2CH_2-$), and the propylene isomers (e.g., $-CH_2CH_2CH_2-$ and $-CH(CH_3)CH_2-$), and the like.

"Alkenyl" refers to a monovalent alkenyl group which may be straight chained or branched and preferably have from 2 to 10 carbon atoms and more preferably 2 to 6 carbon atoms and have at least 1 and preferably from 1-2, carbon to carbon, double bonds. Examples include ethenyl ($-CH{=}CH_2$), n-propenyl ($-CH_2CH{=}CH_2$), iso-propenyl ($-C(CH_3){=}CH_2$), but-2-enyl ($-CH_2CH{=}CHCH_3$), and the like.

"Alkenylene" refers to divalent alkenyl groups preferably having from 2 to 8 carbon atoms and more preferably 2 to 6 carbon atoms. Examples include ethenylene ($-CH{=}CH-$), and the propenylene isomers (e.g., $-CH_2CH{=}CH-$ and $-C(CH_3){=}CH-$), and the like.

"Alkynyl" refers to alkynyl groups preferably having from 2 to 10 carbon atoms and more preferably 2 to 6 carbon atoms and having at least 1, and preferably from 1-2, carbon to carbon, triple bonds. Examples of alkynyl groups include ethynyl ($-C{\equiv}CH$), propargyl ($-CH_2C{\equiv}CH$), pent-2-ynyl ($-CH_2C{\equiv}CCH_2-CH_3$), and the like.

"Alkynylene" refers to the divalent alkynyl groups preferably having from 2 to 8 carbon atoms and more preferably 2 to 6 carbon atoms. Examples include ethynylene ($-C{\equiv}C-$), propynylene ($-CH_2-C{\equiv}C-$), and the like.

"Alkoxy" refers to the group alkyl-O— where the alkyl group is as described above. Examples include, methoxy, ethoxy, n-propoxy, iso-propoxy, n-butoxy, tert-butoxy, sec-butoxy, n-pentoxy, n-hexoxy, 1,2-dimethylbutoxy, and the like.

"Halo" or "halogen" refers to fluoro, chloro, bromo and iodo.

"Oxo/hydroxy" refers to groups =O, HO—.

"Alkoxy" refers to the group alkyl-O— where the alkyl group is as described above. Examples include, methoxy, ethoxy, n-propoxy, iso-propoxy, n-butoxy, tert-butoxy, sec-butoxy, n-pentoxy, n-hexoxy, 1,2-dimethylbutoxy, and the like.

"Amino" refers to the group —NR"R" where each R" is independently hydrogen, alkyl, cycloalkyl, aryl, heteroaryl, and heterocyclyl and where each of alkyl, cycloalkyl, aryl, heteroaryl and heterocyclyl is as described herein.

"Aminoylene" refers to the group —N(R")— where R" is hydrogen, alkyl, cycloalkyl, aryl, heteroaryl, and heterocyclyl and where each of alkyl, cycloalkyl, aryl, heteroaryl and heterocyclyl is as described herein.

"Aryl" refers to an unsaturated aromatic carbocyclic group having a single ring (eg. phenyl) or multiple condensed rings (eg. naphthyl or anthryl), preferably having from 6 to 14 carbon atoms. Examples of aryl groups include phenyl, naphthyl and the like.

"Heteroaryl" refers to a monovalent aromatic heterocyclic group which fulfils the Hückel criteria for aromaticity (ie. contains 4n+2 n electrons) and preferably has from 2 to 10 carbon atoms and 1 to 4 heteroatoms selected from oxygen, nitrogen, selenium, and sulfur within the ring (and includes oxides of sulfur, selenium and nitrogen). Such heteroaryl groups can have a single ring (eg. pyridyl, pyrrolyl or N-oxides thereof or furyl) or multiple condensed rings (eg. indolizinyl, benzoimidazolyl, coumarinyl, quinolinyl, isoquinolinyl or benzothienyl).

Examples of heteroaryl groups include, but are not limited to, oxazole, pyrrole, imidazole, pyrazole, pyridine, pyrazine, pyrimidine, pyridazine, indolizine, isoindole, indole, indazole, purine, isoquinoline, quinoline, phthalazine, naphthylpyridine, quinoxaline, quinazoline, cinnoline, pteridine, carbazole, carboline, phenanthridine, acridine, phenanthroline, isothiazole, phenazine, isoxazole, isothiazole, phenoxazine, phenothiazine, thiazole, thiadiazoles, oxadiazole, oxatriazole, tetrazole, thiophene, benzo[b]thiophene, triazole, imidazopyridine and the like.

"Acyl" refers to groups H—C(O)—, alkyl-C(O)—, cycloalkyl-C(O)—, aryl-C(O)—, heteroaryl-C(O)— and heterocyclyl-C(O)—, where alkyl, cycloalkyl, aryl, heteroaryl and heterocyclyl are as described herein.

"Acylene" refers to the divalent acyl group; i.e. —C(O)—.

"Cycloalkyl" refers to cyclic alkyl groups having a single cyclic ring or multiple condensed rings, preferably incorporating 3 to 11 carbon atoms. Such cycloalkyl groups include, by way of example, single ring structures such as cyclopropyl, cyclobutyl, cyclopentyl, cyclohexyl, cyclooctyl, and the like, or multiple ring structures such as adamantanyl, indanyl, 1,2,3,4-tetrahydronapthalenyl and the like.

"Cycloalkenyl" refers to cyclic alkenyl groups having a single cyclic ring or multiple condensed rings, and at least one point of internal unsaturation, preferably incorporating 4 to 11 carbon atoms. Examples of suitable cycloalkenyl groups include, for instance, cyclobut-2-enyl, cyclopent-3-enyl, cyclohex-4-enyl, cyclooct-3-enyl, indenyl and the like.

"Heterocyclyl" refers to a monovalent saturated or unsaturated group having a single ring or multiple condensed rings, preferably from 1 to 8 carbon atoms and from 1 to 4 hetero atoms selected from nitrogen, sulfur, oxygen, selenium or phosphorous within the ring. The most preferred heteroatom is nitrogen. It will be understood that where, for instance, $R_2$ or R' is an optionally substituted heterocyclyl which has one or more ring heteroatoms, the heterocyclyl group can be connected to the core molecule of the compounds of the present invention, through a C—C or C-heteroatom bond, in particular a C—N bond.

Examples of heterocyclyl and heteroaryl groups include, but are not limited to, oxazole, pyrrole, imidazole, pyrazole, pyridine, pyrazine, pyrimidine, pyridazine, indolizine, isoindole, indole, indazole, purine, quinolizine, isoquinoline, quinoline, phthalazine, naphthylpyridine, quinoxaline, quinazoline, cinnoline, pteridine, carbazole, carboline, phenanthridine, acridine, phenanthroline, isothiazole, phenazine, isoxazole, isothiazole, phenoxazine, phenothiazine, imidazolidine, imidazoline, piperidine, piperazine, indoline, phthalimide, 1,2,3,4-tetra hydroisoquinoline, 4,5,6,7-tetra hydrobenzo[b]thiophene, thiazole, thiadiazoles, oxadiazole, oxatriazole, tetrazole, thiazolidine, thiophene, benzo[b]thiophene, morpholino, piperidinyl, pyrrolidine, tetrahydrofuranyl, triazole, and the like.

"Thio" refers to groups H—S—, alkyl-S—, cycloalkyl-S—, aryl-S—, heteroaryl-S—, and heterocyclyl-S—, where alkyl, cycloalkyl, aryl, heteroaryl and heterocyclyl are as described herein.

"Thioacyl" refers to groups H—C(S)—, alkyl-C(S)—, cycloalkyl-C(S)—, aryl-C(S)—, heteroaryl-C(S)—, and heterocyclyl-C(S)—, where alkyl, cycloalkyl, aryl, heteroaryl and heterocyclyl are as described herein.

"Thioacylene" refers to the divalent thioacyl group; i.e. —C(S)—.

"Sulfinyl" refers to groups H—S(O)—, alkyl-S(O)—, cycloalkyl-S(O)—, aryl-S(O)—, heteroaryl-S(O)—, and heterocyclyl-S(O)—, where alkyl, cycloalkyl, aryl, heteroaryl and heterocyclyl are as described herein.

"Sulfinylene" refers to the divalent sulfinyl group; i.e. —S(O)—.

"Sulfonyl" refers to groups H—$S(O)_2$—, alkyl-$S(O)_2$—, cycloalkyl-$S(O)_2$—, aryl-$S(O)_2$—, heteroaryl-$S(O)_2$—, and heterocyclyl-$S(O)_2$—, where alkyl, cycloalkyl, aryl, heteroaryl and heterocyclyl are as described herein.

"Sulfonylene" refers to the divalent sulfonyl group; i.e. —$S(O)_2$—.

"Silyl" refers to groups which contain a covalently bonded silicon atom, and include groups —$Si(R'')_3$, —Si(OR'')(R'')(R''), —$Si(OR'')_2$(R''), —$Si(OR'')_3$ where R'' is independently hydrogen, alkyl, cycloalkyl, aryl, heteroaryl, and heterocyclyl and where each of alkyl, cycloalkyl, aryl, heteroaryl and heterocyclyl is as described herein.

"Silylene" refers to divalent silyl groups; —$Si(R'')_2$—, —Si(OR'')(R'')—, —$Si(OR'')_2$—, where R'' is independently hydrogen, alkyl, cycloalkyl, aryl, heteroaryl, and heterocyclyl and where each of alkyl, cycloalkyl, aryl, heteroaryl and heterocyclyl is as described herein.

In this specification "optionally substituted" is taken to mean that a group may or may not be further substituted or fused (so as to form a condensed polycyclic group) with one or more groups selected from hydroxyl, acyl, alkyl, alkoxy, alkenyl, alkenyloxy, alkynyl, alkynyloxy, amino, aminoacyl, thio, arylalkyl, arylalkoxy, aryl, aryloxy, carboxyl, acylamino, cyano, halogen, nitro, phosphono, sulfo, phosphorylamino, phosphinyl, heteroaryl, heteroarylalkyl, heteroaryloxy, heterocyclyl, heterocyclylalkyl, heterocyclyloxy, oxyacyl, oxime, oxime ether, hydrazone, oxyacylamino, oxysulfonylamino, aminoacyloxy, trihalomethyl, trialkylsilyl, pentafluoroethyl, trifluoromethoxy, difluoromethoxy, trifluoromethanethio, trifluoroethenyl, mono- and di-alkylamino, mono- and di-(substituted alkyl)amino, mono- and di-arylamino, mono- and di-heteroarylamino, mono- and di-heterocyclyl amino, and unsymmetric di-substituted amines having different substituents selected from alkyl, aryl, heteroaryl and heterocyclyl, and the like, and may also include a bond to a solid support material, (for example, substituted onto a polymer resin). For instance, an "optionally substituted amino" group may include amino acid and peptide residues.

"Phosphoryl" refers to the groups —P(O)(R''')(OR'''') where R'' represents H, alkyl, cycloalkyl, alkenyl, or aryl, R'''' represents OR'''' or is hydroxy or amino and R'''' is alkyl, cycloalkyl, aryl or arylalkyl, where alkyl, amino, alkenyl, aryl, cycloalkyl, and arylalkyl are as described herein.

"Phosphonate" refers to an organophosphorus compound containing a —$PO(OR)_2$, where the phosphorus atom is linked to a carbon, and where R can independently represent H, alkyl, cycloalkyl, alkenyl, aryl, arylalkyl, heteroarylalkyl or heteroaryl as described herein.

"Phosphonite" refers to an organophosphorus compound with the formula $P(OR)_2R$, where R can independently represent H, alkyl, cycloalkyl, alkenyl, aryl, arylalkyl, heteroarylalkyl or heteroaryl as described herein.

"Phosphinite" refers to an organophosphorus compound with the formula $P(OR)R_2$, where R can independently represent H, alkyl, cycloalkyl, alkenyl, aryl, arylalkyl, heteroarylalkyl or heteroaryl as described herein.

"Phosphinate" or "hypophosphite" refers to phosphorus compounds with the formula $PO(OR)R_2$, where R can independently represent H, alkyl, cycloalkyl, alkenyl, aryl, arylalkyl, heteroarylalkyl or heteroaryl as described herein. "Phosphinic acid" refers to a phosphorus oxyacid with the formula $PO(OH)R_2$.

"Phosphine" refers to phosphorus compounds with the formula $PR_3$, where R can independently represent H, alkyl, cycloalkyl, alkenyl, aryl, arylalkyl, heteroarylalkyl or heteroaryl as described herein. For example, a primary hydrocarbylphosphine has a formula $PH_2R$, where R can be alkyl, cycloalkyl or arylalkyl.

"Solvent" as used herein, refers to an organic based solvent or solvent system, and which comprises of mainly organic solvent. Organic based solvents can be any carbon based solvents. Such solvents can be either polar or non-polar, and/or either protic or aprotic. Solvent systems refer to combinations of solvents which resulting in a final single phase. Both 'solvents' and 'solvent systems' can include, and is not limited to, pentane, cyclopentane, hexane, cyclohexane, benzene, toluene, dioxane, chloroform, diethylether, dichloromethane, tetra hyd rofura n, ethyl acetate, acetone, dimethylformamide, acetonitrile, dimethyl sulfoxide, nitromethane, propylene carbonate, formic acid, butanol, isopropanol, propanol, ethanol, methanol, acetic acid, ethylene glycol, diethylene glycol or water. Organic based solvents or solvent systems can include, but not limited to, any non-polar liquid which can be hydrophobic and/or lipophilic. As such, oils such as animal oil, vegetable oil, petrochemical oil, and other synthetic oils are also included within this definition.

The present invention provides a method of synthesising a phosphorus compound of Formula (I), a salt, solvate or isomer thereof:

(I)

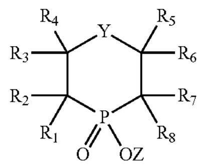

wherein Y is selected from an optionally substituted $C_{1-10}$ alkylene, optionally substituted $C_{1-10}$ alkenylene, optionally substituted silylene, optionally substituted amino, acylene, thioacylene, sulfinylene, sulfonylene, —P(O)(OZ)— or —$P^+(R_9R_{10})$—;

Z is selected from H, optionally substituted alkyl or a metal cation;

$R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_3$, $R_4$, $R_5$, and $R_6$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_9$ and $R_{10}$ are independently selected from H, optionally substituted alkyl, optionally substituted cycloalkyl, optionally substituted heterocycloyl, optionally substituted aryl, optionally substituted heteroaryl;

the method comprising:

a) reacting a compound of Formula (A) with a hypophosphite ester, acid, salt or solvate thereof and an optional organosilicon compound, the compound of Formula (A) is (A)

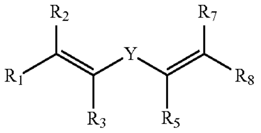

wherein Y is selected from an optionally substituted $C_{1-10}$ alkylene, optionally substituted $C_{1-10}$ alkylenylene, optionally substituted silicon, acylene, —$C(OR_9)(OR_{10})$—, —$C(OCH_2CH_2O)$—, —$C(OCH_2CH_2CH_2O)$—, —$C(=NR_{11})$—, —$CH(NR_{11}R_{12})$—, —$N(R_{11})$—, thioacylene, sulfinylene, sulfonylene, —P(O)(OZ)— or —$P^+(R_{13}R_{14})$—;

wherein $R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_3$ and $R_5$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl; and wherein $R_1$ and $R_8$ can be linked to form an optionally substituted cyclo moiety.

The organosilicon compound acts to protect the oxygen atom covalently bonded to the phosphorus atom. Accordingly, the organosilicon compound can be optional if, for example, a hypophosphite ester is used; i.e. the oxygen atom is already in a protected form and so may not require silylation. The silylated hypophosphite is believed to be more reactive. Due to silyl migration, the other alkene bond in compound of Formula (A) is no longer a good Michael acceptor (it is not in the enone form) and can be purified as an intermediate (for example compound of Formula (Aii); see below). The compound of Formula (Aii) can be silyated again to give the final product. By splitting up the steps, a better yield is obtainable. On the other hand, a hypophosphite ester is less reactive in the Michael addition, but may be able to add twice consecutively and thus form the final product in a single step.

The hypophosphite ester, acid, salt or solvate thereof and the organosilicon compound reacts to form a silylphosphorus precursor. The compound of Formula (A) reacts with the silylphosphorus precursor in that the phosphorus atom is added to the alkene carbon of the compound of Formula (A) which is more substituted.

In some embodiments, Y is selected from optionally substituted $C_{1-10}$ alkylene, optionally substituted $C_{1-10}$ alkenylene, optionally substituted silylene, acylene, thioacylene, sulfinylene, sulfonylene, —P(O)(OZ)— or —$P^+(R_9R_{10})$—. In other embodiments, Y is selected from optionally substituted $C_{1-5}$ alkylene, optionally substituted silylene, acylene, thioacylene, sulfinylene, sulfonylene, —P(O)(OZ)— or —$P^+(R_9R_{10})$—. In other embodiments, Y is selected from optionally substituted $C_{1-4}$ alkylene, acylene, thioacylene, sulfinylene, sulfonylene, or —P(O)(OZ)—.

In some embodiments, Y is optionally substituted with oxo, halo, optionally substituted alkyl; optionally substituted haloalkyl, optionally substituted oxyalkyl, optionally substituted cycloalkyl, optionally substituted heterocyclyl, optionally substituted heteroaryl, and optionally substituted aryl. In other embodiments, Y is optionally substituted with oxo, halo, optionally substituted $C_1$-$C_6$ alkyl; optionally substituted $C_1$-$C_6$ haloalkyl, optionally substituted $C_1$-$C_6$ oxyalkyl, optionally substituted $C_4$-$C_{12}$ cycloalkyl, optionally substituted $C_4$-$C_{12}$ heterocyclyl, optionally substituted $C_4$-$C_{12}$ heteroaryl, and optionally substituted $C_4$-$C_{12}$ aryl.

In some embodiments, Y is optionally substituted with alkyl, alkoxy, cycloalkyl, heterocyclyl, or oxo. In other embodiments, the optional substituent is $C_1$-$C_6$ alkyl, —O or —OH.

In other embodiments, the optionally substituted $C_{1-10}$ alkylene is optionally substituted with one or two alkoxy (acetal groups). When the optionally substituted $C_{1-10}$ alkylene is optionally substituted with two alkoxy, the two alkoxy can be linked to form a heterocyclyl (cycloacetal). In this regard, a spiro moiety is formed at Y. The optionally substituted alkoxy can be —$C(OR_{11})(OR_{12})$—, wherein $R_{11}$ and $R_{12}$ are independently selected from H, optionally substituted alkyl, optionally substituted cycloalkyl, optionally substituted heterocycloyl, optionally substituted aryl, optionally substituted heteroaryl. When the two alkoxy linked, the spiro moiety can for example be —$C(OR_{11}R_{12}O)$—, —$C(OCH_2CH_2O)$— or —$C(OCH_2CH_2CH_2O)$—. In other embodiments, the optionally substituted $C_{1-10}$ alkylene is optionally substituted with amino. For example, optionally substituted $C_{1-10}$ alkylene is —$C(=NR_{13})$— or —$CH(NR_{13}R_{14})$—, wherein $R_{13}$ and $R_{14}$ are independently selected from H, optionally substituted alkyl, optionally substituted cycloalkyl, optionally substituted heterocycloyl, optionally substituted aryl, optionally substituted heteroaryl. In other embodiments, Y is dionylene.

In some embodiments, $R_1$, $R_2$, $R_7$ and $R_8$ are independently selected from optionally substituted $C_1$-$C_6$ alkyl; optionally substituted $C_1$-$C_6$ haloalkyl; optionally substituted $C_1$-$C_6$ oxyalkyl; optionally substituted $C_4$-$C_{12}$ cycloalkyl, optionally substituted $C_4$-$C_{12}$ heterocyclyl, optionally substituted $C_4$-$C_{12}$ heteroaryl, and optionally substituted $C_4$-$C_{12}$ aryl. In other embodiments, $R_1$, $R_2$, $R_4$ and $R_5$ are independently selected from optionally substituted $C_1$-$C_6$ alkyl; optionally substituted $C_1$-$C_6$ haloalkyl; optionally substituted $C_1$-$C_6$ oxyalkyl; optionally substituted $C_4$-$C_{12}$ cycloalkyl, optionally substituted $C_4$-$C_{12}$ heterocyclyl. In other embodiments, $R_1$, $R_2$, $R_4$ and $R_5$ are independently selected from $C_1$-$C_6$ alkyl. In other embodiments, $R_1$, $R_2$, $R_4$ and $R_5$ are independently selected from methyl, ethyl, n-propyl, iso-propyl, cyclopropyl, n-butyl, iso-butyl, sec-butyl, tert-butyl and cyclobutyl.

In some embodiments, $R_1$ and $R_8$ is linked to form an optionally substituted cyclo moiety. For example, $R_1$ and $R_8$ can be linked such that compound of Formula (A) is a cycloalkyl dienone, such as cycloheptadiene, cyclooctadiene, cyclononadiene, cycloheptadienone, cyclooctadienone and cyclononadienone. Accordingly, the resultant phosphorus compound can be a bicyclo-compound. In some embodiments, the phosphorus atom is a member of a bridge linkage. In other embodiments, the phosphorus atom is not a bridgehead atom. In other embodiments, the phosphorus atom is a member of the bicyclic skeletal structure.

In some embodiments, $R_3$, $R_4$, $R_5$, and $R_6$ are independently selected from H, oxo, halo, optionally substituted alkyl, and optionally substituted haloalkyl. In other embodiments, $R_3$ and $R_5$ are independently H. In some embodiments, $R_4$ and $R_6$ are independently selected from H or optionally substituted alkyl. In other embodiments, $R_4$ and $R_6$ are independently selected from H, methyl, ethyl, or propyl.

In some embodiments, $R_9$, $R_{10}$, $R_{11}$, $R_{12}$, $R_{13}$ and $R_{14}$ are independently selected from H, optionally substituted $C_1$-$C_{10}$ alkyl, optionally substituted $C_3$-$C_{10}$ cycloalkyl, optionally substituted $C_3$-$C_{10}$ heterocyclyl, optionally substituted aryl, or optionally substituted heteroaryl. In other embodiments, $R_9$, $R_{10}$, $R_{11}$, $R_{12}$, $R_{13}$ and $R_{14}$ are independently selected from H, $C_1$-$C_{10}$ alkyl, $C_3$-$C_{10}$ cycloalkyl, $C_3$-$C_{10}$ heterocycloyl, aryl, or heteroaryl. In other embodiments, $R_9$, $R_{10}$, $R_{11}$, $R_{12}$, $R_{13}$ and $R_{14}$ are independently selected from H, or $C_1$-$C_5$ alkyl.

In some embodiments, Z is selected from H, optionally substituted $C_1$-$C_{10}$ alkyl or a metal cation. In some embodiments, Z is selected from H, $C_1$-$C_5$ alkyl or a metal cation. The metal cation can be $Na^+$, $Li^+$, or $K^+$.

In some embodiments, the organosilicon compound is selected from bis(trimethylsilyl)amine (HMDS), N,N-Bis(trimethylsilyl)methylamine, bis(dimethylamino)dimethylsilane, N,O-bis(trimethylsilyl)acetamide (BSA), N,O-bis(trimethylsilyl)trifluoroacetamide (BSTFA), N,N-dimethyltrimethylsilylamine, hexamethyldisiloxane, N,N-diethyltrimethylsilylamine 1-(trimethylsilyl)pyrrolidine trimethylsilyl chloride (TMSCl), trimethylsilyl bromide (TMSBr), chlorotriethylsilane, and a combination thereof. In some embodiments, the organosilicon compound is selected from bis(trimethylsilyl)amine (HMDS) and trimethylsilyl chloride (TMSCl).

In some embodiments, the hypophosphite ester, acid, salt or solvate thereof is selected from hypophosphorous acid ($H_3PO_2$), ammonium hypophosphite ($NH_4H_2PO_2$) and sodium hypophosphite ($NaPO_2H_2$), potassium hypophosphite, calcium bis(hypophosphite), copper hypophosphite, nickel(II) bis(hypophosphite), magnesium hypophosphite, anilinium hypophosphite, methyl hypophosphite, ethyl hypophosphite, or a combination thereof. In some embodiments, the hypophosphite ester, acid, salt or solvate thereof is selected from hypophosphorous acid ($H_3PO_2$) and ammonium hypophosphite ($NH_4H_2PO_2$). In other embodiments, the hypophosphite ester, acid, salt or solvate thereof is selected from hypophosphorous acid ($H_3PO_2$) or ammonium hypophosphite ($NH_4H_2PO_2$).

Further advantageously, these phosphorus compounds, and in particular ammonium hypophosphite, are stable in air.

As is discussed herein, the starting material passes through several intermediates to form the final product. In some embodiments, when organosilicon compound is used and to form a first intermediate (for example represented by Formula (Ai)), a molar ratio of hypophosphite ester, acid, salt or solvate thereof to the organosilicon compound is about 1:10, about 1:8, about 1:6, about 1:5, about 1:2, about 1:1.8, about 1:1.4, about 1:1.3, about 1:1.2, about 1:1.1 or about 2:10, about 3:10, about 4:10, about 5:10, about 6:10, or about 7:10. In other embodiments, the molar ratio is about 1:10 to about 1:1, about 2:10 to about 1:1, about 3:10 to about 1:1, about 4:10 to about 1:1, about 5:10 to about 1:1, about 6:10 to about 1:1, about 7:10 to about 1:1, about 8:10 to about 1:1, about 9:10 to about 1:1, or about 6:10 to about 8:10.

The organosilicon compound can be a bis(organosilicon) compound. In this regard, 2 Si moieties are available for reaction. In some embodiments, a ratio of the hypophosphite moiety to the organosilicon moiety is about 1:20 to about 1:1. In other embodiments, the ratio is about 1:18 to about 1:1, about 1:16 to about 1:1, about 1:14 to about 1:1, about 1:12 to about 1:1, about 1:10 to about 1:1, about 1:8 to about 1:1, about 1:6 to about 1:1, about 1:4 to about 1:1, or about 1:2 to about 1:1.

The hypophosphite ester, acid, salt or solvate thereof and the organosilicon compound can react to form a silylphosphorus precursor. In some embodiments, the silylphosphorus precursor is generated in situ from an organosilicon compound and hypophosphite ester, acid, salt or solvate thereof. The generation of a phosphine surrogate "in situ" is then reacted with a diene (for example, phorone) to furnish a compound of Formula (I).

In some embodiments, the step of reacting a compound of Formula (A) with the hypophosphite ester, acid, salt or solvate thereof and the organosilicon compound further comprises a base. For example, the base can be triethylamine, diethylamine, pyrrolidine, pyridine, lutidine, piperidine 1,8-diazabicyclo[5.4.0]undec-7-ene (DBU), 1,4-diazabicyclo[2.2.2]octane (DABCO), sodium hydroxide, potassium hydroxide, ammonium hydroxide, sodium carbonate, sodium hydrogen carbonate, barium hydroxide, calcium carbonate, caesium carbonate, or a combination thereof. In other embodiments, the base is N,N-diisopropylethylamine. The base can be dependent on the organosilicon compound used. In some embodiments, a base is not required. For example, if HMDS is used, a base is not required. Where the organosilicon compound is trimethylsilyl chloride, Hünigs base can for example be used. In some embodiments, three equivalents of base to organosilicon compound is used.

In some embodiments, the step of reacting a compound of Formula (A) with the hypophosphite ester, acid, salt or solvate thereof and the organosilicon compound further comprises a solvent. In other embodiments, the solvent is a polar or nonpolar solvent. In general, a solvent can be selected to minimise intermolecular side reactions. For example, depending on the reagents used, an aprotic solvent may be desirable as the reagents may react with a protic solvent e.g. an alcohol. In other embodiments, the solvent is selected from toluene, 1,2-dichloroethane, xylenes, chloroform, dichloromethane, diethylether, benzene, cyclohexane, hexane and pentane. In other embodiments, the solvent is selected from toluene, 1,2-dichloroethane, and xylenes.

In some embodiments, the compound of Formula (A) is (A)

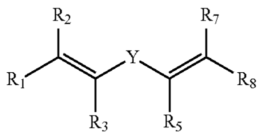

wherein $R_1$, $R_2$, $R_3$, $R_5$, $R_7$, $R_8$ and Y are as disclosed herein.

Some examples of compound of Formula (A) are divinyl ketone, dibenzylidene acetone, 1,5-bis(3,5-dimethoxyphenyl)1,4-pentadien-3-one, divinyl sulfoxide, divinyl sulfone, 2,6-dimethylhepta-2,5-diene-4-thione, divinylphosphinic acid, o-ethyl-bis(vinyl)phosphonate, distyrylphosphinic acid, N,N-bis(2-methylprop-1-en-1-yl)aniline, phenyl-(3-phenyl-1-styryl-allyliden)-amine, divinyldimethylsilane and hexa-1,5-diene-3,4-dione.

Other examples of compound of Formula (A) are

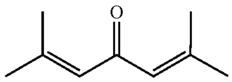

phorone

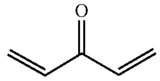

divinyl ketone
CAS: 1890-28-4

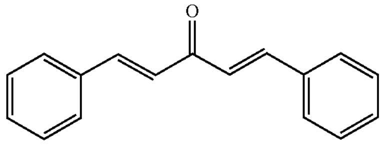

dibenzylidene acetone
CAS: 35225-79-7

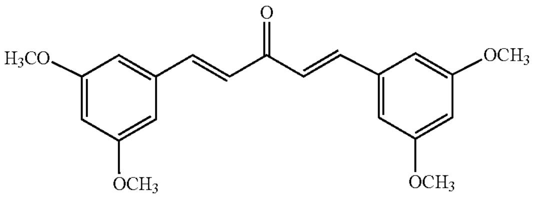

1,5-bis(3,5-dimethoxyphenyl)-1,4-pentadien-3-one
CAS: 39777-58-7

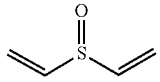

divinyl sulfoxide
CAS: 1115-15-7

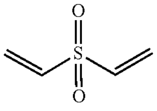

divinyl sulfone
CAS: 77-77-0

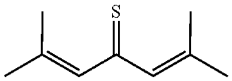

2,6-dimethylhepta-2,5-diene-4-thione

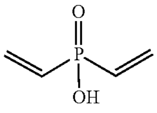

divinylphosphinic acid
CAS: 34833-62-0

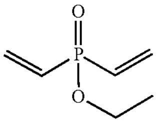

o-ethyl-bis (vinyl) phosphonite
CAS: 30594-15-1

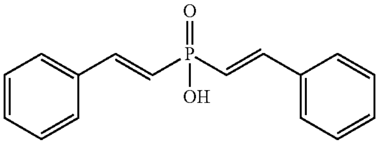

distyrylphosphinic acid
CAS: 4895-75-4

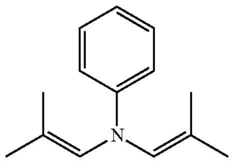

N,N-bis (2-methylprop-1-en-1-yl) aniline

-continued

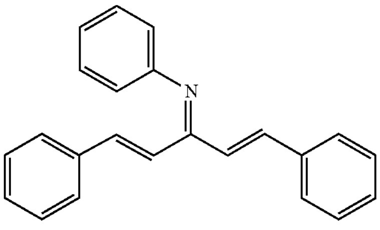

phenyl-(3-phenyl-1-styryl-allyliden)-amine
CAS: 64723-86-0

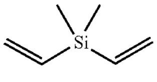

divinyldimethysilane
CAS:10519-87-6

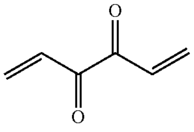

hexa-1,5-diene-3,4-dione
CAS: 104910-78-3

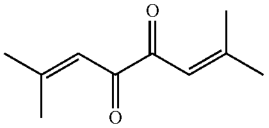

2,7-dimethyl-octa-2,6-diene-4,5-dione
CAS: 760-12-3

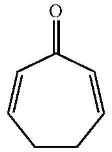

cyclohepta-2,6-dienone
CAS: 1192-93-4

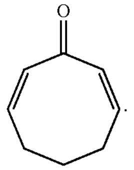

cis,cis-2,7-cyclooctadienone
CAS: 35242-04-7

The step of reacting a compound of Formula (A) with the hypophosphite ester, acid, salt or solvate thereof and the organosilicon compound can result in a first intermediate. It is postulated that the silylphosphorus precursor is added across an alkene such that the hypophosphite is added at germinally di-substituted C of the alkene and is stabilised by the organosilicate moiety. For example, if a phorone is used, the first intermediate can, in general, be represented by Formula (Ai):

(Ai)

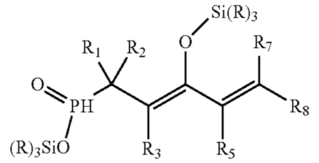

wherein R represents optionally substituted alkyl. When TMSCI or HMDS is used, R is methyl.

In some embodiments, the first intermediate is treated with an acid to form a second intermediate. For example, following from compound of Formula (Ai), a compound of Formula (Aii) can be obtained:

(Aii)

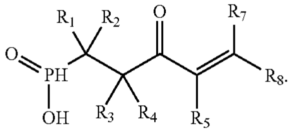

The compound of Formula (Aii) can be isolated after acid work-up. The treatment with acid can be performed at room temperature. For example, the temperature can be of about 15° C. to about 30° C. The acid can be any organic or inorganic acid. For example HCl can be used. The acid can be selected from HCl (aq), HBr (aq), $H_2SO_4$, phosphoric acid ($H_3PO_4$), nitric acid ($HNO_3$), boric acid ($H_3BO_3$), methanesulfonic acid, para-toluenesulfonic acid, acetic acid, formic acid, citric acid, oxalic acid, tartaric acid, heteropolyacids, or a combination thereof. Excess acid can be used to ensure quantitative hydrolysis of the silyl intermediates as well as neutralisation of any excess base present.

To introduce functionality at $R_4$ (and subsequently at $R_6$), the first intermediate (compound of Formula (Ai)) can be reacted with an electrophile. For example, methyl iodide or dimethyl sulphate can be reacted with the first intermediate to introduce a methyl group at $R_4$ (and subsequently at $R_6$). Other functionality can be introduced by selection of the electrophile.

In some embodiments, the second intermediate is reacted with an organosilicon compound. The further addition of an organosilicon compound can promote the ring closure reaction. Further advantageously, by splitting up the addition of organosilicon compound into two steps, the synthesis is more controllable in that less by-products is formed. This step can, in general, provide a third intermediate. For example, when phorone is used, the intermediate has a Formula (Aiii):

(Aiii)

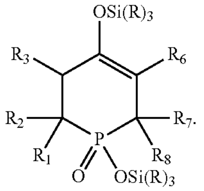

In some embodiments, to form a third intermediate (for example as represented by Formula (Aiii)), a molar ratio of the second intermediate to the organosilicon compound is about 1:10, about 1:8, about 1:6, about 1:5, about 1:2, about 1:1.8, about 1:1.7, about 1:1.6, or about 1:1.5, or about 1:1.2, or about 1:1.

Accordingly, if it is desired to form the final product in a single step, the total amount of organosilicon compound required can be added as a single addition. For example, a molar ratio of hypophosphite ester, acid, salt or solvate thereof to the organosilicon compound can be about 1:20 to about 1:2.

In some embodiments, the second intermediate is reacted with the organosilicon compound at a temperature of about 70° C. to about 150° C. In other embodiments, the temperature is about 80° C. to about 150° C., about 90° C. to about 150° C., about 100° C. to about 150° C., about 110° C. to about 150° C., or about 120° C. to about 150° C.

Further advantageously, the higher temperature promotes the ring closure reaction such that a bulky heterocyclyl compound of Formula (I) can be formed.

Accordingly, in some embodiments, if it is desired to form the final product in a single step, the method is firstly performed at room temperature, and subsequently stepping up the temperature to about 70° C. to about 150° C. In other embodiments, the method is firstly performed at a temperature of about 15° C. to about 30° C., and subsequently at a temperature of about 70° C. to about 150° C. The reaction at room temperature can be performed for at least about 1 h to about 24 h, or for at least about 1 h to about 48 h. The reaction at the higher temperature can be performed for at least 1 h to about 24 h, or for at least about 1 h to about 48 h.

Similar to the above, the provision of an acid can desilylate the third intermediate.

In some embodiments, the method further comprises a step (b) after step (a) of modifying the compound of formula (I) at the Y moiety. This allows further derivatives to be synthesised and which can be useful in further reactions.

In some embodiments, the method further comprises a step (b) after step (a) of modifying the compound of formula (I) with a protecting group compound. For example, the protecting group compound can be selected from ethylene glycol, methanol, ethanol, propylene glycol, 2,2-dimethyl-1,3-propanediol (neopentylglycol), dimethyl hydrazine, 1,2-ethanedithiol and 1,3-propanedithiol. In some embodiments, a Dean Stark reaction is performed to protect a carbonyl group with an ethylene glycol. A further catalytic amount of an acid can be used. The acid can be selected from HCl (aq), HBr (aq), $H_2SO_4$, phosphoric acid ($H_3PO_4$), nitric acid ($HNO_3$), boric acid ($H_3BO_3$), methanesulfonic acid, para-toluenesulfonic acid, acetic acid, formic acid, citric acid, oxalic acid, tartaric acid, heteropolyacids.

The protection step can be performed at room temperature. For example, the temperature can be of about 15° C. to about 30° C.

In some embodiments, the method further comprises a step of reducing the compound of formula (I). This reduction step can take place after step (a) or after the modification step (b). The compound of Formula (I) can be at least partially reduced. For example, reductive amination that involves the conversion of a carbonyl group to an amine can be performed. In some embodiments, a Wolff-Kishner reduction of the carbonyl group (ketone) is performed. For example, $NH_2NH_2 \cdot H_2O$ in the presence of KOH can be used.

In some embodiments, the method further comprises a step of modifying the compound of Formula (I). For example, the modification can be at the phosphorus atom, in which a phosphaninic acid moiety and/or phosphorinone moiety is modified to its ester, salt or solvate form thereof. For example, compound of Formula (I) can be reacted with oxalyl halide to form phosphaninic halide. Similarly, other moieties such as alkyl, cycloalkyl, aryl, and heteroaryl can be introduced.

In some embodiments, the method further comprises a step (c) after (b) of reducing the phosphorus compound of Formula (I) in order to form a phosphorus compound of Formula (II):

(II)

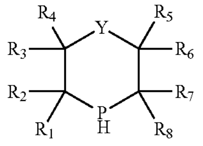

wherein $R_1$, $R_2$, $R_3$, $R_4$, $R_5$, $R_6$, $R_7$, $R_8$, $R_9$, $R_{10}$ and Y are as disclosed herein.

For example, chlorination using $(COCl)_2$ followed by further reduction ($LiAlH_4$) can give a compound of Formula (II). Further advantageously, this sets up the phosphorus compound to be a readily available synthon equivalent.

In some embodiments, the method further comprises a step of functionalising the compound of Formula (II) in order to form a phosphorus compound of Formula (III):

(III)

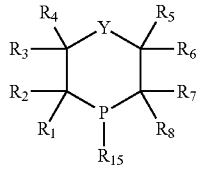

wherein $R_1$, $R_2$, $R_3$, $R_4$, $R_5$, $R_6$ $R_7$, $R_8$, $R_9$, $R_{10}$ and Y are as disclosed herein;

$R_{15}$ is selected from halo, oxo, optionally substituted amino, optionally substituted alkyl, optionally substituted alkenyl, optionally substituted cycloalkyl, optionally substituted cycloalkenyl, optionally substituted heterocyclyl, optionally substituted aryl, and optionally substituted heteroaryl.

Compound of Formula (II) can also react with boron compounds to form adducts. An example is shown in Example 8.

The compound of Formula (III) may be further linked with another compound of Formula (II) to form a dimer. A trimer can also be formed with a third compound of Formula (III). In some embodiments, the optional substituent at $R_{15}$ comprises another compound of Formula (III).

In some embodiments, the optional substituent at $R_{15}$ is selected from:

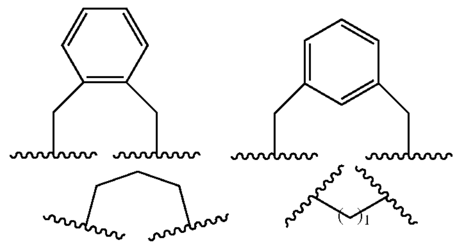

n = 1-20

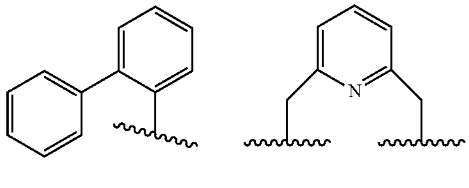

-continued
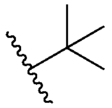
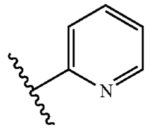
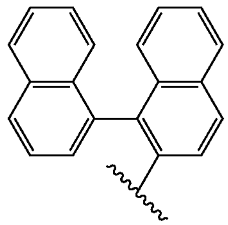
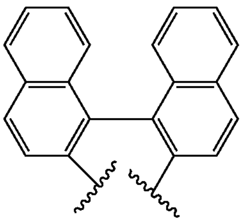
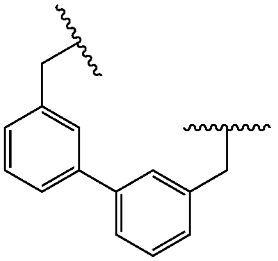
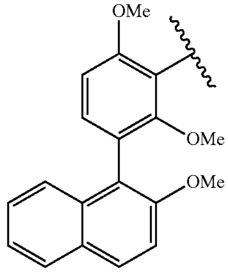
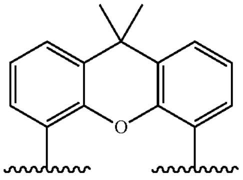
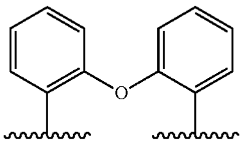
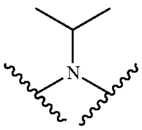
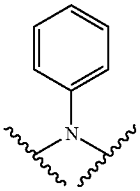
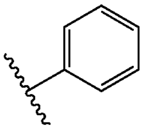
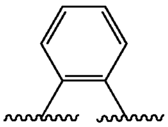
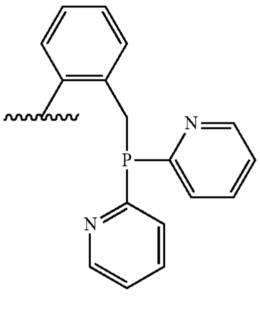
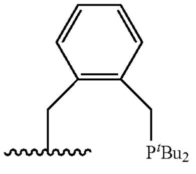
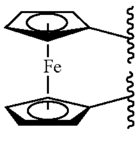
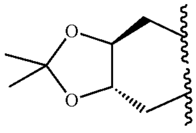
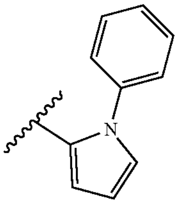
-continued
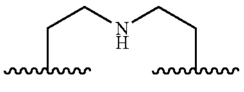
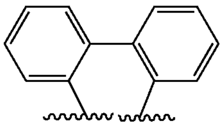
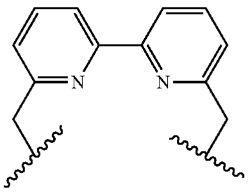
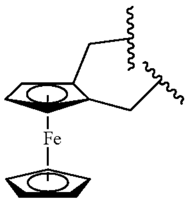
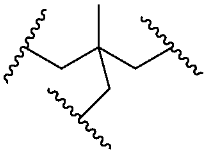
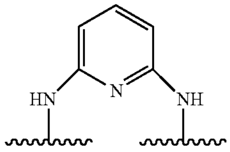
wherein ~ represents a bond to $R_{15}$ of compound of Formula (III).
Accordingly, some examples of phosphorus compounds of the present invention include:
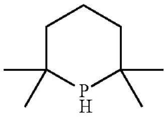
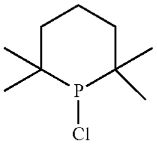
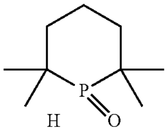
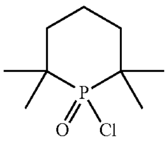
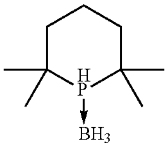
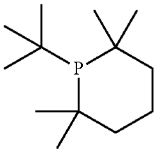
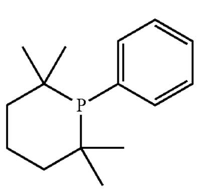
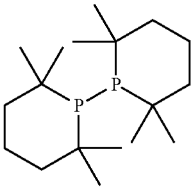
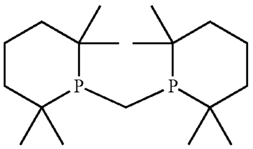
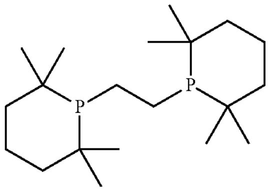
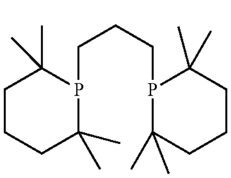
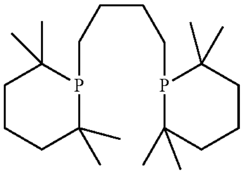

-continued
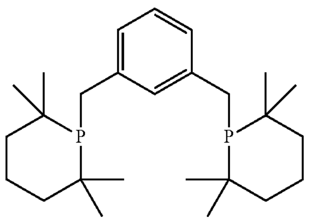
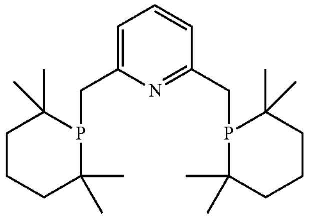
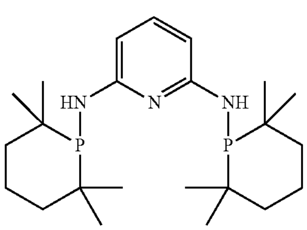
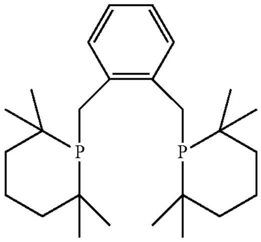
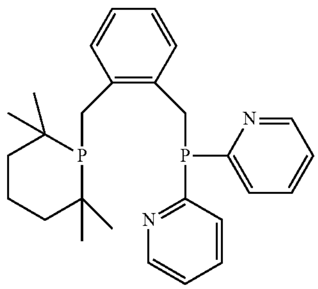
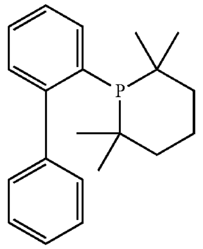
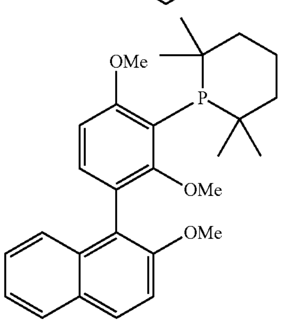
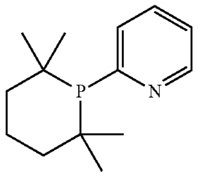
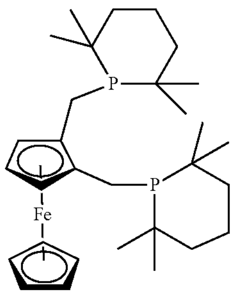
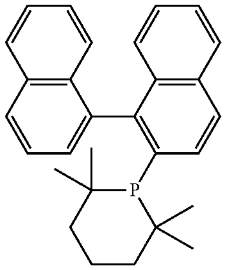
-continued
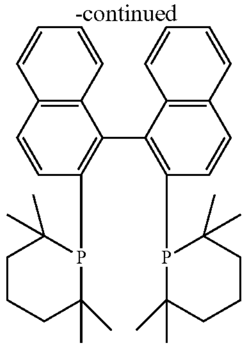
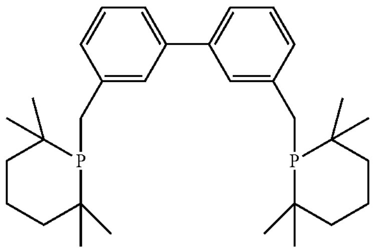
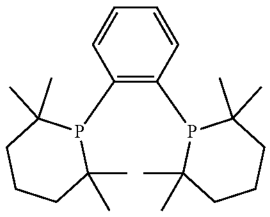
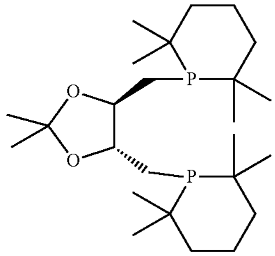
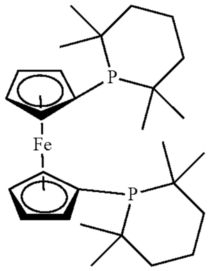
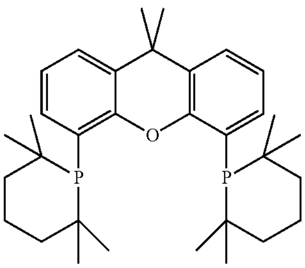
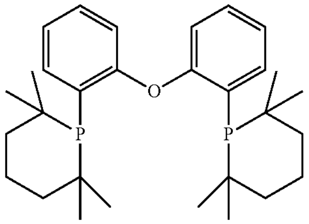
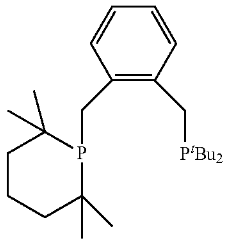
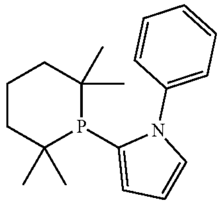
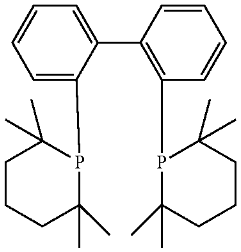

-continued
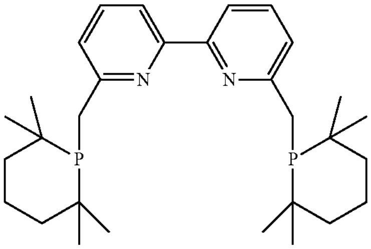
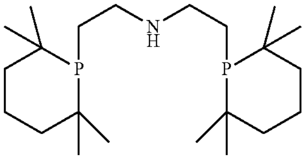
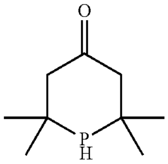
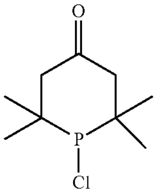
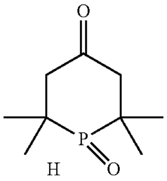
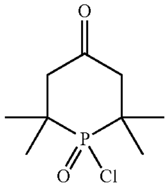
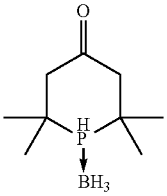
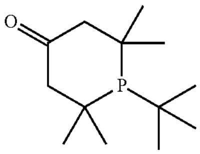
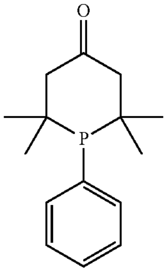
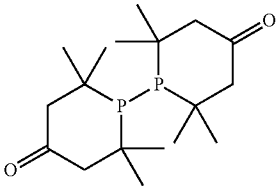
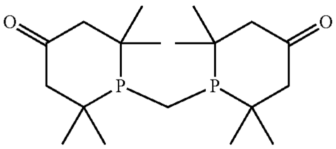
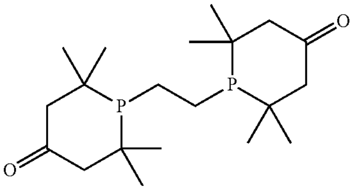
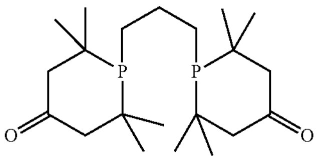
-continued
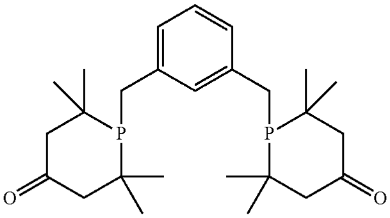
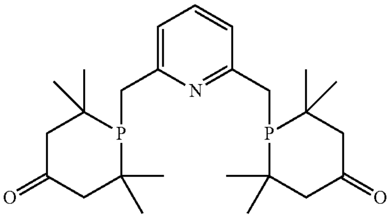
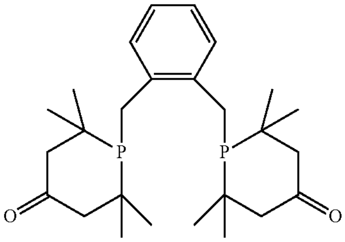
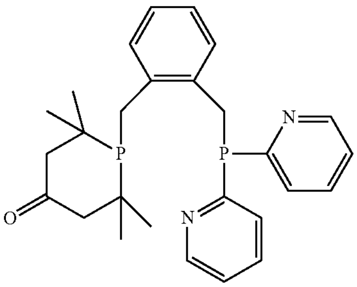
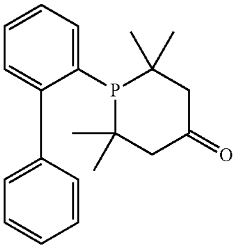
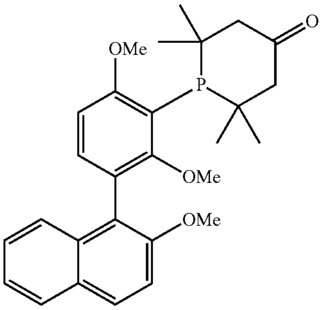
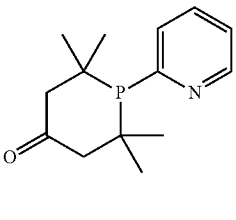
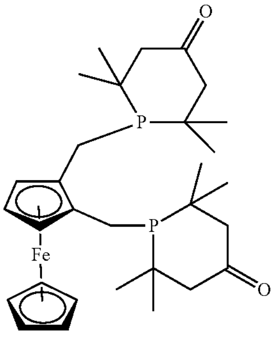

-continued
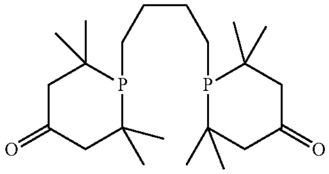
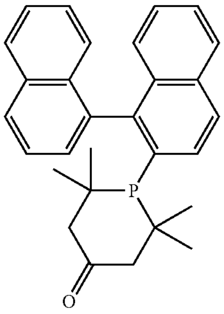
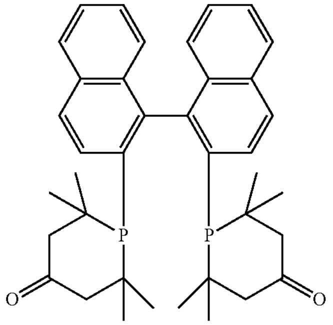
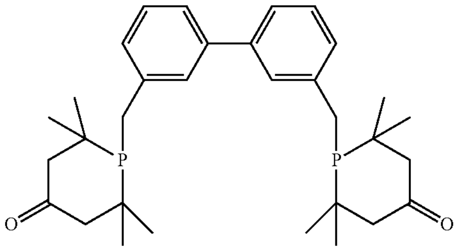
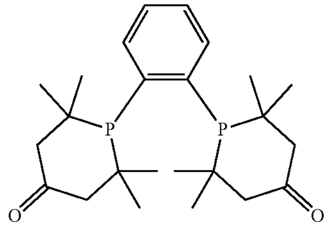
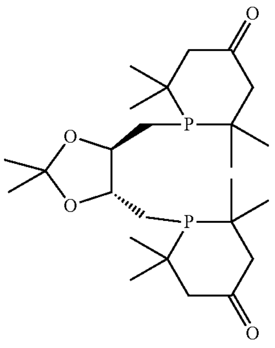
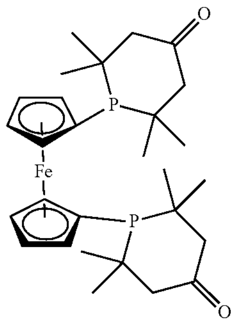
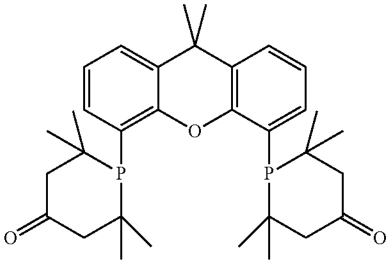
-continued
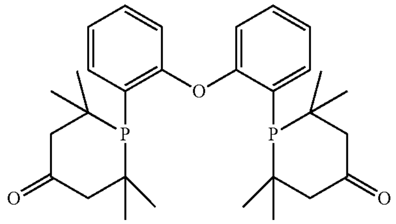
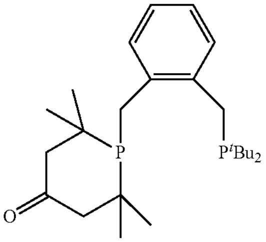
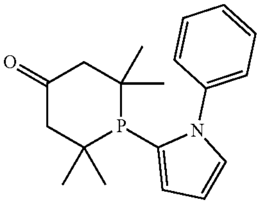
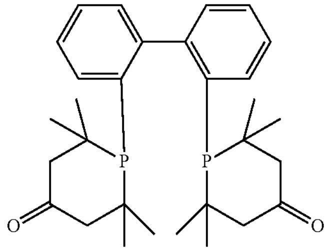
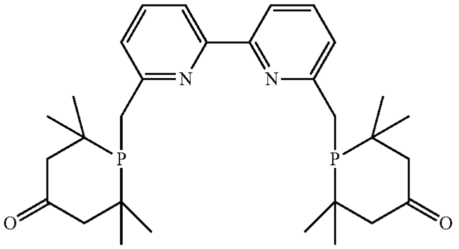
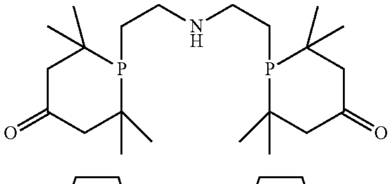
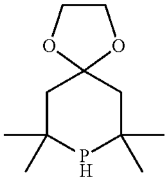
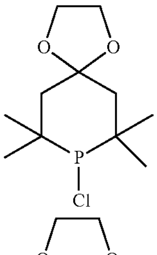
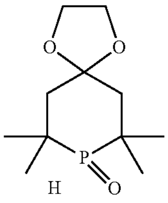
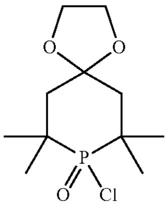
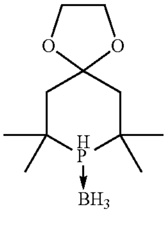
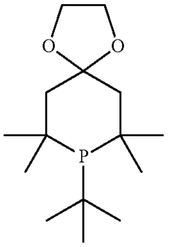
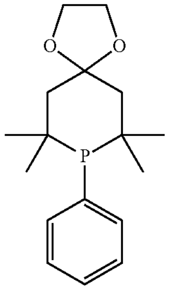

-continued
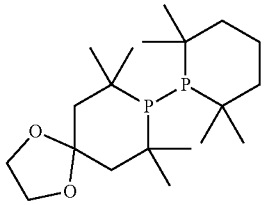
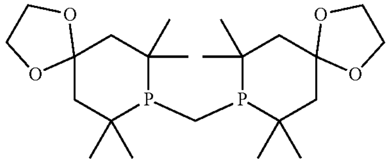
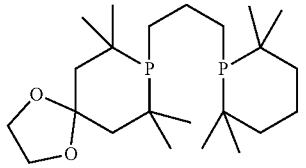
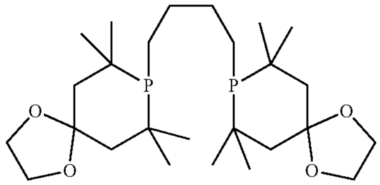
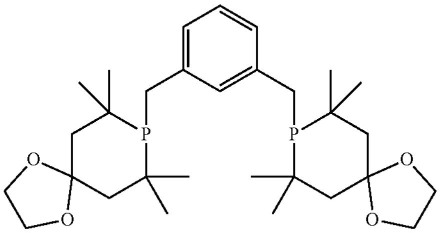
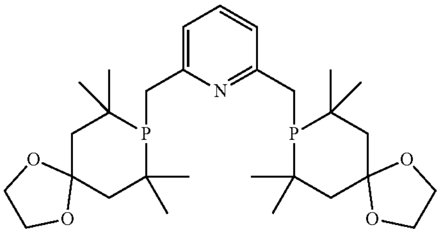
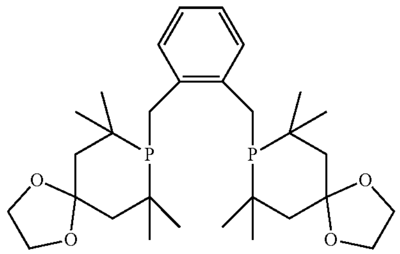
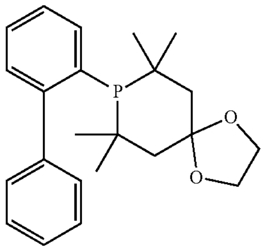
-continued
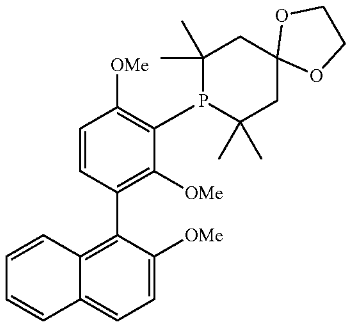
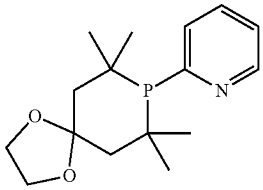
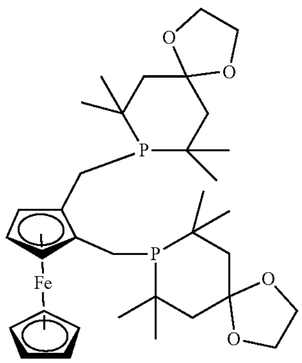
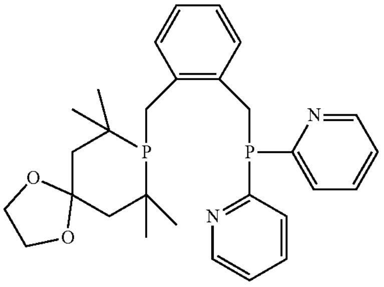
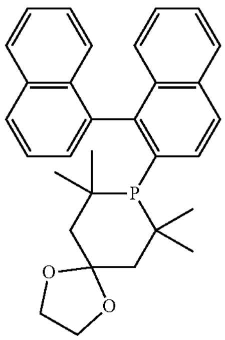

-continued
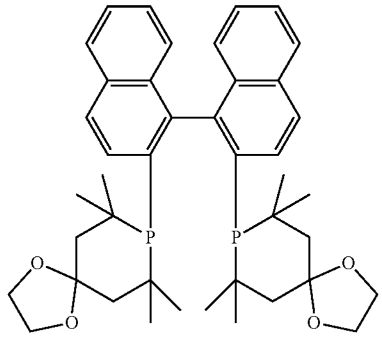
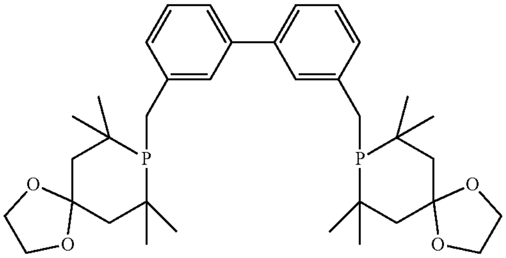
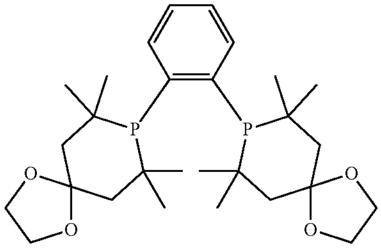
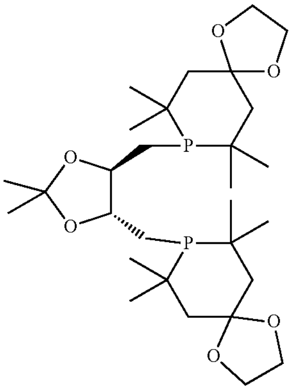
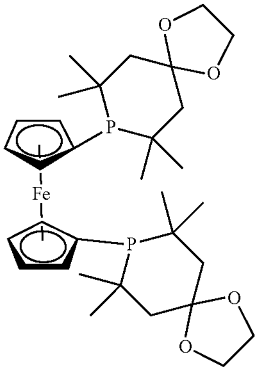
-continued
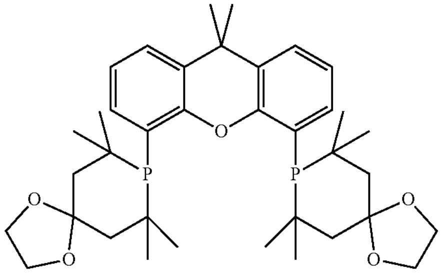
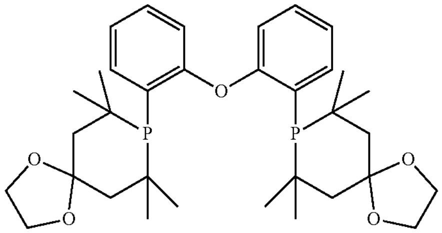
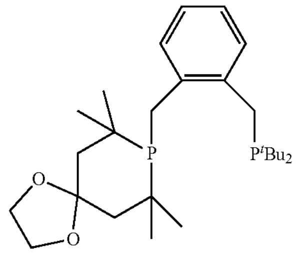
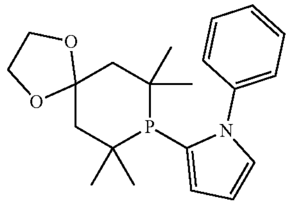
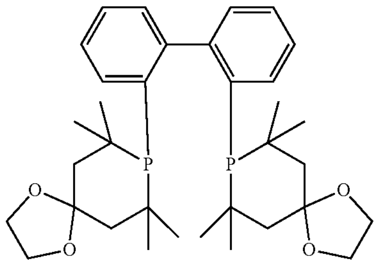
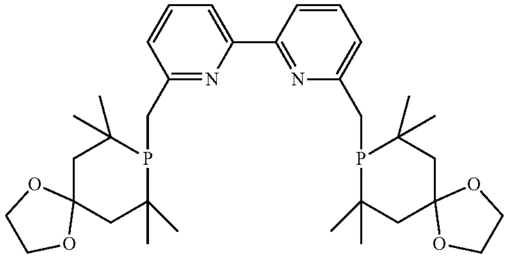
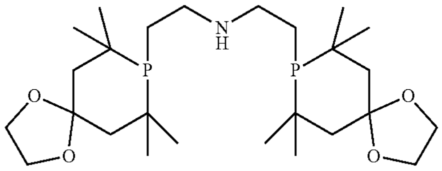

-continued
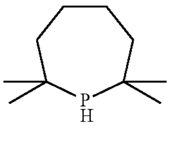
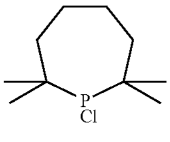
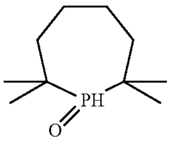
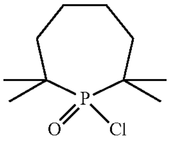
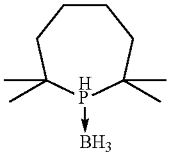
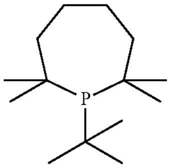
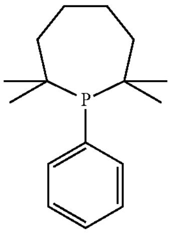
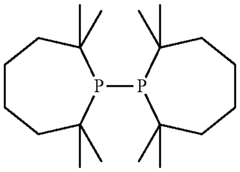
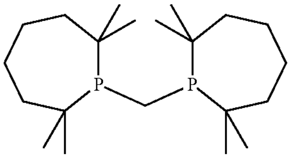
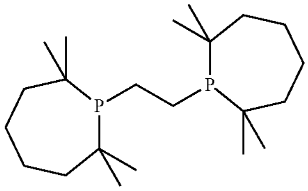
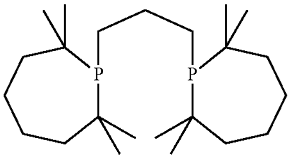
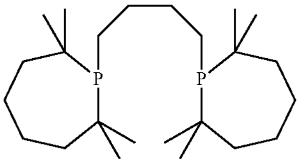
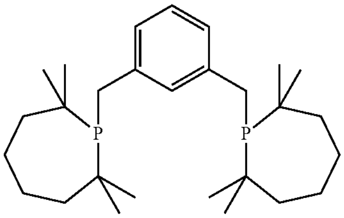
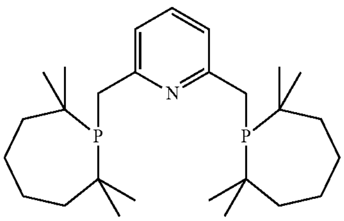
-continued
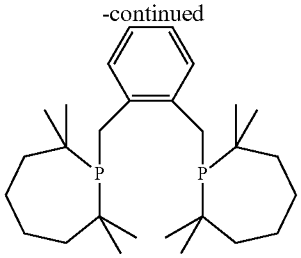
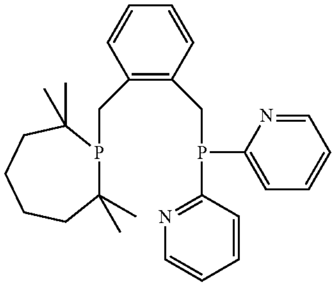
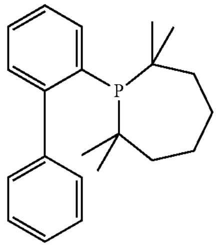
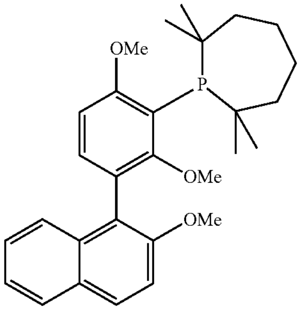
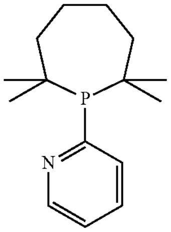
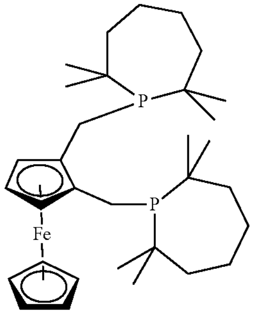
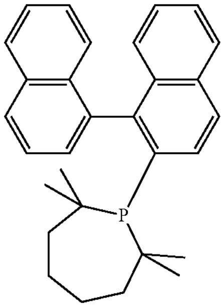
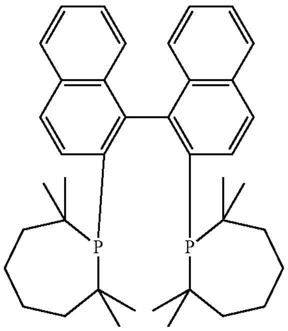
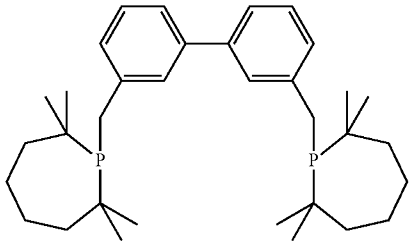

-continued

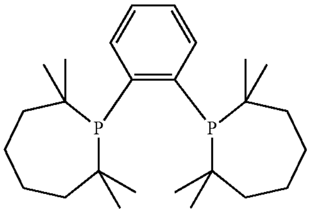

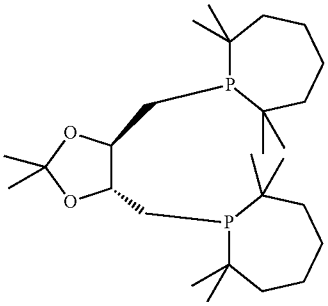

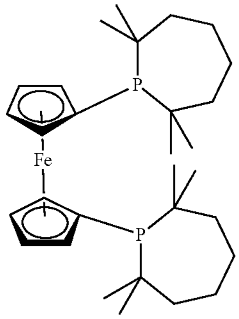

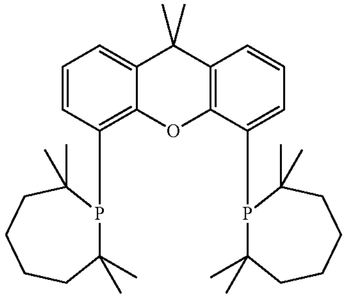

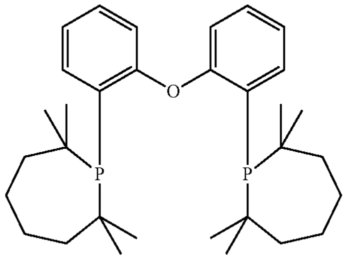

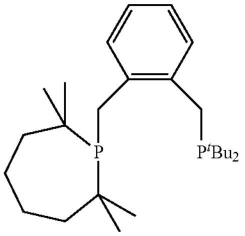

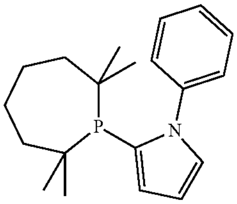

-continued

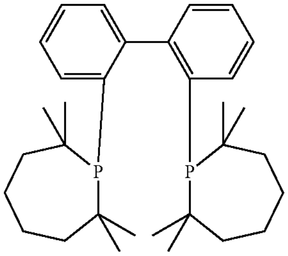

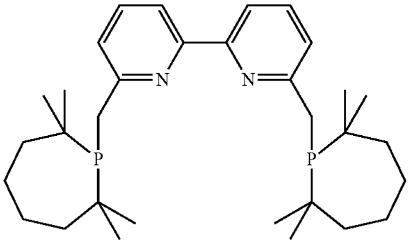

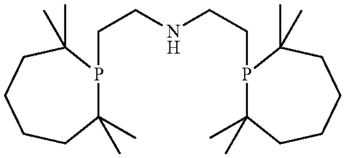

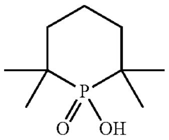

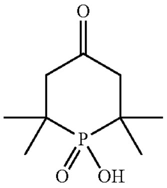

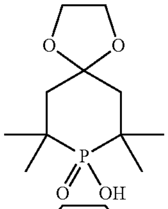

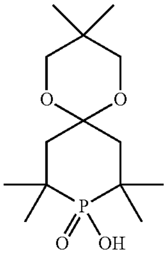

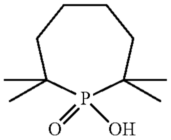

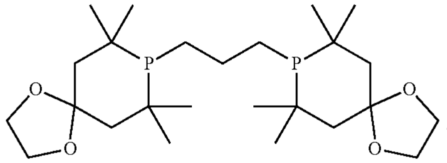
.

The present invention also provides a phosphorus compound of Formula (I), a salt, solvate or isomer thereof:

(I)

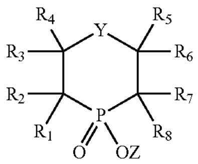

wherein Y is selected from an optionally substituted $C_{1-10}$ alkylene, optionally substituted $C_{1-10}$ alkenylene, optionally substituted silylene, optionally substituted amino, thioacylene, sulfinylene, sulfonylene, —P(O)(OZ)— or —$P^+(R_9R_{10})$—;

Z is selected from H, optionally substituted alkyl or a metal cation;

$R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_8$ can be linked to form an optionally substituted cycloalkyl;

$R_3$, $R_4$, $R_5$, and $R_6$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_9$ and $R_{10}$ are independently selected from H, optionally substituted alkyl, optionally substituted cycloalkyl, optionally substituted heterocycloyl, optionally substituted aryl, optionally substituted heteroaryl.

In some embodiments, the compound of Formula (I) is selected from:

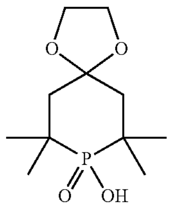
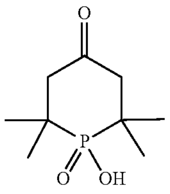
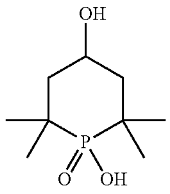
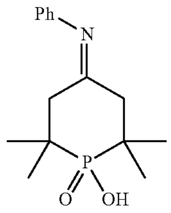
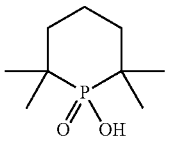
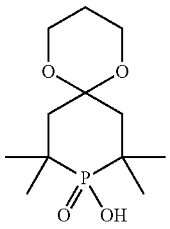
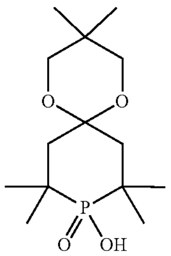
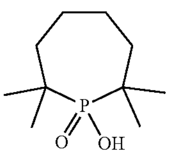
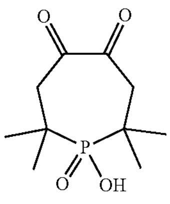
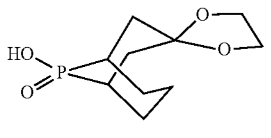
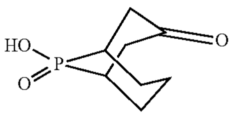
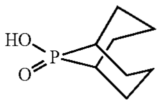
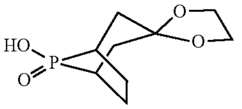

-continued

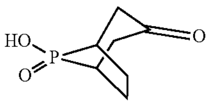
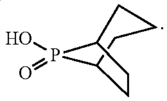

The present invention also provides a phosphorus compound of Formula (II), a salt, solvate or isomer thereof:

(II)

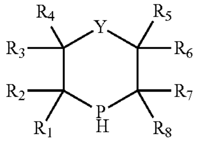

wherein Y is selected from an optionally substituted $C_{1-10}$ alkylene, optionally substituted $C_{1-10}$ alkenylene, optionally substituted silylene, optionally substituted amino, thioacylene, sulfinylene, sulfonylene, —P(O)(OZ)— or —$P^+(R_9R_{10})$—;

$R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_8$ can be linked to form an optionally substituted cycloalkyl; $R_3$, $R_4$, $R_5$, and $R_6$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_9$ and $R_{10}$ are independently selected from H, optionally substituted alkyl, optionally substituted cycloalkyl, optionally substituted heterocycloyl, optionally substituted aryl, optionally substituted heteroaryl.

The compound of Formula (II), a salt, solvate or isomer thereof can be functionalised or dimerised into a compound of Formula (III) a salt, solvate or isomer thereof.

The present invention also provides a phosphorus compound of Formula (III), a salt, solvate or isomer thereof:

(III)

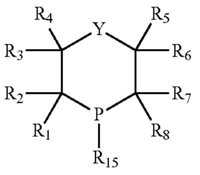

wherein Y is selected from an optionally substituted $C_{1-10}$ alkylene, optionally substituted $C_{1-10}$ alkenylene, optionally substituted silylene, optionally substituted amino, thioacylene, sulfinylene, sulfonylene, —P(O)(OZ)— or —$P^+(R_9R_{10})$—;

$R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_8$ can be linked to form an optionally substituted cycloalkyl;

$R_3$, $R_4$, $R_5$, and $R_6$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_9$ and $R_{10}$ are independently selected from H, optionally substituted alkyl, optionally substituted cycloalkyl, optionally substituted heterocycloyl, optionally substituted aryl, optionally substituted heteroaryl; and $R_{15}$ is selected from halo, oxo, optionally substituted amino, optionally substituted alkyl, optionally substituted alkenyl, optionally substituted cycloalkyl, optionally substituted cycloalkenyl, optionally substituted heterocyclyl, optionally substituted aryl, and optionally substituted heteroaryl.

The present invention also provides a phosphorus compound of Formula (IIIa), a salt, solvate or isomer thereof:

(IIIa)

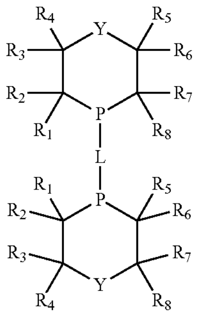

wherein $R_1$, $R_2$, $R_3$, $R_4$, $R_5$, $R_6$ $R_7$, $R_8$, $R_9$, $R_{10}$ and Y are as disclosed herein; L is a linker selected from covalent bond, optionally substituted amino, optionally substituted alkyl, optionally substituted alkenyl, optionally substituted cycloalkyl, optionally substituted cycloalkenyl, optionally substituted heterocyclyl, optionally substituted aryl, and optionally substituted heteroaryl.

The present invention also provides a phosphorus compound of Formula (IIIb), a salt, solvate or isomer thereof:

(IIIb)

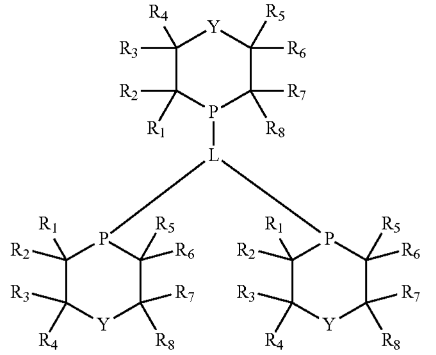

wherein $R_1$, $R_2$, $R_3$, $R_4$, $R_5$, $R_6$ $R_7$, $R_8$, $R_9$, $R_{10}$ and Y are as disclosed herein; L is a trivalent linker selected from covalent bond, optionally substituted amino, optionally substituted alkyl, optionally substituted alkenyl, optionally substituted cycloalkyl, optionally substituted cycloalkenyl, optionally substituted heterocyclyl, optionally substituted aryl, and optionally substituted heteroaryl.

In some embodiments, L is selected from:

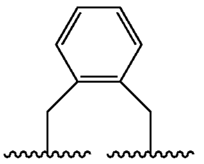
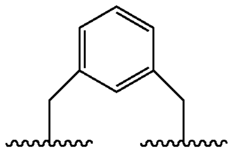
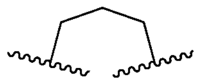
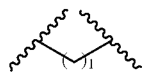

n = 1-20

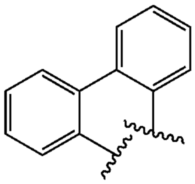
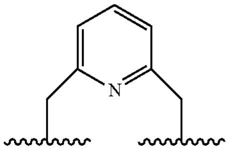
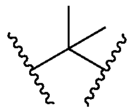
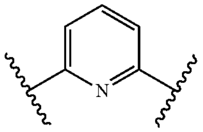
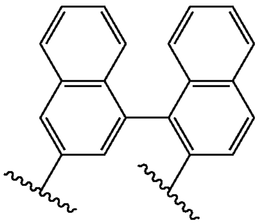
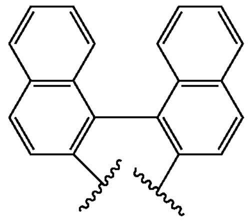

-continued

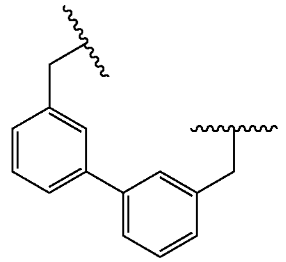

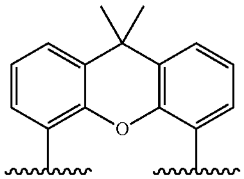

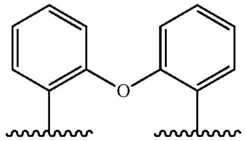

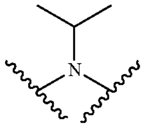

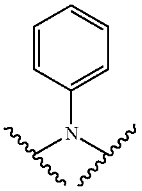

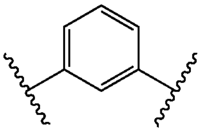

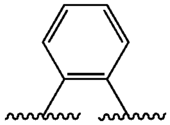

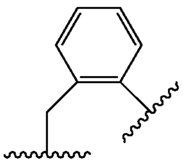

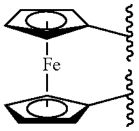

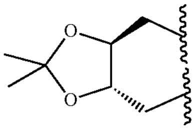

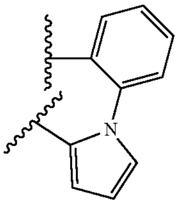

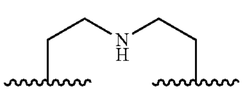

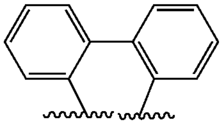

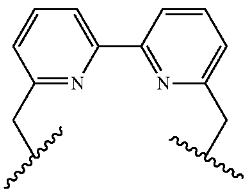

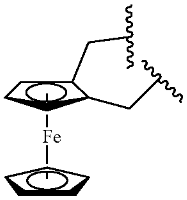

-continued

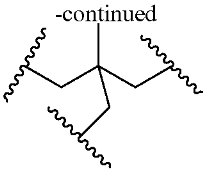

wherein ~ represents a bond to L of compound of Formula (IIIc) or (IIIb).

The present invention is industrially applicable in that the production cost of such compounds can be further lowered. For example, the raw materials cost (kg scale) to synthesize TMP is estimated to be <S$15/g. In comparison, 1 g of the analogous di-tert-butyl phosphine from STREM costs S$136. Further, phosphinic acids comprise one of the largest industrial applications and organophosphorus compounds are used in applications such as fire retardants. For example, Clariant's Exolit® OP 1230 is synthesized from diethylphosphinic acid.

EXAMPLES

2,2,6,6-tetramethylphosphorinic Acid (P1)

The synthesis of a secondary cyclic phosphine specialty, 2,2,6,6-tetramethylphosphorinic acid (P1) was achieved according to Scheme 1, starting from an inexpensive, benign phosphorus precursor, ammonium hypophosphite, which was used to generate bis(trimethylsilyl) phosphonite.

Scheme 1. Synthesis of bulky phosphorinic acid P1.

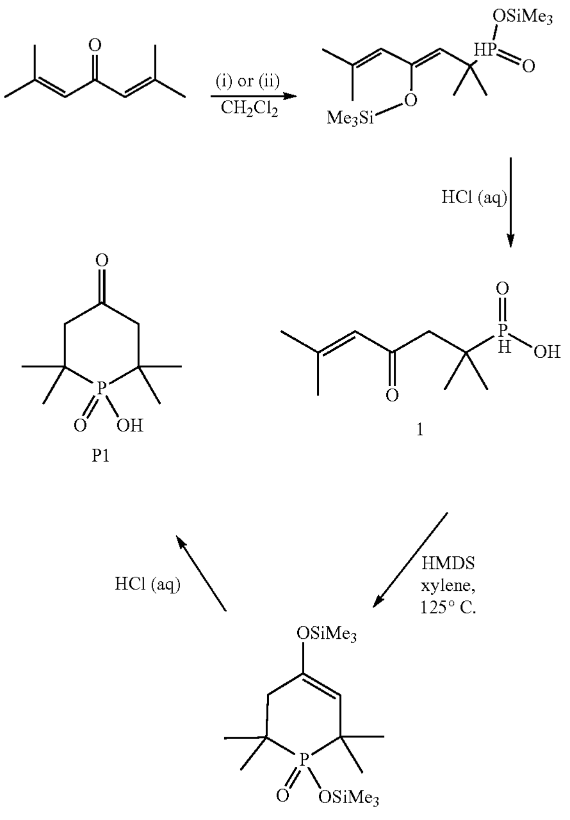

(i) Hünigs Base/TMSCl/$NH_4H_2PO_2$
(ii) HMDS/$NH_4H_2PO_2$.

The generated bis(trimethyl)silyl phosphonite was reacted with one equivalent of phorone in a two-step procedure. In the first step the reaction may be conducted at room temperature which after treatment with dilute acid generates the intermediate 1. The second stage ring closing step can be conducted in a solvent with a sufficiently high boiling point such as 1,2-dichloroethane (boiling point=83.5° C.) or more preferably toluene (b.p=110.6° C.) or more preferably xylenes (b.p. ~139° C.).

The resulting bulky heterocyclic phosphorinic acid is a useful product in and of itself. Indeed, phosphinic acids themselves are useful chemicals and represent one of the largest application of organophosphorus chemicals (OPCs) in the market (main use: —halogen free flame retardants).

P1-P3

P1 can be further derivatised through its two functional groups, to generate other products, for example, see Scheme 2.

Scheme 2. Synthesis of phosphorinic acids P1-P3 and their derivatives.

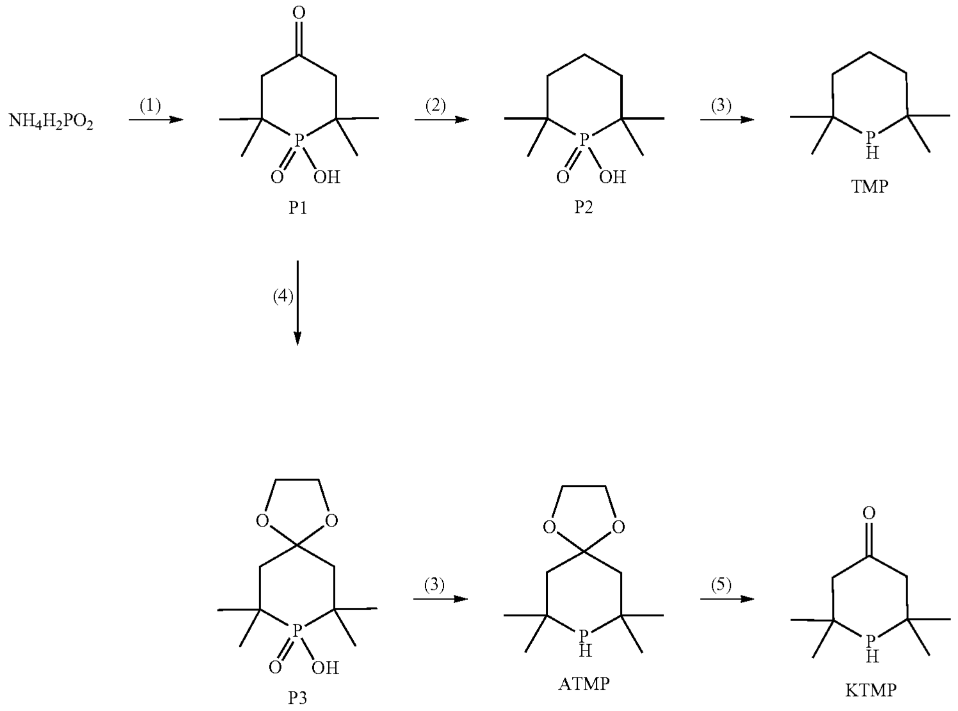

P1
P2
TMP
P3
ATMP
KTMP

Conditions:
(1) a. HDMS, b. phorone C. HCl (aq) d. HMDS e. HCl
(2) $NH_2NH_2 \cdot H_2O$, KOH, diethylene glycol; 210° C.
(3) a. $(COCl)_2$, cat. DMF b. $LiAlH_4$
(4) ethylene glycol, p-TSA, toluene
(5) HCl, THF Reduction of the ketone group of P1 generates P2. Further reduction of the phosphinic acid group in P2 generates the secondary phosphine synthon TMP. The ketone group in P1 can also be converted to an acetal group by reaction with ethylene glycol to generate novel P3 which can also be further reduced to generate secondary phosphine ATMP and KTMP. These secondary phosphines can have applications as building blocks for tertiary phosphine ligands by reacting the P-H bond to produce a vast number of derivatives.

Other derivatives of P1 can be envisaged to involve partial reduction of the ketone to an alcohol group, reductive amination of ketone to an amine substituent, use of Michael acceptor analogues of phorone to give different ring substitutions.

Other Derivatives

The presently disclosed compounds can also be versatile synthon equivalents used to produce a wide variety of phosphine derivatives (for selected examples see Scheme 1). Phosphine ligands have important application areas in catalysis, such as the Mitsubishi-Lucite process on Jurong Island (Singapore) which employs a bidentate phosphine in the methoxycarbonylation of ethylene. The derivatives tested compare favourably with the commercial ligand on a lab scale (see Table 1).

Scheme 1. Compound derivatives of the present invention

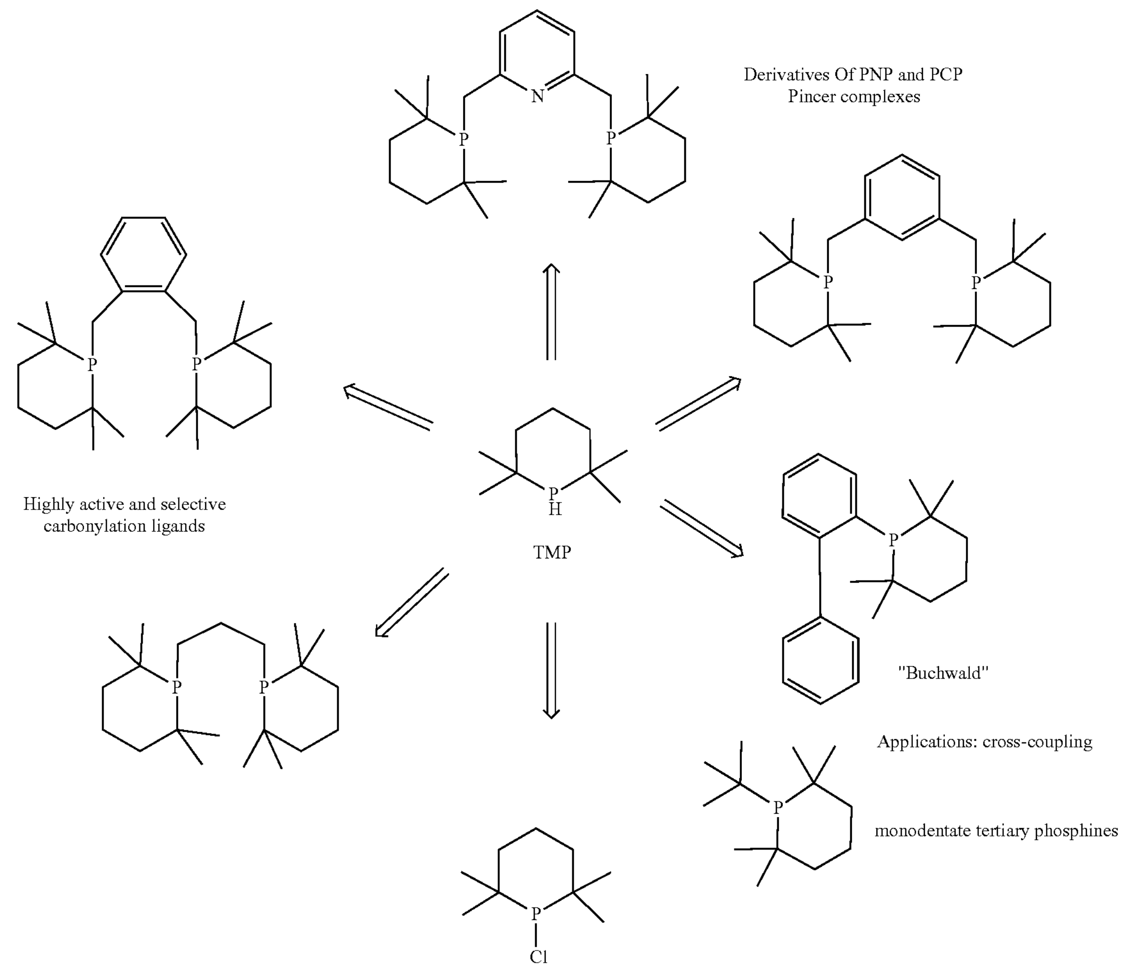

TABLE 1

Methoxycarbonylation of ethylene (part of Lucite Alpha process).

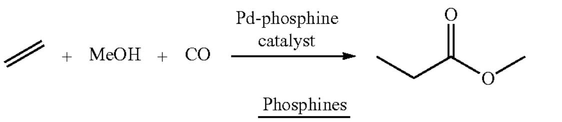

Phosphines

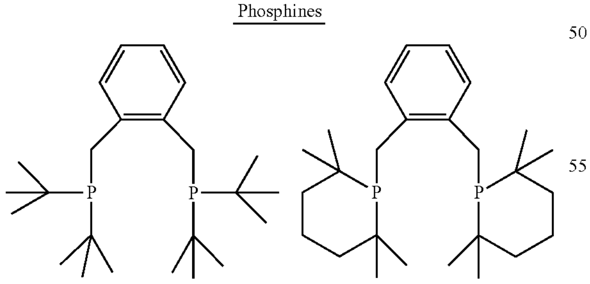

DTBPX DTMPX

| Ligand | Time (mins) | TOF ($h^{-1}$) | Selectivity |
|---|---|---|---|
| DTBPX | 10 | 59,000 | >99.0% |
| DTMPX | 10 | 65,000 | >99.0% |

Example 1: Synthesis of 2,7-dimethylocta-2,6-diene-4,5-dione

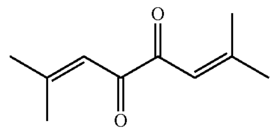

1,4-Dimethylpiperazine-2,3-dione (3.46 g, 24.3 mmol) was suspended in THF (30 mL) and cooled to 0° C. 2-Methyl-1-propenylmagnesium bromide (0.68M) (107.4 mL, 73.0 mmol), was added dropwise over 1 hour. After this time the mixture was allowed to warm to room temperature (RT) and stirred for 16 hours. It was then diluted with dilute HCl (aq) (100 mL) and extracted with EtOAc (2×100 mL). The combined organic portion was washed with brine (100 mL), dried over $MgSO_4$ and evaporated to give the crude material which was purified by vacuum distillation to give an orange oil. Yield=2.61 g (65%). $^1H$ NMR (400 MHz, $CDCl_3$): δ6.81 (2H, br. s, CH), 2.24 (6H, s, $CH_3$) and 2.00 ppm (6H, s, $CH_3$). $^{13}C\{^1H\}$ NMR (101 MHz, $CDCl_3$):

δ189.6 (s, C═O), 162.7 (s, $C_q$), 117.7 (s, CH), 28.6 (s, $CH_3$) and 21.5 (s, $CH_3$). HR-MS (+ve ESI): m/z (calc.) $[M+H]^+$ 167.1072; found 167.1065.

Example 2: Synthesis of 2,6-dimethyl-4-oxohept-5-en-2-yl)phosphinic Acid

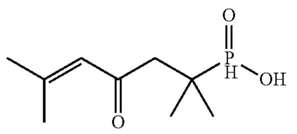

Method A: Hexamethyldisilazane (47.2 g, 292.5 mmol) and ammonium hypophosphite (23.4 g, 281.3 mmol) were stirred for 3 hours at 110° C. until evolution of ammonia had finished. This resulted in a clear solution with traces of white solid that had sublimed on the top half of the flask. The mixture was cooled to RT and phorone (31.1 g, 225.0 mmol) dissolved in $CH_2Cl_2$ (120 mL) was added and the mixture stirred at RT for 24 hours. After this time HCl (aq) (2.0M, 100 mL) was added and the mixture stirred vigorously, which dissolved the white insoluble salts that had precipitated. The organic layer was then separated and dried ($MgSO_4$) to give a yellow oil. Yield=42.7 g (93%). $^1$H NMR (400 MHz, $CDCl_3$): δ12.05 (1H, s, OH), 7.07 (1H, d, $^1J_{HP}$=565.0 Hz, PH), 6.01 (1H, s, CH), 2.62 (2H, d, $^2J_{HP}$=14.1 Hz, $CH_2$), 2.09 (3H, s, ═$CCH_3$), 1.84 (3H, s, ═$CCH_3$) and 1.17 ppm (6H, d, $^2J_{HP}$=17.8 Hz, $PC(CH_3)_2$. $^{13}C\{^1H\}$ NMR (101 MHz, $CDCl_3$): δ198.7 (s, C═O), 156.6 (s, $(CH_3)_2C$═CH—), 124.1 (s, $(CH_3)_2C$═CH—), 50.0 (s, $CH_2$), 33.7 (d, $^1J_{CP}$=95.6 Hz, —$PC(CH_3)_2$), 27.8 (s, $(CH_3)_2C$═CH—), 20.6 (d, $^2J_{CP}$=56.6 Hz, $PC(CH_3)_2$) and 20.3 ppm (s, $(CH_3)_2C$═CH—). $^{31}P\{^1H\}$ NMR (162 MHz, $CDCl_3$): δ46.8 ppm. HR-MS (+ve ESI): m/z (calc.) $[M+H]^+$ 205.0994; found 205.0984. Elem. Anal. Calcd for $C_9H_{17}O_3P$: C, 52.94; H, 8.39. Found: C, 52.37; H, 8.47.

Method B: Ammonium hypophosphite (0.5 g, 6.0 mmol) in $CH_2Cl_2$ (20 mL) was cooled to 0° C. N,N-Diisopropylethylamine (Hünigs base) (2.7 g, 3.5 mL, 21.1 mmol) was added and the mixture stirred at 0° C. for 1 hour. After this time trimethylsilyl chloride (2.3 g, 2.7 mL, 21.1 mmol) was added, HCl fumes were observed and the solution became colorless. After stirring for 4 hours, phorone (0.83 g, 0.92 mL, 6.0 mmol) in $CH_2Cl_2$ (1.0 mL) was added and stirred at 0° C. for 2 hours before being allowed to warm to RT. After 48 hours the mixture was passed through celite and washed with HCl (10%, aq) (20 mL×2) followed by deionized (DI) $H_2O$ (20 mL). The organic fraction was separated and dried ($MgSO_4$), then the volatiles were removed in vacuo to give a yellow oil. Yield=0.44 g (36%). The compound characterization was consistent with that obtained using method A.

Example 3: Synthesis of 2,2,6,6-tetramethylphosphorinic Acid

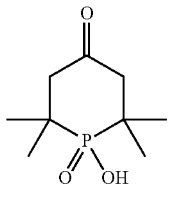

(2,6-Dimethyl-4-oxohept-5-en-2-yl)phosphinic acid (22.1 g, 108.0 mmol) and hexamethyldisilazane (20.9 g, 130.0 mmol) was stirred in degassed xylenes (500 mL) for 72 hours at 125° C., giving a clear pale yellow solution. To the reaction mixture, 0.4 equivalents of hexamethyldisilazane (7.0 g, 43.2 mmol) was added and the mixture stirred for 24 hours. The reaction mixture was cooled to RT. Subsequently HCl (aq, 2.0M) (200 mL) was added and the mixture stirred vigorously. The aqueous layer was then separated and the organic layer was extracted a second time with HCl (aq) (2.0M, 50 mL). The combined aqueous layer was back-washed with $CH_2Cl_2$ (5×50 mL). The combined $CH_2Cl_2$ extracts were dried over $MgSO_4$ to give an off-white solid. The xylene phase was evaporated via rotary evaporator to give an off-white solid. Total combined yield from both organic phases=12.9 g (58%). $^1$H NMR (400 MHz, $CDCl_3$): δ9.6 (1H, s, OH), 2.57 (4H, d, $^3J_{HP}$=15.7 Hz, $CH_2$) and 1.28 ppm (12H, d, $^3J_{HP}$=13.7 Hz, $CH_3$). $^{13}C\{^1H\}$ NMR (101 MHz, $CDCl_3$): δ206.8 (d, $^3J_{CP}$=9.9 Hz, C═O), 53.7 (s, $CH_2$), 36.5 (d, $^1J_{CP}$=86.0 Hz, $C(CH_3)_2$ and 24.1 ppm (d, $^2J_{CP}$=1.8 Hz, $CH_3$). $^{31}P\{^1H\}$ NMR (162 MHz, $CDCl_3$): δ58.1 ppm. HR-MS (+ve ESI): m/z (calc.) $[M+H]^+$ 205.0994; found 205.0985. Elem. Anal. Calcd for $C_9H_{17}O_3P$: C, 52.94; H, 8.39. Found: C, 52.40; H, 8.33.

Example 4: Synthesis of 2,2,6,6-tetramethylphosphaninic Acid

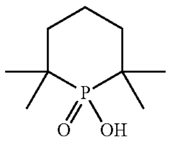

2,2,6,6-Tetramethylphosphorinic acid (8.5 g, 41.8 mmol) was suspended in diethylene glycol (120 mL). KOH (11.7 g, 209.1 mmol) and hydrazine monohydrate (65 wt %, aq) (16.1 g, 15.6 mL) were added and the mixture heated to 150° C. using a dean & stark trap to remove $H_2O$. The temperature was gradually increased to 210° C. and maintained for 16 hours. Upon cooling the mixture was diluted with DI $H_2O$ (100 mL), acidified with HCl (aq, 2.0M) to pH 1 and then extracted with $CH_2Cl_2$ (3×80 mL). The combined organic extracts were then washed with brine, dried and evaporated to give a white solid. Yield=6.1 g (77%). $^1$H NMR (400 MHz, $CDCl_3$): δ9.38 (1H, br. s, OH), 1.67-1.51 (6H, m, $CH_2$) and 1.20 ppm (12H, d, $^3J_{HP}$=13.8 Hz, $CH_3$). $^{13}C\{^1H\}$ NMR (101 MHz, $CDCl_3$): δ39.5 (s, $C_qCH_2$), 34.1 (d, $^1J_{CP}$=82.7 Hz, $C(CH_3)_2$), 23.7 (s, $CH_3$) and 19.2 ppm (d, $^3J_{CP}$=9.0 Hz, —$CH_2$—). $^{31}P\{^1H\}$ NMR (162 MHz, $CDCl_3$): δ62.4 ppm. HR-MS (+ve ESI): m/z (calc.) $[M+H]^+$ 191.1201; found 191.1197. Elem. Anal. Calcd for $C_9H_{19}O_2P$: C, 56.83; H, 10.07. Found: C, 56.43; H, 9.87.

Example 5: Synthesis of 2,2,6,6-tetramethylphosphaninic Chloride

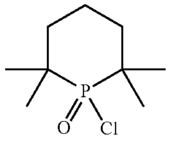

2,2,6,6-Tetramethylphosphaninic acid (1.25 g, 6.6 mmol) was dissolved in degassed $CH_2Cl_2$ (15 mL). Dimethylformamide (DMF) (5 drops) was added and oxalyl chloride (4.2 g, 32.8 mmol) was added dropwise into the reaction flask. Effervescence was observed. The reaction mixture was then stirred for 48 hours to give a clear yellow solution. The reaction mixture was dried in vacuo to obtain a brown oil. The product was extracted with pentane to give a brown oil. Yield=1.1 g (81%). $^1H$ NMR (400 MHz, $CDCl_3$): δ1.81-1.51 (6H, m, $CH_2$), 1.36 (6H, d, $^3J_{HP}$=15.8 Hz, $CH_3$) and 2.60 ppm (6H, d, $^3J_{HP}$=16.7 Hz, $CH_3$). $^{13}C\{^1H\}$ NMR (101 MHz, $CDCl_3$): δ40.2 (d, $^1J_{CP}$=59.7 Hz, $C(CH_3)_2$), 39.3 (s, $C_qCH_2$), 25.8 (d, $^2J_{CP}$=1.9 Hz, $CH_3$), 23.5 (s, $CH_3$) and 18.8 ppm (d, $^3J_{CP}$=8.9 Hz, —$CH_2$—). $^{31}P\{^1H\}$ NMR (162 MHz, $CDCl_3$): δ87.8 ppm. HR-MS (+ve ESI): m/z (calc.) $[M+H]^+$ 209.0862; found 209.0854. Elem. Anal. Calcd for $C_9H_{18}ClOP$: C, 51.80; H, 8.70. Found: C, 48.41; H, 8.52.

Example 6: Synthesis of 2,2,6,6-tetramethylphosphinane, TMP

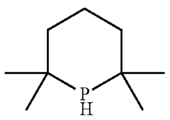

$LiAlH_4$ (3.5 g, 92.0 mmol) was suspended in diethyl ether ($Et_2O$) (120 mL) and cooled to 0° C. 2,2,6,6-Tetramethylphosphaninic chloride (8.0 g, 38.3 mmol) in $Et_2O$ (20 mL) was added dropwise over 15 minutes. After the addition the mixture was allowed to warm to RT and stirred for 16 hours. It was quenched by addition of NaOH (aq. 20%), (7 mL) at 0° C., followed by addition of DI $H_2O$ (5 mL). Drying agent ($MgSO_4$) was added and the mixture was filtered. The $Et_2O$ was removed by distillation under argon. Finally, the phosphine was purified via vacuum transfer giving a colourless liquid. Yield=2.8 g (46%). $^1H$ NMR (400 MHz, $CDCl_3$): δ2.60 (1H, d of sept. $^1J_{PH}$=200.1 Hz, and $^3J_{HP}$=1.5 Hz, PH), 1.64-1.50 (4H, m, $CH_2$), 1.23-1.13 (2H, m, $CH_2$), 1.03 (6H, dd, $^3J_{PH}$=15.3 Hz and $^4J_{HH}$=1.2 Hz, $CH_3$) and 0.94 ppm (6H, d, $^3J_{PH}$=14.1 Hz, $CH_3$). $^{13}C\{^1H\}$ NMR (101 MHz, $CDCl_3$): δ43.4 (d, $^2J_{CP}$=6.4 Hz, $C_qCH_2$), 32.6 (d, $^2J_{CP}$=13.7 Hz, $CH_3$). 27.7 (d, $^1J_{CP}$=8.9 Hz, $C(CH_3)_2$), 26.4 (d, $^2J_{CP}$=25.1 Hz, $CH_3$) and 20.9 ppm (s, —$CH_2$—). $^{31}P\{^1H\}$ NMR (162 MHz, $CDCl_3$): δ−9.1 ppm. HR-MS (+ve ESI): m/z (calc.) $[M+H]^+$159.1303; found 159.1297.

Example 7: Synthesis of 2,2,6,6-tetramethylphosphinane 1-oxide, TMP=O

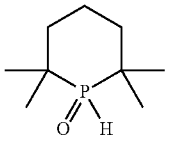

TMP (0.20 g, 1.26 mmol) was dissolved in $CH_2Cl_2$ (3 mL) and cooled to 0° C. m-CPBA (70%, aq) (0.22 g, 1.26 mmol) in $CH_2Cl_2$ (5 mL) was added slowly. After 1 hour the mixture was allowed to warm to RT and stirred for an additional hour. After this time an aliquot of $CH_2Cl_2$ (10 mL) was added and the mixture washed with saturated $NaHCO_3$ (aq) (2×10 mL). The combined aqueous portion was then backwashed with $CH_2Cl_2$ (15 mL). The combined organic phases were dried over $MgSO_4$, filtered and evaporated to yield hydroscopic colourless platelets. Yield=0.15 g (68%). $^1H$ NMR (400 MHz, $CDCl_3$): 6.18 (1H, d, $^1J_{HP}$=429.8 Hz, PH), 1.71-1.36 (6H, m, $CH_2$), 1.24 (6H, s, $^3J_{HP}$=15.3 Hz, $CH_3$) and 1.24 ppm (6 h, d, $^3J_{HP}$=12.3 Hz, $CH_3$). $^{13}C\{^1H\}$ NMR (101 MHz, $CDCl_3$): δ39.3 (d, $^2J_{CP}$=2.1 Hz, $C_qCH_2$), 33.7 (d, $^1J_{CP}$=58.0 Hz, $C(CH_3)_2$), 27.7 (d, $^2J_{CP}$=1.2 Hz, $CH_3$), 20.0 (s, $CH_3$) and 18.9 ppm (d, $^3J_{CP}$=7.6 Hz, —$CH_2$—). $^{31}P\{^1H\}$ NMR (162 MHz, $CDCl_3$): δ59.2 ppm. HR-MS (+ve ESI): m/z (calc.) $[M+H]^+$175.1252; found 175.1242. Elem. Anal. Calcd for $C_9H_{19}OP$: C, 62.05; H, 10.99. Found: C, 62.58; H, 10.77.

Example 8: Synthesis of 2,2,6,6-tetramethylphosphinane Borane Complex

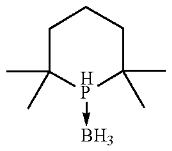

Borane dimethyl sulfide complex (2.0M in THF, 2.0 mL, 4.0 mmol) was added to TMP (0.6 g, 3.8 mmol) in THF (10 mL). After stirring for 2 hours the volatiles were removed in vacuo to yield a white solid. Yield=0.6 g (92%). $^1H$ NMR (400 MHz, $CDCl_3$): δ3.98 (1H, d of m, $^1J_{HP}$=318.1 Hz, PH), 1.83-1.55 (4H, m, $CH_2$), 1.50-1.40 (2H, m, $CH_2$), 1.20 (6H, d, $^3J_{HP}$=14.2 Hz, $CH_3$), 1.19 (6H, d, $^3J_{HP}$=15.5 Hz, $CH_3$) and 0.43 ppm (3H, br. q, $^1J_{HB}$=99.2 Hz, BH3). $^{13}C\{^1H\}$ NMR (101 MHz, $CDCl_3$): δ41.8 (d, $^2J_{CP}$=5.2 Hz, $C_qCH_2$), 30.2 (d, $^2J_{CP}$=1.7 Hz, $CH_3$), 28.0 (d, $^1J_{CP}$=29.4 Hz, $C(CH_3)_2$), 22.0 (d, $^2J_{CP}$=7.4 Hz, $CH_3$) and 19.4 ppm (d, $^3J_{CP}$=4.8 Hz, —$CH_2$—). $^{31}P\{^1H\}$ NMR (162 MHz, $CDCl_3$): δ34.3 ppm (q, $^1J_{HB}$=46.1 Hz). HR-MS (+ve ESI): m/z (calc.) $[M+H]^+$173.1630; found 173.1644. Elem. Anal. Calcd for $C_9H_{22}BP$: C, 62.83; H, 12.89. Found: C, 61.50; H, 12.60.

Example 9: Synthesis of 1-chloro-2,2,6,6-tetramethylphosphinane

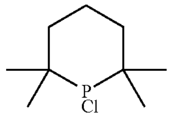

TMP (1.70 g, 10.7 mmol) was dissolved in THF (5.0 mL) and methyl trichloroacetate (1.91 g, 10.7 mmol) was added. The mixture was stirred for 16 hours whereupon the by-product methyl 2,2-dichloroacetate was removed in vacuo to give a colourless oil. $^1H$ NMR (400 MHz, $CDCl_3$): δ1.79-1.65 (2H, m, $CH_2$), 1.64-1.47 (2H, m, $CH_2$), 1.39-1.29 (2H, m, $CH_2$), 1.18 (6H, d, $^3J_{HP}$=18.1 Hz, $CH_3$) and 1.15 ppm (6H, d, $^3J_{HP}$=11.5 Hz, $CH_3$). $^{13}C\{^1H\}$ NMR (101 MHz, $CDCl_3$): δ34.2 (br. s, $C_qCH_2$), 33.3 (d, $^1J_{CP}$=32.7 Hz, $C(CH_3)_2$), 30.1 (d, $^2J_{CP}$=8.4 Hz, $CH_3$), 25.5 (d, $^2J_{CP}$=33.6 Hz, $CH_3$) and 19.8 ppm (s, —$CH_2CH_2CH_2$—). $^{31}P\{^1H\}$ NMR (162 MHz, $CDCl_3$): δ130.5 ppm. HR-MS (+ve ESI):

m/z (talc.) $[M+H]^+$193.0913; found 193.0903. Elem. Anal. Calcd for $C_9H_{18}ClP$: C, 56.11; H, 9.42. Found: C, 54.53; H, 9.11.

Example 10: Synthesis of $[(TMP)_3Pd^{(0)}]$

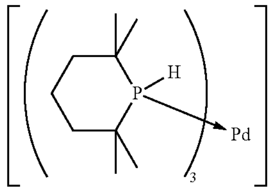

TMP in acetone (1 mL) was cooled to 0° C. A deep red solution of allyl(cyclopentadienyl)palladium(II) in acetone (1 mL) was added dropwise with a colour change to yellow. After the addition the mixture was stirred for 30 rains. The yellow solid that had formed was filtered and dried in vacuo. Yield=90 mg (67%). $^1$H NMR (400 MHz, $C_6D_6$): δ4.15 (3H, d, $^1J_{PH}$=255.7 Hz, PH), 1.84-1.63 (9H, m, $CH_2$), 1.56-1.46 (3H, m, $CH_2$), 1.44-1.33 (6H, m, $CH_2$) and 1.35-1.18 ppm (36H, m, $CH_3$). $^{13}C\{^1H\}$ NMR (101 MHz, $C_6D_6$): δ43.8 (s, $C_qCH_2$), 33.6 (s, $CH_3$), 32.1 (s, $CH_3$), 26.0 (d, $^1J_{CP}$=9.9 Hz, $C(CH_3)_2$) and 21.1 (s, $CH_2CH_2CH_2$). $^{31}$P NMR (162 MHz, $C_6D_6$): δ42.1 ($^1J_{PH}$=256 Hz) ppm. Elem. Anal. Calcd for $C_{27}H_{57}P_3Pd$: C, 55.81; H, 9.89. Found: C, 55.54; H, 9.49.

Example 11: Synthesis of 2,2,2',2',6,6,6',6'-octamethyl-1,1'-biphosphinane

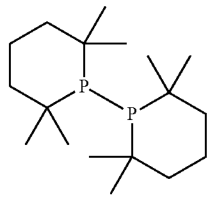 [SMILES: CC1(C)CCCC(C)(C)P1P1C(C)(C)CCCC1(C)C]

n-BuLi (2.0M in cyclohexane) (0.70 mL, 1.39 mmol) was added dropwise to a solution of TMP (0.20 g, 1.26 mmol) in THF (2 mL) at −78° C. The mixture was allowed to warm to RT and stirred for one hour. The mixture was cooled to −78° C. and dibromoethane (0.11 g, 0.57 mmol) in THF (2 mL) was added dropwise. The mixture was then allowed to warm to RT and stirred for 16 hours. After this time the volatiles were removed in vacuo and the crude solid was extracted with pentane (2×10 mL). The pentane was evaporated to yield a white solid. $^1$H NMR (400 MHz, $CDCl_3$): δ1.92-1.29 (12H, m, $CH_2$), 1.48 (12H, br. s, $CH_3$) and 1.19 ppm (12H, t, $^3J_{CP}$=9.0 Hz, $CH_3$). $^{13}C\{^1H\}$ NMR (101 MHz, $CDCl_3$): δ45.3 (t, $|^2J_{CP}+^3J_{CP}|$=6.8 Hz, $C_qCH_2$), 33.4 (t, $|^1J_{CP}+^2J_{CP}|$=15.0 Hz), 33.3 (t, $|^2J_{CP}+^3J_{CP}|$=9.0 Hz, $CH_3$), 28.2 (s, $CH_3$) and 20.3 ppm (s, —$CH_2$—). $^{31}P\{^1H\}$ NMR (162 MHz, $CDCl_3$): δ19.1 ppm. HR-MS (+ve ESI): m/z (calc.) $[M+H]^+$315.2371; found 315.2466.

Example 12: Synthesis of 1,3-bis(2,2,6,6-tetramethylphosphinan-1-yl)propane, BTMPPr

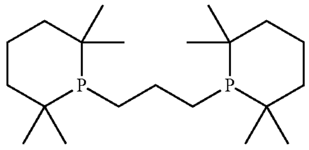 [SMILES: CC1(C)CCCC(C)(C)P1CCCP1C(C)(C)CCCC1(C)C]

TMP (1.0 g, 6.32 mmol) was dissolved in THF (15 mL). $^n$BuLi (2.0M in cyclohexane, 3.5 mL, 6.95 mmol) was added dropwise at −78° C. and allowed to warm to RT. 1,3-Dibromopropane (0.57 g, 2.84 mmol) was dissolved in THF and added dropwise at −78° C. and allowed to warm to RT and stirred for 16 hours. After this time the volatiles were removed in vacuo to give a dark olive green oil. The crude product was extracted with pentane (2×20 mL), passed through a glass filter and the volatiles removed in vacuo to give an off-white waxy solid. The product was then dissolved in $CH_2Cl_2$ (10 mL) and filtered through a plug of silica. The volatiles were removed in vacuo to yield a translucent oil. Yield=0.96 g (95%). $^1$H NMR (400 MHz, $CDCl_3$): δ2.08-1.33 (18H, m, $CH_2$), 1.10 (12H, d, $^3J_{HP}$=17.0 Hz, $CH_3$) and 1.04 ppm (12H, d, $^3J_{HP}$=6.7 Hz, $CH_3$). $^{13}C\{^1H\}$ NMR (101 MHz, $CDCl_3$): δ40.2 (br s, $C_qCH_2$), 31.5 (d, $^2J_{CP}$=26.4 Hz, $CH_3$), 29.1 (d, $^2J_{CP}$=14.7 Hz, $C(CH_3)_2$), 28.8 (t, $^2J_{CP}$=22.8 Hz, —$CH_2CH_2P$), 26.2 (br s, $CH_3$), 22.7 (dd, $^1J_{CP}$=22.4 Hz, $^3J_{CP}$=12.6 Hz, $CH_2P$) and 20.4 ppm (s, $C_qCH_2CH_2CH_2$). $^{31}P\{^1H\}$ NMR (162 MHz, $CDCl_3$): δ8.04 ppm. Elem. Anal. Calcd for $C_{21}H_{42}P_2$: C, 70.75; H, 11.87. Found: C, 70.56; H, 11.84.

Example 13: Synthesis of 1,2-bis((2,2,6,6-tetramethylphosphinan-1-yl)methyl)benzene, BTMPX

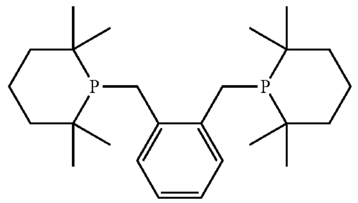 [SMILES: CC1(C)CCCC(C)(C)P1Cc1ccccc1CP1C(C)(C)CCCC1(C)C]

$^n$BuLi (2.0M in cyclohexane, 1.9 mL, 3.84 mmol) was slowly added to 2,2,6,6-tetramethylphosphinane borane complex (0.6 g, 3.49 mmol) at −78° C. and allowed to warm to RT. After stirring for 1 hour, 1,5-dihydrobenzo[e][1,3,2]dioxathiepine 3,3-dioxide was dissolved in THF (2.5 mL) and added dropwise into the reaction mixture at −78° C., the reaction mixture was allowed to warm to RT and stirred for 16 hours. The resulting yellow solution was dried in vacuo to give a yellow-white solid. The crude product was washed with methanol and dried in vacuo. It was then taken up in $CH_2Cl_2$ (50 mL) and washed with $H_2O$ (2×50 mL). Pyrrolidine (5 mL) was added and then the mixture was heated to 55° C. for 16 hours. The volatiles were removed in vacuo to give a white solid. The product was then recrystallized from MeOH to yield white crystals. Yield=0.49 g (75%). $^1$H NMR (400 MHz, $CDCl_3$): δ7.44-7.37 (2H, m, ArH), 7.09-7.01 (2H, m, ArH), 3.09 (4H, s, $CH_2$), 1.62-1.40 (12H, m, $CH_2$), 1.18 (12H, d, $^3J_{HP}$=4.88 Hz, $CH_3$) and 0.92 ppm (12H, d, $^{3}J_{HP}$=17.5 Hz, $CH_3$). $^{13}C\{^{1}H\}$ NMR (101 MHz, $CDCl_3$): δ138.1 (dd, $^{2}J_{CP}$=7.5 Hz, $^{3}J_{CP}$=2.9 Hz, $ArC_q$), 131.2 (d, $^{3}J_{CP}$=40.4 Hz, ArC), 125.6 (d, $^{4}J_{CP}$=1.7 Hz, ArC), 41.8 (br. s., $CH_2CH_2CH_2$), 32.0 (d, $^{2}J_{CP}$=25.8 Hz, $CH_3$), 30.1 (d, $^{1}J_{CP}$=17.8 Hz, $C(CH_3)_2$), 26.1 (dd, $^{1}J_{CP}$=26.8 Hz, $^{4}J_{CP}$=7.4 Hz, $CH_2P$), 24.9 (br. s., $CH_3$) and 20.4 ppm (d, $^{3}J_{CP}$=1.8 Hz, $CH_2CH_2CH_2$). $^{31}P\{^{1}H\}$ NMR (162 MHz, $CDCl_3$): δ10.2 ppm. HR-MS (+ve ESI): m/z (talc.) $[M+H]^+$419.2997; found 419.2993. Elem. Anal. Calcd for $C_{26}H_{44}P_2$: C, 74.61; H, 10.60. Found: C, 74.03; H, 10.42.

Example 14: Synthesis of 1,3-bis((2,2,6,6-tetramethylphosphinan-1-yl)methyl)benzene, $^{TMP}$(PCP)

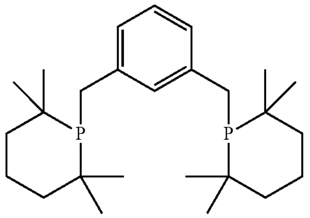 [SMILES: CC1(C)CCCC(C)(C)P1Cc1cccc(CP2C(C)(C)CCCC2(C)C)c1]

TMP (0.30 g, 1.89 mmol) and α,α'-dibromo-m-xylene (0.23 g, 0.85 mmol) were mixed together in MeOH (8 mL). After stirring for 16 hours, triethylamine ($NEt_3$) (0.20 g, 0.26 mL, 1.89 mmol) was added giving a white precipitate which was filtered and dried. A second crop was obtained by placing the filtrate in the freezer at −20° C. $^{1}H$ NMR (400 MHz, $CDCl_3$): 7.30 (1H, br s, ArH), 7.14 (3H, br s, ArH), 2.80 (4H, d, $^{2}J_{HP}$=1.9 Hz, $CH_2$), 1.66-1.34 (12H, m, $CH_2$), 1.13 (12H, d, $^{3}J_{HP}$=5.3 Hz, $CH_3$), 0.93 (12H, d, $^{3}J_{HP}$=17.4 Hz, $CH_3$). $^{13}C\{^{1}H\}$ NMR (101 MHz, $CDCl_3$): 140.5 (d, $^{3}J_{CP}$=9.8 Hz, ArC), 130.7 (t, $^{4}J_{CP}$=7.2 Hz, ArC), 128.3 (s, ArC), 126.9 (dd, $^{2}J_{CP}$=8.1 Hz, $^{4}J_{CP}$=2.1 Hz, $ArC_q$), 41.1 (br s, $CH_2$), 31.6 (d, $^{1}J_{CP}$=25.8 Hz, $C(CH_3)_2$), 29.8 (d, $^{2}J_{CP}$=16.9 Hz, $CH_3$), 27.7 (d, $^{1}J_{CP}$=25.2 Hz, $CH_2P$), 25.4 (br s, $CH_3$) and 20.4 ppm (d, $^{3}J_{CP}$=1.6 Hz, $CH_2CH_2CH_2$). $^{31}P\{^{1}H\}$ NMR (162 MHz, $CDCl_3$): 16.7 δppm. HR-MS (+ve ESI): m/z (caic.) $[M+H]^+$419.2297; found 419.2290. Elem. Anal. Calcd for $C_{26}H_{44}P_2$: C, 74.61; H, 10.60. Found: C, 73.81; H, 10.43.

Example 15: Synthesis of 2,6-Bis((2,2,6,6-tetramethylphosphinan-1-yl)methyl)pyridine, $^{TMP}$(PNP)

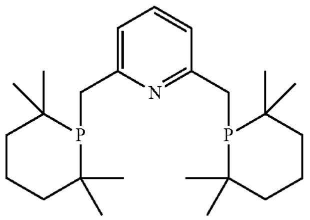 [SMILES: CC1(C)CCCC(C)(C)P1Cc1cccc(CP2C(C)(C)CCCC2(C)C)n1]

Method A: 2,6-Lutidine (0.13 g, 0.14 mL, 1.2 mmol) was dissolved in $Et_2O$ (2 mL) and the mixture cooled to 0° C. $^{n}$BuLi (2.0 M in hexanes, 1.4 mL, 2.8 mmol) was added dropwise. The orange mixture was heated at 40° C. for 20 hours. After this time it was cooled to −78° C. and 1-chloro-2,2,6,6-tetramethylphosphinane (0.50 g, 2.6 mmol) in $Et_2O$ (1 mL) was added dropwise. The dark brown mixture was allowed to warm to RT. MeOH (6 mL) was added then the volatiles were removed in vacuo. $Et_2O$ was added (4 mL) and the mixture was then passed through a glass filter, then evaporated to yield a crude orange solid. $^{31}P\{^{1}H\}$ NMR (162 MHz, $CDCl_3$): δ17.4 ppm. HR-MS (+ve ESI): m/z (talc.) $[M+H]^+$420.2949; found 420.2941.

Method B: n-BuLi (2.0M in cyclohexane) was added dropwise to TMP (0.40 g, 2.53 mmol) in THF (4 mL) at −78° C. and stirred at RT for 1 hour. After this time the mixture was again cooled to −78° C. and 2,6-bis(tosyloxymethyl) pyridine (0.51 g, 1.14 mmol) was added dropwise. The mixture was then allowed to warm to RT and stirred for 16 hours. After this time the mixture was evaporated to dryness, washed with MeOH (3×10 mL) and dried in vacuo. Yield=0.27 g (57%).

$^{1}H$ NMR (400 MHz, $CDCl_3$): δ7.45 (1H, t, $^{3}J_{HH}$=7.7 Hz, ArH), 7.21 (2H, d, $^{3}J_{HH}$=7.7 Hz, ArH), 2.99 (4H, d, $^{2}J_{CP}$=2.8 Hz, $CH_2P$), 1.65-1.37 (12H, m, $CH_2$), 1.14 (12H, d, $^{3}J_{HP}$=6.2 Hz, $CH_3$) and 0.97 ppm (12H, d, $^{3}J_{HP}$=17.5 Hz, $CH_3$). $^{31}P\{^{1}H\}$ NMR (162 MHz, $CDCl_3$): δ17.4 ppm. $^{13}C\{^{1}H\}$ NMR (101 MHz, $CDCl_3$): δ160.4 (d, $^{2}J_{CP}$=12.0 Hz, $ArC_q$), 136.2 (s, ArC), 120.9 (dd, $^{3}J_{CP}$=9.5 Hz, $^{5}J_{CP}$=1.3 Hz, ArC), 40.4 (br. s, $CCH_2$), 31.2 (d, $^{2}J_{CP}$=27.8 Hz, $CH_3$), 30.9 (d, $^{1}J_{CP}$=25.6 Hz, $CH_2P$) 29.8 (d, $^{1}J_{CP}$=16.3 Hz, $C(CH_3)_2$), 26.2 (br. s, $CH_3$) and 20.4 ppm (d, $^{3}J_{CP}$=0.9 Hz, $-CH_2-$). HR-MS (+ve ESI): m/z (calc.) $[M+H]^+$420.2949; found 420.2945. Elem. Anal. Calcd for $C_{25}H_{43}NP_2$: C, 71.57; H, 10.33; N, 3.34. Found: C, 68.82; H, 9.27; N, 3.19.

Example 16: Synthesis of N2,N6-bis(2,2,6,6-tetramethylphosphinan-1-yl)pyridine-2,6-diamine, $^{TMP}$($PN^3P$)

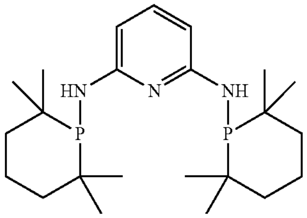 [SMILES: CC1(C)CCCC(C)(C)P1Nc1cccc(NP2C(C)(C)CCCC2(C)C)n1]

$NEt_3$ (0.6 mL, 4.0 mmol) was added to 2,6-diaminopyridine (0.2 g, 1.9 mmol) in toluene (5 mL). The mixture was then cooled down to 0° C. and 1-chloro-2,2,6,6-tetramethylphosphinane was added (0.8 g, 4.0 mmol). n-BuLi (2.0 mL, 4.0 mmol) was added after the mixture was further cooled down to −78° C. The mixture was heated to 80° C. and stirred for 16 hours. After that, the reaction mixture was filtered and the volatiles were removed in vacuo. It was then recrystallised with pentane at −40° C. to yield a white solid. Yield=0.2 g (30%). $^{1}H$ NMR (400 MHz, $CDCl_3$): δ7.26 (1H, t, $^{3}J_{HH}$=8.0 Hz, CH), 6.49 (2H, d, $^{3}J_{HH}$=8.0 Hz, CH), 4.50 (2H, d, $^{2}J_{HP}$=11.1 Hz, NH), 1.57 (8H, m, $CH_2$), 1.44 (4H, m, $CH_2$), 1.15 (12H, d, $^{3}J_{HP}$=17.5 Hz, $CH_3$) and 1.01 ppm (12H, d, $^{3}J_{HP}$=11.1 Hz, $CH_3$). $^{13}C\{^{1}H\}$ NMR (101 MHz, $CDCl_3$): δ159.9 (d, $^{2}J_{CP}$=20.9 Hz, ArC), 139.0 (t, $^{4}J_{CP}$=2.1 Hz, ArC), 98.6 (d, $^{3}J_{CP}$=19.6 Hz, ArC), 36.1 (s, $CH_2$), 31.5 (d, $^{1}J_{CP}$=13.1 Hz, $C_q$), 28.9 (d, $^{2}J_{CP}$=8.1 Hz, $CH_3$), 26.8 (d, $^{2}J_{CP}$=31.0 Hz, $CH_3$) and 20.0 ppm (s, $CH_2$). $^{31}P\{^{1}H\}$ NMR (162 MHz, $CDCl_3$): δ42.3 ppm. HR-MS (+ve ESI): m/z (calc.) $[M+H]^+$422.2854; found 422.2854. Elem. Anal. Calcd for $C_{23}H_{41}N_3P_2$: C, 65.53; H, 9.80; N, 9.97. Found: C, 65.38; H, 9.58; N, 9.86.

Example 17: Synthesis of 2,6-bis((7,7,9,9-tetramethyl-1,4-dioxa-8-phosphaspiro[4.5]decan-8-yl)methyl)pyridine, $^{TMPA}$(PNP)

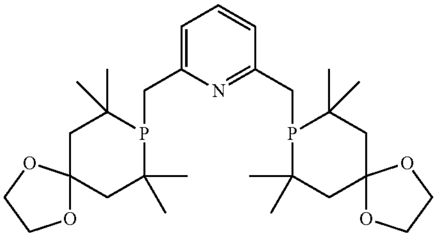 [SMILES: CC1(C)CC2(CC(C)(C)P1Cc1cccc(CP3C(C)(C)CC4(CC3(C)C)OCCO4)n1)OCCO2]

n-BuLi (3.7 mL, 6.6 mmol) was added dropwise to 4,4-(ethylenedioxy)-2,2,6,6-tetramethylphosphinane-borane (1.5 g, 6.6 mmol) in THF (15 mL) at −78° C. The mixture was then warmed to room temperature and stirred for 1 hour. After that, 2,6-bis(chloromethyl)pyridine (0.5 g, 3.0 mmol) was added dropwise to the mixture at −78° C. and stirred at room temperature for 16 hours. The volatiles was removed in vacuo. Pyrrolidine (15 mL) was added, and the mixture was heated at 55° C. for 16 hours. The reaction mixture was cooled down, the volatiles were removed in vacuo and the crude material was washed with MeOH (3×10 mL) to yield a white solid. Yield=1.4 g (86%). $^1$H NMR (400 MHz, $CDCl_3$): δ7.46 (1H, t, $^3J_{HH}$=7.7 Hz, CH), 7.19 (2H, d, $^3J_{HH}$=7.7 Hz, CH), 3.91 (8H, m, $OCH_2$), 2.99 (4H, d, $^2J_{HP}$=3.0 Hz, $CH_2$), 1.68 (8H, m, $CH_2$), 1.22 (12H, d, $^3J_{HP}$=7.1 Hz, $CH_3$) and 1.06 ppm (12H, d, $^3J_{HP}$=17.3 Hz, $CH_3$). $^{13}C\{^1H\}$ NMR (101 MHz, $CDCl_3$): δ160.3 (d, $^2J_{CP}$=12.4 Hz, $ArC_q$), 136.3 (s, ArC), 120.9 (dd, $^3J_{CP}$=8.0 Hz, $^5J_{CP}$=1.3 Hz, ArC), 110.3 (s, $O_2C_q$), 64.0 (d, $^5J_{CP}$=16.9 Hz, $CH_2O$), 46.2 (d, $^2J_{CP}$=3.4 Hz, $CCH_2$), 31.4 (d, $^1J_{CP}$=26.6 Hz, $C(CH_3)_2$). 31.1 (d, $^2J_{CP}$=16.6 Hz, $CH_3$), 30.7 (d, $^1J_{CP}$=25.4 Hz, $CH_2P$) and 27.4 ppm (s, $CH_3$). $^{31}P\{^1H\}$ NMR (162 MHz, $CDCl_3$): δ13.0 ppm. HR-MS (+ve ESI): m/z (calc.) $[M+H]^+$536.3059; found 536.3056. Elem. Anal. Calcd for $C_{29}H_{47}NO_4P_2$: C, 65.03; H, 8.84; N, 2.61. Found: C, 64.85; H, 8.52; N, 2.91.

Example 18: Synthesis of 1-([1,1'-biphenyl]-2-yl)-2,2,6,6-tetramethylphosphinane Synthesis of [1,1'-biphenyl]-2-yl trifluoromethanesulfonate

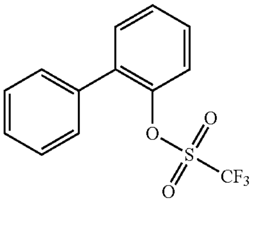 [SMILES: O=S(=O)(Oc1ccccc1-c1ccccc1)C(F)(F)F]

2-Phenylphenol (3.0 g, 17.6 mmol) was weighed and dissolved in $CH_2Cl_2$ (150 mL). Pyridine (4.2 g, 52.9 mmol) was added into the reaction mixture. The mixture was cooled to 0° C. and trifluoromethylsulfonic anhydride (9.9 g, 35.2 mmol) was added dropwise. After the addition the mixture was allowed to warm to RT and stirred for 16 hours. Dilute HCl (2.0M aq) (150 mL), followed by extraction with $CH_2Cl_2$ (3×50 mL). The combined organic layers were washed with deionised water (100 mL) and brine solution (100 mL) to give a clear dark brown solution. The organic phase was dried over $MgSO_4$ and solvent was removed in vacuo to yield a dark brown oil. The crude product was purified via column chromatography. Yield=5.7 g (quantitative). $^1$H NMR (400 MHz, $CDCl_3$): δ7.34-7.56 ppm (9H, m, ArH). $^{13}C\{^1H\}$ NMR (101 MHz, $CDCl_3$): δ147.0 (ArCO—) 135.7 (s, ArC), 132.1 (s, ArC), 129.5 (s, ArC), 129.1 (s, ArC), 128.7 (s, ArC), 128.6 (s, ArC), 128. (s, ArC) and 122.2 (s, ArC) and 118.5 ppm (q, $^1J_{CF}$=320.5 Hz CF3). HR-MS (+ve ESI): m/z (calc.) $[M+H]^+$303.0303; found 303.0297.

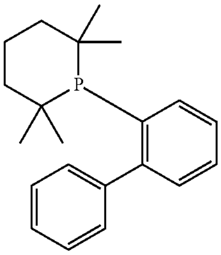 [SMILES: CC1(C)CCCC(C)(C)P1c1ccccc1-c1ccccc1]

TMP (0.37 g, 2.23 mmol), [1,1'-biphenyl]-2-yl trifluoromethanesulfonate (0.50 g, 1.65 mmol), DBU (0.50 g, 3.31 mmol), $Pd(OAc)_2$ (2.0 mg, 0.01 mmol) were weighed and dissolved in toluene (5 mL) and heated at 110° C. for 16 hours. Toluene (5 mL) was added to the resulting solution, and it was washed three times with degassed DI water and dried over $MgSO_4$. The filtrate was evacuated to dryness in vacuo to give a yellow semi-solid. The crude product was recrystallized from MeOH at −20° C. (freezer) over 1 hour. The resulting crystals were dried in vacuo. Yield=0.22 g (43%). $^1$H NMR (400 MHz, $CDCl_3$): δ7.97 (1H, dt, $^3J_{HH}$=7.4 Hz, $^4J_{HP}$=1.6 Hz, ArH), 7.38-7.19 (8H, m, ArH), 1.95-1.82 (2H, m, $C_qCH_2$), 1.77-1.64 (2H, m, $—CH_2CH_2CH_2—$), 1.48-1.37 (2H, m, $C_qCH_2$), 1.11 (6H, d, $CH_3$, $^3J_{PH}$=19.2 Hz) and 0.87 ppm (6H, d, $^3J_{PH}$=9.4 Hz, $CH_3$). $^{13}C\{^1H\}$ NMR (101 MHz, $CDCl_3$): δ151.9 (d, $^2J_{CP}$=33.9 Hz, $ArC_q$), 144.0 (d, $^3J_{CP}$=7.9 Hz, $ArC_q$), 136.0 (d, $^1J_{CP}$=31.4 Hz, $ArC_q$), 134.9 (d, $^3J_{CP}$=4.2 Hz, ArCH), 130.9 (d, $^2J_{CP}$=4.2 Hz, ArCH), 130.8 (d, $^3J_{CP}$=5.1 Hz, ArCH), 128.3 (s, ArCH), 127.3 (s, ArCH), 126.5 (s, ArCH), 126.1 (s, ArCH), 37.9 (s, $C_qCH_2$), 31.3 (d, $^2J_{CP}$=35.7 Hz, $CH_3$), 30.3 (d, $^2J_{CP}$=6.3 Hz, $CH_3$), 30.0 (d, $^1J_{CP}$=18.4 Hz, $C(CH_3)_2$) and 20.4 ppm (s, $^{31}P\{^1H\}$ NMR (162 MHz, $CDCl_3$): δ−2.4 ppm. HR-MS (+ve ESI): m/z (calc.) $[M+H]^+$ 311.1929; found 311.1922. Elem. Anal. Calcd for $C_{21}H_{27}P$: C, 81.25; H, 8.77. Found: C, 80.31; H, 8.27.

Example 19: Synthesis of [$^{TMP}$($PN^3P$)Ru(CO)(Cl)H]

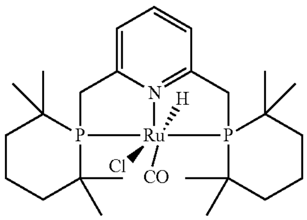

Carbonylchlorohydridotris(triphenylphosphine)ruthenium(II) (221 mg, 0.23 mmol) and $^{TMP}$(PNP) ligand (120 mg, 0.29 mmol) were stirred at 65° C. for 16 hours. It was then cooled to RT and reduced in volume to approximately 1 mL. Diethyl ether (5 mL) was added to precipitate a pale yellow solid which was filtered, washed with more diethyl ether (2×5 mL) and dried in vacuo. Yield=0.11 g (81%). $^1$H NMR (400 MHz, $CDCl_3$): δ7.45 (1H, t, $^3J_{HH}$=7.7 Hz, ArH), 1.14 (2H, d, $^3J_{HH}$=7.7 Hz, ArH), 3.98 (2H, dt, $^2J_{HH}$=16.5 Hz, $|^2J_{HP}+^4J_{HP}|$=3.4 Hz, $CH_2P$), 3.47 (2H, dt, $^2J_{HH}$=16.5 Hz, $|^2J_{HP}+^4J_{HP}|$=3.6 Hz, $CH_2P$), 1.82-1.53 (12H, m, $CH_2$), 1.59 (6H, t, $|^3J_{HP}+^5J_{HP}|$=8.2 Hz, $CH_3$), 1.48 (6H, $|^3J_{HP}+^5J_{HP}|$=6.7 Hz, $CH_3$), 1.39 (6H, $|^3J_{HP}+^5J_{HP}|$=7.8 Hz, $CH_3$), 0.84 (6H, $|^3J_{HP}+^5J_{HP}|$=6.6 Hz, $CH_3$) and −15.1 ppm (1H, t, $^2J_{HP}$=19.2 Hz, Ru—H). $^{13}C\{^1H\}$ NMR (101 MHz, $CDCl_3$): δ209.0 (t, $^2J_{CP}$=11.7 Hz, C═O), 163.6 (t, $^2J_{CP}$=5.2 Hz, $ArC_q$), 137.0 (s, ArC), 119.8 (t, $^3J_{CP}$=4.5 Hz, ArC), 40.7 (s, $C_qCH_2$), 38.3 (s, $C_qCH_2$), 37.0 (t, $^1J_{CP}$=6.6 Hz, $CH_2P$), 36.1 (t, $^1J_{CP}$=7.3 Hz, $C(CH_3)_2$), 33.6 (t, $^1J_{CP}$=11.0 Hz, $C(CH_3)_2$), 30.7 (s, $CH_3$), 29.9 (s, $CH_3$), 27.4 (t, $^2J_{CP}$=7.2 Hz, $CH_3$), 27.0 (t, $^2J_{CP}$=6.4 Hz, $CH_3$) and 19.6 ppm (s, —$CH_2$—). $^{31}P\{^1H\}$ NMR (162 MHz, $CDCl_3$): δ70.6 ppm. HR-MS (+ve ESI): m/z (talc.) $[M-Cl]^+$550.1942; found 550.1944. Elem. Anal. Calcd for $C_{26}H_{44}ClNOP_2Ru$: C, 53.37; H, 7.58; N, 2.39. Found: C, 51.85; H, 7.085; N, 1.93.

Example 20: Synthesis of [$^{TMP}$(PN$^3$P)Ru(CO)(Cl)H]

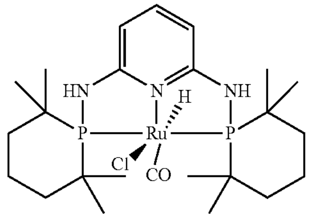

Carbonylchlorohydridotris(triphenylphosphine)ruthenium(II) (271 mg, 0.29 mmol) and $^{TMP}$(PN$^3$P) ligand (150 mg, 0.36 mmol) were heated at 65° C. in THF (5 mL) for 16 hours. After cooling the white precipitate was filtered, washed with diethyl ether (2×5 mL) and dried in vacuo. Yield=94 mg (56%). $^1$H NMR (400 MHz, CD3CN): δ8.52 (2H, s, NH), 7.16 (1H, t, $^3J_{HH}$=8.0 Hz, ArH), 6.72 (2H, t, $^3J_{HH}$=8.0 Hz, ArH), 2.41 (2H, t, $^3J_{HH}$=11.4 Hz, $CH_2$), 2.18 (2H, t, $^3J_{HH}$=11.6 Hz, $CH_2$), 1.77 (2H, q, $^3J_{HH}$=12.8 Hz, $CH_2$), 1.69-1.57 (6H, m, $CH_2$), 1.51 (6H, t, $|^2J_{HP}+^4J_{HP}|$=9.5 Hz, $CH_3$), 1.28 (6H, t, $|^2J_{HP}+^4J_{HP}|$=9.2 Hz, $CH_3$), 1.23 (6H, t, $|^2J_{HP}+^4J_{HP}|$=7.0 Hz, $CH_3$), 1.27 (6H, t, $|^2J_{HP}+^4J_{HP}|$=7.2 Hz, $CH_3$), and −14.4 ppm (1H, t, $^2J_{HP}$=20.0 Hz, Ru—H). $^{13}C\{^1H\}$ NMR (101 MHz, CD3CN): δ206.8 (t, $^2J_{CP}$=10.2 Hz, Ru—C═O), 162.5 (t, $^2J_{CP}$=7.1 Hz, $ArC_q$), 140.2 (s, ArC), 99.4 (t, $^3J_{CP}$=Hz, ArC), 39.7 (s, $C_qCH_2$), 37.7 (s, $C_qCH_2$), 37.7 (t, $|^1J_{CP}+^3J_{CP}|$=11.9 Hz, $C(CH_3)_2$), 37.4 (t, $|^1J_{CP}+^3J_{CP}|$=9.7 Hz, $C(CH_3)_2$), 29.3 (s, $CH_3$), 29.0 (s, $CH_3$) 27.2 (t, $^2J_{CP}$=10.1 Hz, $CH_3$), 25.8 (t, $^2J_{CP}$=8.4 Hz, $CH_3$) and 19.9 ppm (s, —$CH_2$—). $^{31}P\{^1H\}$ NMR (162 MHz, CD3CN): δ123.8 ppm. Elem. Anal. Calcd for $C_{24}H_{42}ClN_3OP_2Ru$: C, 49.10; H, 7.21; N, 7.16. Found: C, 48.06; H, 7.15; N, 6.72.

Example 21: Synthesis of [$^{TMPA}$(PNP)Ru(CO)(Cl)H]

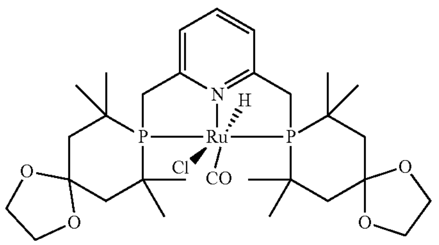

Carbonylchlorohydridotris(triphenylphosphine)ruthenium(II) (0.71 g, 0.74 mmol) and $^{TMPA}$(PNP) ligand (0.50 g, 0.93 mmol) were heated at 60° C. in THF (12 mL) for 16 hours. After cooling a white precipitate was observed which was filtered, washed with diethyl ether (2×12 mL) and dried in vacuo. Yield=0.42 g (80%). $^1$H NMR (400 MHz, $CDCl_3$): δ7.47 (1H, t, $^3J_{HH}$=7.7 Hz, ArH), 7.14 (2H, d, $^3J_{HH}$=7.8 Hz, ArH), 4.08-4.00 (4H, m, $CH_2O$), 3.99 (2H, dt, $^2J_{HH}$=16.7 Hz, $|^2J_{HP}+^4J_{HP}|$=3.3 Hz, $CH_2P$), 3.93-3.85 (4H, m, $CH_2O$), 3.45 (2H, dt, $^2J_{HH}$=16.7, $|2J_{HP}+^4J_{HP}|$=3.6 Hz, $CH_2P$), 1.99-1.75 (8H, m, $CCH_2$), 1.72 (6H, t, $|^3J_{HP}+^5J_{HP}|$=8.4 Hz, $CH_3$), 1.53 (6H, $|^3J_{HP}+^5J_{HP}|$=6.6 Hz, $CH_3$), 1.52 (6H, $|^3J_{HP}+^5J_{HP}|$=8.1 Hz, $CH_3$) and 0.89 ppm (6H, $|^3J_{HP}+^5J_{HP}|$=6.6 Hz, $CH_3$). $^{13}C\{^1H\}$ NMR (101 MHz, $CDCl_3$): δ208.3 (t, $^2J_{CP}$=11.7 Hz, Ru—C═O), 163.3 (t, $^2J_{CP}$=5.2 Hz, $ArC_q$), 137.2 (s, ArC), 119.9 (t, $^3J_{CP}$=4.5 Hz, ArC), 108.8 (s, $O_2C_q$), 65.3 (s, $CH_2O$), 63.2 (s, $CH_2O$), 46.8 (s, $C_qCH_2$), 44.7 (s, $C_qCH_2$), 37.2 (t, $^1J_{CP}$=6.5 Hz, $CH_2P$), 36.9 (t, $^1J_{CP}$=7.4 Hz, $C(CH_3)_2$), 34.4 (t, 1J=11.0 Hz, $C(CH_3)_2$), 31.1 (s, $CH_3$), 30.4 (s, $CH_3$), 28.2 (t, $^2J_{CP}$=7.2 Hz, $CH_3$) and 27.7 ppm (t, $^2J_{CP}$=6.4 Hz, $CH_3$). $^{31}P\{^1H\}$ NMR (162 MHz, $CDCl_3$): δ67.3 ppm. HR-MS (+ve ESI): m/z (calc.) $[M-Cl]^+$ 666.2051; found 666.2057. Elem. Anal. Calcd for $C_{30}H_{48}ClNO_5P_2Ru$: C, 51.39; H, 6.90; N, 2.00. Found: C, 51.05; H, 7.07; N, 1.86.

Example 22: Synthesis of [(BTMPX)$PdCl_2$]

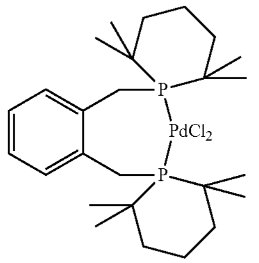

BTMPX (0.20 g, 0.50 mmol) and $[Pd(dba)_2]$ (0.27 g, 0.50 mmol) were mixed together in $CH_2Cl_2$ (5 mL). After 90 minutes HCl (2.0M in $Et_2O$, 0.5 mL) was added and air was introduced into the reaction flask. After stirring for 16 hours the mixture was passed through a glass filter and reduced in volume to ~3 mL. $Et_2O$ (10 mL) was added which precipitated a yellow solid which was filtered and washed with $Et_2O$ (2×10 mL) and then dried in vacuo. Yield=1.30 g (44%). $^1$H NMR (400 MHz, $CDCl_3$): δ7.61-7.16 (2H, m, ArH), 7.16-6.72 (2H, m, ArH), 3.89-3.05 (4H, m, $CH_2$), 3.35-2.38 (4H, m, $CH_2$), 2.31-0.06 ppm (24H, m). $^{13}C\{^1H\}$ NMR (101 MHz, $CDCl_3$): δ133.9 (br. s, $ArC_q$), 133.3 (br. s, ArCH), 127.6 (br. s, ArCH), 40.4 (br. s, $CH_2CH_2CH_2$), 37.6 (br. s, $C(CH_3)_2$), 33.3 (br. s, $CH_3$), 29.4 (br. s, $CH_3$) and 19.5 ppm (br. s, $CH_2CH_2CH_2$). $^{31}P\{^1H\}$ NMR (162 MHz, $CDCl_3$): δbr s 28.4 ppm. Elem. Anal. Calcd for $C_{26}H_{44}Cl_2P_2Pd$: C, 52.41; H, 7.44. Found: C, 51.32; H, 7.30.

Example 23: Synthesis of [(BTMPX)Pd($O_2CCF_3$)$_2$]

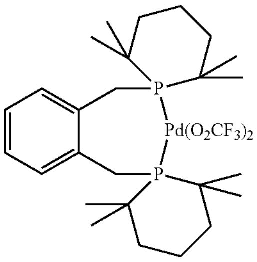

[(BTMPX)$PdCl_2$] (0.10 g, 0.17 mmol) was dissolved in $CH_2Cl_2$ (5 mL) to give a clear deep orange solution. To this was added [Ag($O_2CCF_3$)$_2$] (0.089 g, 0.41 mmol) which gave a yellow solution. After 16 hours the mixture was passed through a glass filter and reduced in volume to ~1 mL. Pentane (3 mL) was added which precipitated a yellow powder which was dried in vacuo. Single crystals suitable for X-ray diffraction were grown via a vapour diffusion of pentane into a saturated solution of the compound in $CH_2Cl_2$. $^1H$ NMR (400 MHz, $CDCl_3$): δ7.50-7.40 (2H, m, ArH), 7.40-7.20 (2H, m, ArH), 3.24 (4H, d, $^2J_{HP}$=12.1 Hz, $CH_2P$), 2.35 (4H, m, $CH_2$) and 1.94-1.06 ppm (32H, m). $^{13}C\{^1H\}$ NMR (101 MHz, $CDCl_3$): δ162.2 (q, $^2J_{CF}$=36.36 Hz, $CO_2CF3$), 128.2 (s, ArCH), 115.9 (q, $^1J_{CF}$=291.3 Hz, CF3), 38.7 (s, $C_qCH_2$), 37.0 (d, $^1J_{CP}$=17.2 Hz, $C(CH_3)_2$), 32.3 (br. s, $CH_3$), 27.9 (s, $CH_3$), 27.5 (d, $^1J_{CP}$=18.0 Hz, $CH_2P$) and 19.0 ppm (br. s, $CH_2CH_2CH_2$). $^{31}P\{^1H\}$ NMR (162 MHz, $CDCl_3$): δ32.3 ppm. $^{19}F\{^1H\}$ NMR (376 MHz, $CDCl_3$): δ-75.5 ppm (s, CF3).

Example 24: Synthesis of [TMP(PCP)Ir(H)Cl]

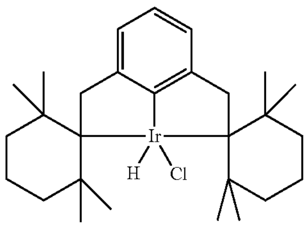

$^{TMP}$(PCP) (60 mg, 0.14 mmol) and [(COD)IrCl]2 (43.7 mg, 0.065 mmol) were dissolved in toluene (2 mL) and heated to 120° C. giving a deep red solution. $^1H$ NMR (400 MHz, $CDCl_3$): δ6.95 (2H, d, $^3J_{HH}$=6.9 Hz, ArCH), 6.74 (1H, t, $^3J_{HH}$=7.6 Hz, ArCH), 3.38-3.09 (4H, m, $CH_2$), 2.35-2.02 (4H, m, —$CH_2$—), 1.89-1.43 (8H, m, $CH_2$) 1.39-1.31 (6H, m, $CH_3$), 1.30-1.16 (12H, m, $CH_3$), 1.15-1.07 (6H, m, $CH_3$), −40.44 ppm (1H, s, Ir—H). $^{31}P\{^1H\}$ NMR (162 MHz, $CDCl_3$): δ32.3 ppm.

Example 25: Synthesis of [(acac)Rh(CO)(Phenyl phosphinane)]

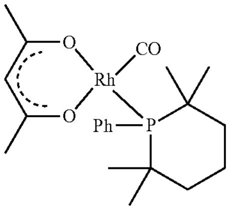

Phenyl phosphinane (0.10 g, 0.42 mmol), was dissolved in $CH_2Cl_2$ (5 mL). [(acac)Rh(CO)$_2$] (0.11 g, 0.42 mmol) was dissolved in $CH_2Cl_2$ (5 mL) and added. The mixture turned dark yellow after 30 rains and was evaporated to dryness. Pentane (2 mL) was added and the mixture was placed in the freezer (−20° C.) giving a yellow precipitate which was filtered and dried in vacuo. Yield=0.14 g (71%). $^1H$ NMR (400 MHz, $CDCl_3$): δ8.49 (2H, br s. ArH), 7.41-7.33 (3H, m, ArH), 5.49 (1H, s, CH(acac), 2.09 (3H, s, $CH_3$ (acac)), 2.07-1.59 (6H, m, $CH_2$), 1.77 (3H, s, $CH_3$ (acac)), 1.64 (6H, d, $^3J_{HP}$=16.4 Hz, $C(CH_3)_2$) and 1.02 ppm (6H, d, $^3J_{HP}$=13.7 Hz, $C(CH_3)_2$). $^{13}C\{^1H\}$ NMR (101 MHz, $CDCl_3$): δ190.9 (dd, $^1J_{RhC}$=75.7 Hz, $^2J_{CP}$=22.6 Hz, Rh—C═O), 188.0 (s, acac C═O), 184.8 (s, acac C═O), 137.0 (br s., ArC), 134.2 (d, $^1J_{CP}$=34.5 Hz, $ArC_q$), 129.9 (d, $^3J_{CP}$=2.3 Hz, ArC), 127.3 (d, $^2J_{CP}$=9.6 Hz, ArC), 101.0 (d, $^3J_{RhC}$=2.4 Hz, acac CH), 39.6 (d, $^2J_{CP}$=2.7 Hz, $CH_2$), 34.0 (dd, $^1J_{CP}$=20.7 Hz, $^2J_{CRh}$=0.6 Hz, $C(CH_3)_2$), 29.9 (d, $^2J_{CP}$=11.4 Hz, $C(CH_3)_2$), 29.4 (s, $C(CH_3)_2$), 27.8 (dd, $^3J_{CRh}$=5.1 Hz, $^4J_{CP}$=1.0 Hz, acac $CH_3$), 26.8 (s, acac $CH_3$) and 19.4 ppm (d, $^3J_{CP}$=4.1 Hz, $CH_2CH_2CH_2$). $^{31}P\{^1H\}$ NMR (162 MHz, $CDCl_3$): δ71.1 ppm (d, $^1J_{RhP}$=180.0 Hz). IR ($CH_2Cl_2$): ṽ 1964 (s) C═O str.

Example 26: Synthesis of [(acac)Rh(CO)(Phenyl phosphorinone)]

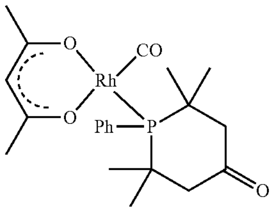

Phenyl phosphorinone (0.1 g, 0.40 mmol), was dissolved in $CH_2Cl_2$ (5 mL). [(acac)Rh(CO)$_2$] (0.11 g, 0.40 mmol) was dissolved in $CH_2Cl_2$ (5 mL) and added. The mixture turned dark yellow after 30 rains and was reduced in volume to ~5 mL. Pentane (12 mL) was added and the mixture was passed through a glass filter. The orange solution was evaporated to dryness giving a light brown powder. Yield=0.11 g (56%). $^1H$ NMR (400 MHz, $CDCl_3$): δ8.41-8.27 (2H, m, ArH), 7.49-7.40 (3H, m, ArH), 5.53 (1H, s, acac CH), 2.83 (2H, d, $^3J_{HP}$=3.7 Hz, $CH_2$), 2.80 (2H, br. s., $CH_2$), 2.10 (3H, s, acac $CH_3$), 1.83 (3H, s, acac $CH_3$), 1.70 (6H, d, $^3J_{HP}$=16.1 Hz, $C(CH_3)_2$), and 1.21 ppm (6H, d, $^3J_{HP}$=12.4 Hz, $C(CH_3)_2$). $^{13}C\{^1H\}$ NMR (101 MHz, $CDCl_3$): δ208.8 (d, $^3J_{CP}$=4.2 Hz, C═O), 189.6 (dd, $^1J_{RhC}$=75.3 Hz, $^2J_{CP}$=23.3 Hz, Rh—C═O), 188.3 (s, acac C═O), 184.7 (s, acac C═O), 135.9 (d, $^2J_{CP}$=11.0 Hz, ArCH), 132.8 (d, $^1J_{CP}$=38.0 Hz, ArC$_q$), 130.7 (d, $^4J_{CP}$=2.3 Hz, ArCH) 128.0 (d, $^3J_{CP}$=9.7 Hz, ArCH), 101.2 (d, $^3J_{RhC}$=2.4 Hz, acac CH), 54.8 (d, $^2J_{CP}$=1.3 Hz, $CH_2$), 37.9 (dd, $^1J_{CP}$=19.7 Hz, $^2J_{CRh}$=0.8 Hz, $C(CH_3)_2$), 31.4 (d, $^2J_{CP}$=10.1 Hz, $C(CH_3)_2$), 28.5 (s, $C(CH_3)_2$), 27.8 (dd, $^3J_{RhC}$=5.3 Hz, $^4J_{CP}$=0.9 Hz, acac $CH_3$) and 26.0 ppm (s, acac $CH_3$). $^{31}P\{^1H\}$ NMR (162 MHz, $CDCl_3$): δ69.0 ppm (d, $^1J_{RhP}$=182.9 Hz). IR ($CH_2Cl_2$): ṽ 1964 (s) C≡O str.

Example 27: Synthesis of 4,4-(ethylenedioxy)-2,2,6,6-tetramethylphosphaninic Acid

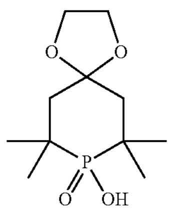

2,2,6,6-Tetramethylphosphorinic acid (1.0 g, 5.0 mmol) and ethylene glycol (8.0 mL) were dissolved in toluene (50 mL) and a catalytic amount of p-toluene sulfonic acid (93 mg, 0.5 mmol) was added. The mixture was then heated to 150° C. using a dean & stark apparatus to remove $H_2O$. After 16 hours the mixture was cooled, then washed with DI $H_2O$ (2×50 mL) and brine (50 mL), dried over anhydrous magnesium sulfate and evaporated to yield a white solid. Yield=0.7 g (56%). $^1H$ NMR (400 MHz, $CDCl_3$): δ3.91 (4H, s, $OCH_2$), 1.87 (4H, d, $^3J_{HP}$=15.3 Hz, $CH_2$) and 1.29 ppm (12H, d, $^3J_{HP}$=13.8 Hz, $CH_3$). $^{13}C\{^1H\}$ NMR (101 MHz, $CDCl_3$): δ108.4 (d, $^3J_{CP}$=7.9 Hz, $C_q$), 64.0 (s, $CH_2O$), 46.4 (s, $CH_2$), 33.2 (d, $^1J_{CP}$=84.7 Hz, $C_q$) and 24.4 ppm (d, $^2J_{CP}$=1.1 Hz, $CH_3$). $^{31}P\{^1H\}$ NMR (162 MHz, $CDCl_3$): δ61.5 ppm. HR-MS (+ve ESI): m/z (calc.) $[M+H]^+$ 249.1256; found 249.1251. Elem. Anal. Calcd for $C_9H_{17}O_3P$: C, 53.22; H, 8.53. Found: C, 53.29; H, 16.78.

Example 28: Synthesis of 9-hydroxy-3,3,8,8,10,10-hexamethyl-1,5-dioxa-9-phosphaspiro[5.5]undecane 9-oxide

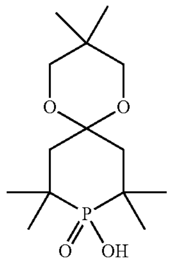

2,2,6,6-Tetramethylphosphorinic acid (0.20 g, 0.98 mmol) and neopentyl glycol (0.61 g, 5.88 mmol) were dissolved in toluene (80 mL) and a catalytic amount of p-toluenesulfonic acid (18.6 mg, 0.098 mmol) was added. The mixture was heated to 140° C. using a dean & stark apparatus to remove $H_2O$. After 72 hours the mixture was cooled and an additional equivalent of neopentyl glycol was added (0.10 g, 0.98 mmol). The mixture was then heated again for a further 16 hours. After cooling the mixture was washed with DI $H_2O$ (2×40 mL) and brine (40 mL). The organic phase was then dried over $MgSO_4$ and then evaporated to give a white solid. Yield=0.15 g (52.8%). $^1H$ NMR (400 MHz, $CDCl_3$): δ9.24 (1H, br s, OH), 3.45 (4H, s, $CH_2O$), 2.00 (4H, d, $^3J_{HP}$=15.5 Hz, $CCH_2$), 1.27 (12H, d, $^3J_{HP}$=13.7 Hz, $CH_3$) and 0.94 ppm (6H, s, $CH_3$). $^{31}P\{^1H\}$ NMR (162 MHz, $CDCl_3$): δ62.4 ppm. HR-MS (+ve ESI): m/z (calc.) $[M+H]^+$291.1725; found 291.1721.

Example 29: Synthesis of 8-chloro-7,7,9,9-tetramethyl-1,4-dioxa-8-phosphaspiro[4.5]decane 8-oxide

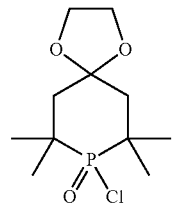

4,4-(Ethylenedioxy)-2,2,6,6-tetramethylphosphaninic acid (4.8 g, 19.2 mmol) was dissolved in $CH_2Cl_2$ (100 mL), then lutidine (5.2 g, 5.6 mL, 48.1 mmol) and DMF (0.14 g, 0.15 mL, 0.19 mmol) were added. The mixture was cooled to 0° C., whereupon oxalyl chloride (12.2 g, 8.1 mL, 96.2 mmol) was added. A gas was evolved and there was a colour change from yellow to orange. After 72 hours the volatiles were removed in vacuo and the crude material was extracted with pentane (3×20 mL) filtered and evaporated to give an off white solid. Yield=3.5 g (72%). $^1H$ NMR (400 MHz, $CDCl_3$): δ4.02-3.86 (4H, m, $OCH_2$), 2.10-1.82 (4H, m, $CH_2$), 1.52 (6H, d, $^3J_{PH}$=15.7 Hz, $CH_3$) and 1.38 ppm (6H, d, $^3J_{PH}$=16.5 Hz, $CH_3$). $^{13}C\{^1H\}$ NMR (101 MHz, $CDCl_3$): δ107.5 (d, $^3J_{CP}$=7.5 Hz, $O_2C_q$), 64.8 (s, $OCH_2$), 63.8 (s, $OCH_2$), 46.4 (d, $^2J_{CP}$=1.2 Hz, $CH_2$), 39.1 (d, $^1J_{CP}$=62.2 Hz, $C_q$), 26.7 (d, $^2J_{CP}$=3.4 Hz, $CH_3$) and 24.1 ppm (s, $CH_3$). $^{31}P\{^1H\}$ NMR (162 MHz, $CDCl_3$): δ85.9 ppm. HR-MS (+ve ESI): m/z (calc.) $[M+H]^+$267.0917; found 267.0906.

Example 30: Synthesis of 7,7,9,9-tetramethyl-1,4-dioxa-8-phosphaspiro[4.5]decane (TMPA)

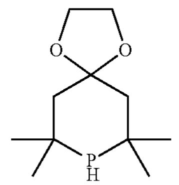

8-Chloro-7,7,9,9-tetramethyl-1,4-dioxa-8-phosphaspiro[4.5]decane 8-oxide (3.5 g, 13.9 mmol) in $Et_2O$ (20 mL) was added dropwise over 15 minutes to a suspension of $LiAlH_4$ (1.3 g, 33.4 mmol) in $Et_2O$ (100 mL) which had been cooled to 0° C. The mixture was allowed to warm to RT and stirred for 72 hours. After this time the mixture was cooled in ice and the excess $LiAlH_4$ was quenched with NaOH (aq, 20%, 2.5 mL), followed by DI $H_2O$ (2.5 mL). It was warmed to RT and drying agent ($MgSO_4$) was added and the mixture filtered. The volatiles were removed in vacuo to give a white solid. Yield=1.8 g (56%). $^1H$ NMR (400 MHz, $CDCl_3$): δ4.00-3.85 (4H, m, $OCH_2$), 2.68 (1H, d of sept, $^1J_{HP}$=198.8

Hz, $^3J_{HH}$=1.6 Hz, PH), 1.85 (2H, dd, $^1J_{HH}$=13.6 Hz, $^3J_{HP}$=4.4 Hz, CH), 1.49 (2H, d, $^1J_{HH}$=13.6 Hz, CH), 1.26 (6H, d, $^3J_{HP}$=14.4 Hz, $CH_3$) and 1.09 ppm (6H, d, $^3J_{HP}$=14.1 Hz, $CH_3$). $^{31}P\{^1H\}$ NMR (162 MHz, $CDCl_3$): δ−16.2 ppm. HR-MS (+ve ESI): m/z (calc.) $[M+H]^+$217.1357; found 217.1348. Elem. Anal. Calcd for $C_{11}H_{21}O_2P$: C, 61.09; H, 9.79. Found: C, 61.34; H, 9.68.

Example 31: Synthesis of 8-Chloro-7,7,9,9-tetramethyl-1,4-dioxa-8-phosphaspiro[4.5]decane, TMPA-Cl

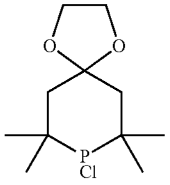

TMPA (0.20 g, 0.92 mmol) was dissolved in THF (2 mL). $C_2Cl_6$ (0.22 g, 0.92 mmol) in THF (2 mL) was added. The mixture was stirred for 3 weeks and then the volatiles were removed in vacuo. Yield=0.12 g (52%). $^1H$ NMR (400 MHz, $CDCl_3$): δ3.98 (2H, dt, $^3J_{HH}$=6.5 Hz, J=0.7 Hz, $CH_2O$), 3.88 (2H, dt, $^3J_{HH}$=6.8 Hz, J=0.7 Hz, $CH_2O$), 1.95 (2H, d, $^2J_{HH}$=14.2 Hz, $CH_2$), 1.52 (2H, dd, $^2J_{HH}$=14.1 Hz, $^3J_{HP}$=6.2 Hz, $CH_2$), 1.33 (6H, d, $^3J_{HP}$=18.5 Hz, $CH_3$) and 1.20 ppm (6H, d, $^3J_{HP}$=12.3 Hz, $CH_3$). $^{13}C\{^1H\}$ NMR (101 MHz, $CDCl_3$): δ110.2 (s, $O_2C_q$), 65.1 (s, $CH_2O$), 63.1 (s, $CH_2O$), 40.9 (d, $^2J_{CP}$=2.9 Hz, $C_qCH_2$), 35.1 (d, $^1J_{CP}$=33.4 Hz, $C(CH_3)_2$), 31.2 (d, $^2J_{CP}$=11.6 Hz, $CH_3$) and 25.4 ppm (d, $^2J_{CP}$=34.7 Hz, $CH_3$). $^{31}P\{^1H\}$ NMR (162 MHz, $CDCl_3$): δ120.7 ppm. HR-MS (+ve ESI): m/z (calc.) $[M+H]^+$ 251.0968; found 251.0960.

Example 32: Synthesis of 2,2,6,6-tetramethylphosphinan-4-one, TMPK

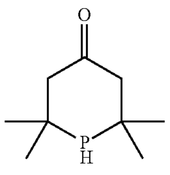

TMPA (0.97 g, 4.49 mmol) was dissolved in THF (5 mL) and degassed 3.0 M HCl (aq) was added. The mixture was stirred for 16 hours. After this time degassed DI $H_2O$ (30 mL) was added and then the product was extracted with $Et_2O$ (3×20 mL), dried over $MgSO_4$ and evaporated to give a colourless oil. Yield=0.55 g (69%). $^1H$ NMR (400 MHz, $CDCl_3$): δ3.19 (1H, d, $^1J_{PH}$=198.1 Hz, PH), 2.49 (2H, d, $^2J_{HH}$=11.8 Hz, $CH_2$), 2.37 (2H, dd, $^2J_{HH}$=12.5 Hz, $^2J_{HP}$=3.3 Hz, $CH_2$) and 1.31-1.09 ppm (12H, m, $CH_3$). $^{13}C\{^1H\}$ NMR (101 MHz, $CDCl_3$): δ211.6 (s, C═O), 57.6 (d, $^2J_{CP}$=6.3 Hz, $CH_2$), 33.6 (d, $^1J_{CP}$=12.4 Hz, $C(CH_3)_2$), 32.1 (d, $^2J_{CP}$=12.9 Hz, $CH_3$) and 27.5 ppm (d, $^2J_{CP}$=24.3 Hz, $CH_3$). $^{31}P\{^1H\}$ NMR (162 MHz, $CDCl_3$): δ−11.9 ppm. HR-MS (+ve ESI): m/z (calc.) $[M+H]^+$173.1095; found 173.1096.

Example 33: Synthesis of 7,7,9,9-tetramethyl-1,4-dioxa-8-phosphaspiro[4.5]decane 8-oxide, TMPA═O

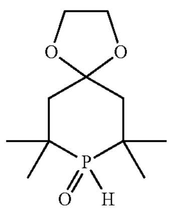

TMPA (0.20 g, 0.92 mmol) was dissolved in $CH_2Cl_2$ (5 mL) and cooled to 0° C. m-CPBA (70%, aq) (0.24 g, 0.97 mmol) in $CH_2Cl_2$ (3 mL) was added slowly. After 10 minutes the ice bath was removed and the mixture was allowed to warm to RT. The mixture was stirred for 2 hours and the volatiles were them removed in vacuo. The white solid was taken up $CH_2Cl_2$ (10 mL) and washed with saturated $NaHCO_3$ (2×10 mL), then the combined aqueous portion was then backwashed with $CH_2Cl_2$ (10 mL). The combined organic phases were washed with brine (10 mL) and dried over $MgSO_4$. Filtration and evaporation gave a white solid which was handled under argon. Yield=0.12 g (56%). $^1H$ NMR (400 MHz, $CDCl_3$): δ6.30 (1H, d, $^1J_{HP}$=432.4 Hz, PH), 3.98 (2H, t, $^3J_{HH}$=6.4 Hz, $CH_2O$), 3.84 (2H, t, $^3J_{HH}$=6.6 Hz, $CH_2O$), 1.89-1.71 (4H, m, $C_qCH_2$), 1.38 (6H, d, $^3J_{HP}$=12.4 Hz, $CH_3$) and 1.27 ppm (6H, d, $^3J_{HP}$=15.8 Hz, $CH_3$). $^{13}C\{^1H\}$ NMR (101 MHz, $CDCl_3$): δ107.6 (d, $^3J_{CP}$=6.5 Hz, $O_2C_q$), 65.0 (s, $CH_2O$), 63.5 (s, $CH_2O$), 45.7 (d, $^2J_{CP}$=2.4 Hz, $CH_2$), 32.8 (d, $^1J_{CP}$=59.4 Hz, $C(CH_3)_2$), 28.2 (d, $^2J_{CP}$=1.0 Hz, $CH_3$) and 20.8 ppm (s, $CH_3$). $^{31}P\{^1H\}$ NMR (162 MHz, $CDCl_3$): δ57.1 ppm. HR-MS (+ve ESI): m/z (calc.) $[M+H]^+$233.1307; found 233.1299. Elem. Anal. Calcd for $C_{11}H_{21}O_3P$: C, 56.89; H, 9.11. Found: C, 57.52; H, 8.94.

Example 34: Synthesis of 7,7,9,9-tetramethyl-1,4-dioxa-8-phosphaspiro[4.5]decane Borane Complex

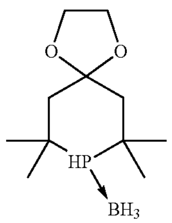

TMPA (0.88 g, 3.82 mmol) was dissolved in THF (10 mL) and borane dimethyl sulfide complex (2.0M in THF, 2.01 mL, 4.0 mmol) was added. The mixture was stirred for 16 hours before being evaporated to give a white solid which was washed with pentane (2×10 mL) and dried in vacuo. Yield=0.55 g (63%). $^1H$ NMR (400 MHz, $CDCl_3$): δ4.03 (1H, d of q, $^1J_{HP}$=346.7 Hz, $^3J_{HH}$=6.3 Hz, PH), 4.03-3.85 (4H, m, $OCH_2$), 1.91 (2H, dd, $^3J_{HP}$=17.2 Hz, $^2J_{HH}$=14.0 Hz, CH), 1.69 (2H, dd, $^2J_{HH}$=13.8 Hz, $^3J_{HP}$=2.2 Hz, CH), 1.33 (6H, d, $^3J_{HP}$=14.3 Hz, $CH_3$), 1.23 (6H, d, $^3J_{HP}$=15.4 Hz, $CH_3$) and 0.46 ppm (3H, q, $^1J_{BH}$=99.2 Hz, BH3). $^{13}C\{^1H\}$ NMR (101 MHz, $CDCl_3$): δ108.4 (d, $^3J_{CP}$=5.0 Hz, $OC_q$), 65.3 (s, $OCH_2$), 63.4 (s, $OCH_2$), 48.1 (d, $^2J_{CP}$=5.2 Hz, $CH_2$), 30.8 (d, $^2J_{CP}$=1.2 Hz, $CH_3$), 29.0 (d, $^1J_{CP}$=28.9 Hz, $C_q$) and 22.7 ppm (d, $^2J_{CP}$=7.5 Hz, $CH_3$). $^{31}P\{^1H\}$ NMR (162 MHz, $CDCl_3$): δ31.3 ppm (q, $^1J_{PB}$=56.9 Hz). HR-MS (+ve ESI): m/z (calc.) [M+Na]+253.1505; found 253.1500. Elem. Anal. Calcd for $C_{11}H_{24}BO_2P$: C, 57.42; H, 10.51. Found: C, 57.19; H, 10.40.

Example 35: Synthesis of 1,3-bis(7,7,9,9-tetramethyl-1,4-dioxa-8-phosphaspiro[4.5]decan-8-yl)propane

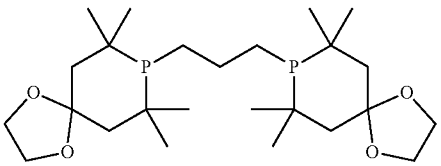 [SMILES: CC1(C)CC2(CC(C)(C)P1CCCP1C(C)(C)CC3(CC1(C)C)OCCO3)OCCO2]

n-BuLi (2.0M in hexanes, 0.79 mL, 1.57 mmol) was added dropwise to TMPA (0.34 g, 1.57 mmol) in THF (5 mL) at −78° C., the colour turned instantly yellow. It was allowed to warm to RT whereupon it became milky white in appearance. After stirring for 1 hour it was cooled to −78° C. and 1,3-dibromopropane (0.13 g, 0.63 mmol) in THF (0.5 mL) was added dropwise. It was warmed to RT giving a clear yellow solution. After 16 hours the volatiles were removed in vacuo. MeOH was added (4 mL) and the solution was placed in the freezer for 72 hours (−20° C.). The solid formed was filtered and dried. Yield=0.09 g (31%). $^1H$ NMR (400 MHz, $CDCl_3$): δ3.91 (8H, s, $OCH_2$), 1.77-1.67 (2H, m, —$CH_2$—), 1.63 (8H, d, $^3J_{HP}$=8.0 Hz, $CH_2$), 1.53-1.48 (4H, m, $CH_2$), 1.20 (12H, d, $^3J_{HP}$=16.8 Hz, $CH_3$) and 1.12 ppm (12H, d, $^3J_{HP}$=7.7 Hz, $CH_3$). $^{13}C\{^1H\}$ NMR (101 MHz, $CDCl_3$): δ110.4 (s, $O_2C_q$), 64.0 (d, $^5J_{CP}$=15.3 Hz, $OCH_2$), 45.9 (s, $CH_2$), 31.5 (d, $^2J_{CP}$=26.4 Hz, $CH_3$), 30.4 (d, $^1J_{CP}$=14.9 Hz, $C(CH_3)_2$), 29.0 (t, $^2J_{CP}$=24.0 Hz, —$CH_2$—), 27.6 (s, $CH_3$) and 22.3 ppm (dd, $^1J_{CP}$=22.1 Hz, $^3J_{CP}$=13.1 Hz, $PCH_2$). $^{31}P\{^1H\}$ NMR (162 MHz, $CDCl_3$): δ4.0 ppm.

Example 36: Synthesis of 1,2-bis((7,7,9,9-tetramethyl-1,4-dioxa-8-phosphaspirol[4.5]decan-8-yl)methyl)benzene

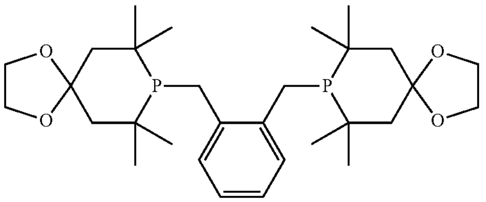 [SMILES: CC1(C)CC2(CC(C)(C)P1Cc1ccccc1CP1C(C)(C)CC3(CC1(C)C)OCCO3)OCCO2]

n-BuLi (2.0M in hexanes, 1.1 mL, 2.2 mmol) was added dropwise to 7,7,9,9-tetramethyl-1,4-dioxa-8-phosphaspiro[4.5]decane borane complex (0.46 g, 1.99 mmol) in THF (8 mL) at −78° C. The mixture was allowed to warm to room temperature and stirred for 1 hour before it was cooled to −78° C. α,α-Dichloro-o-xylene (0.16 g, 0.89 mmol) in THF (5 mL) was added dropwise. The mixture was allowed to warm to RT and stirred for 16 hours. The volatiles were removed in vacuo to give a white solid. Pyrrolidine (5 mL) was added and the mixture heated to 50° C. for 16 hours. After this time the pyrrolidine was removed in vacuo and the mixture washed with MeOH (3×5 mL) filtered and dried to give a white solid. Yield=0.43 g (91%). $^1H$ NMR (400 MHz, $CDCl_3$): δ7.49-7.40 (2H, m, ArH), 7.10-7.03 (2H, m, ArH), 3.99-3.84 (8H, m, $CH_2O$), 3.10 (4H, s, $CH_2$), 1.74-1.65 (8H, m, $CH_2$), 1.27 (12H, d, $^3J_{HP}$=5.3 Hz, $CH_3$) and 1.21 ppm (12H, d, $^3J_{HP}$=17.4 Hz, $CH_3$). $^{13}C\{^1H\}$ NMR (101 MHz, $CDCl_3$): δ137.9 (dd, $^2J_{CP}$=8.0 Hz, $^3J_{CP}$=3.0 Hz, $ArC_q$), 131.1 (d, $^3J_{CP}$=11.4 Hz, ArC), 125.7 (d, $^4J_{CP}$=1.6 Hz, ArC), 110.0 (s, $O_2C_q$), 64.5 (s, $CH_2O$), 63.6 (s, $CH_2O$), 47.6 (d, $^2J_{CP}$=6.9 Hz, $CH_2$), 32.3 (d, $^2J_{CP}$=25.7 Hz, $CH_3$), 31.2 (d, $^2J_{CP}$=17.4 Hz, $CH_3$), 25.8 (s, $C_q$) and 25.6 ppm (dd, $^1J_{CP}$=26.3 Hz, $^4J_{CP}$=7.3 Hz, $PCH_2$). $^{31}P\{^1H\}$ NMR (162 MHz, $CDCl_3$): δ6.0 ppm. HR-MS (+ve ESI): m/z (calc.) $[M+H]^+$585.3581; found 585.3580. Elem. Anal. Calcd for $C_{30}H_{48}O_4P_2$: C, 67.39; H, 9.05. Found: C, 65.20; H, 8.82.

Example 37: Synthesis of bis(2,2,6,6,-tetramethylphoshorinone)xylene, BPX

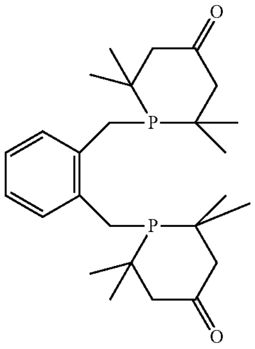 [SMILES: CC1(C)CC(=O)CC(C)(C)P1Cc1ccccc1CP1C(C)(C)CC(=O)CC1(C)C]

1,2-Bis((7,7,9,9-tetramethyl-1,4-dioxa-8-phosphaspiro[4.5]decan-8-yl)methyl)benzene (0.77 g, 1.44 mmol) was stirred in acetic acid (15 mL) at 120° C. for 3 hours. After this time the volatiles were removed in vacuo and the crude material recrystallized from MeOH to give a white solid. Yield=0.37 g (58%). $^1H$ NMR (400 MHz, $CDCl_3$): δ7.45 (2H, ddd, $^3J_{HH}$=5.9 Hz, $^3J_{HH}$=3.8 Hz, $^4J_{HP}$=2.4 Hz, ArH), 7.16-7.11 (2H, m, ArH), 3.24 (4H, s, CHIP), 2.54 (4H, dd, $^2J_{HH}$=12.4 Hz, $^3J_{HP}$=4.4 Hz, $CH_2$), 2.35 (4H, dd, $^2J_{HH}$=12.5 Hz, $^3J_{HP}$=16.8 Hz, $CH_2$), 1.20 (12H, d, $^3J_{HP}$=5.4 Hz, $CH_3$) and 1.07 ppm (12H, d, $^3J_{HP}$=17.0 Hz, $CH_3$). $^{13}C\{^1H\}$ NMR (101 MHz, $CDCl_3$): δ210.0 (d, $^3J_{CP}$=1.3 Hz, C═O), 136.9 (dd, $^2J_{CP}$=7.7 Hz, $^3J_{CP}$=2.8 Hz, $ArC_q$), 131.3 (d, $^3J_{CP}$=11.2 Hz, ArC), 126.4 (d, $^4J_{CP}$=1.8 Hz, ArC), 55.5 (d, $^2J_{CP}$=6.4 Hz, $CH_2C$=O), 35.3 (d, $^1J_{CP}$=19.2 Hz, $C(CH_3)_2$), 31.7 (d, $^2J_{CP}$=25.2 Hz, $CH_3$), 26.4 (dd, $^1J_{CP}$=26.6 Hz, $^4J_{CP}$=8.7 Hz, CHzP) and 25.8 ppm (s, $CH_3$). $^{31}P\{^1H\}$ NMR (162 MHz, $CDCl_3$): δ5.5 ppm. HR-MS (+ve ESI): m/z (calc.) $[M+H]^+$ 447.2581; found 447.2575.

Example 38: Synthesis of 8-([1,1'-biphenyl]-2-yl)-7,7,9,9-tetramethyl-1,4-dioxa-8-phosphaspiro[4.5]decane

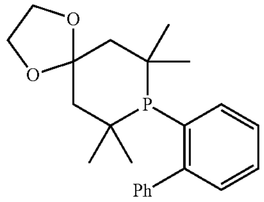 [SMILES: CC1(C)CC2(CC(C)(C)P1c1ccccc1-c1ccccc1)OCCO2]

7,7,9,9-Tetramethyl-1,4-dioxa-8-phosphaspiro[4.5]decane (0.34 g, 1.57 mmol), [1,1'-biphenyl]-2-yl trifluoromethanesulfonate (0.34 g, 1.12 mmol), palladium(II) acetate (1.26 mg, 0.006 mmol) and 1,8-diazabicyclo[5.4.0]undec-7-ene (0.34 g, 2.24 mmol) were dissolved in toluene (5 mL) and heated to 85° C. for 16 hours. After this time a $^{31}P$ NMR spectrum was recorded and it revealed approximately 60% conversion to the desired product. Additional palladium(II) acetate was added (1.26 mg, 0.006 mmol) and the mixture heated at 110° C. for a further 16 hours. After this time the clear dark orange solution was further diluted with toluene (3 mL) and washed with degassed water (3×5 mL). It was then dried over $MgSO_4$, filtered and evaporated to dryness. The crude material was washed with methanol (3 mL) to give a pale brown precipitate. Yield=0.20 g (35%) $^1H$ NMR (400 MHz, $CDCl_3$): δ7.77 (1H, d, $^3J_{HP}$=7.6 Hz, ArH), 7.39-7.20 (8H, m, ArH), 4.03-3.90 (4H, m, $CH_2O$), 2.08 (2H, dd, $^2J_{HH}$=14.3 Hz, $^2J_{HP}$=2.3 Hz, CH), 1.65 (2H, dd, $^2J_{HH}$=14.4 Hz, $^2J_{HP}$=5.6 Hz, CH), 1.25 (6H, d, $^3J_{HP}$=19.3 Hz, $CH_3$) and 0.84 ppm (6H, d, $^3J_{HP}$=10.1 Hz, $CH_3$). $^{13}C\{^1H\}$ NMR (101 MHz, $CDCl_3$): δ151.9 (d, $^2J_{CP}$=34.3 Hz, $ArC_qPh$), 143.8 (d, $^3J_{CP}$=8.1 Hz, $ArC_qP$), 135.6 (d, $^1J_{CP}$=31.1 Hz, $ArC_q$), 134.1 (d, $^3J_{CP}$=4.1 Hz, ArCH), 131.0 (d, $^2J_{CP}$=5.9 Hz, ArC), 130.8 (d, $^3J_{CP}$=4.6 Hz, ArCH), 128.6 (s, ArCH), 127.4 (s, ArCH), 126.6 (s, ArCH), 111.2 (s, $O_2C_q$), 64.9 (s, $CH_2O$), 63.3 (s, $CH_2O$), 44.5 (d, $^2J_{CP}$=1.7 Hz, $C_qCH_2$), 32.0 (d, $^2J_{CP}$=36.3 Hz, $CH_3$), 31.5 (d, $^1J_{CP}$=19.3 Hz, $C(CH_3)_2$) and 31.2 ppm (d, $^2J_{CP}$=7.4 Hz, $CH_3$). $^{31}P\{^1H\}$ NMR (162 MHz, $CDCl_3$): δ−8.4 ppm. HR-MS (+ve ESI): m/z (calc.) $[M+H]^+$369.1983; found 369.1974.

Example 39: Synthesis of 1-([1,1'-biphenyl]-2-yl)-2,2,6,6-tetramethylphosphinan-4-one

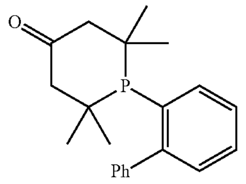 [SMILES: CC1(C)CC(=O)CC(C)(C)P1c1ccccc1-c1ccccc1]

8-([1,1'-Biphenyl]-2-yl)-7,7,9,9-tetramethyl-1,4-dioxa-8-phosphaspiro[4.5]decane (50 mg, 0.15 mmol) was dissolved in acetic acid (2.0 mL) and heated to 120° C. for 16 hours. After this time the volatiles were removed in vacuo to give a white solid. $^1H$ NMR (400 MHz, $CDCl_3$): δ7.82 (1H, d, $^3J_{HH}$=7.2 Hz, ArH), 7.43-7.22 (6H, m, ArH), 7.22-7.09 (2H, m, ArH), 2.86 (2H, dd, $^2J_{HH}$=12.9 Hz, $^3J_{HP}$=2.4 Hz, $CH_2$), 2.21 (2H, dd, $^2J_{HH}$=13.0 Hz, $^3J_{HP}$=4.8 Hz, $CH_2$), 1.09 (6H, d, $^3J_{HP}$=18.6 Hz, $CH_3$) and 0.88 ppm (6H, $^3J_{HP}$=10.0 Hz, $CH_3$). $^{13}C\{^1H\}$ NMR (101 MHz, $CDCl_3$): δ212.0 (s, C═O), 152.3 (d, $^2J_{CP}$=34.8 Hz, $ArC_qPh$), 143.3 (d, $^3J_{CP}$=8.0 Hz, $ArC_q$), 134.5 (d, $^1J_{CP}$=30.3 Hz, $ArC_q$), 133.5 (d, $^3J_{CP}$=4.0 Hz, ArCH), 131.3 (d, $^4J_{CP}$=6.0 Hz, ArCH), 130.8 (d, $^4J_{CP}$=4.4 Hz, ArCH), 129.2 (s, ArCH), 127.5 (s, ArCH), 127.0 (s, ArCH), 126.8 (s, ArCH), 53.5 (s, $CH_2$), 35.9 (d, $^1J_{CP}$=21.8 Hz, $C(CH_3)_2$), 32.0 (d, $^2J_{CP}$=34.6 Hz, $CH_3$) and 30.0 ppm (d, $^2J_{CP}$=7.6 Hz, $CH_3$). $^{31}P\{^1H\}$ NMR (162 MHz, $CDCl_3$): δ−3.5 ppm. HR-MS (+ve ESI): m/z (calc.) $[M+H]^+$ 325.1721; found 325.1715.

Example 40: Synthesis of bis(2-(2,2,6,6-tetramethylphosphinan-1-yl)ethyl)amine

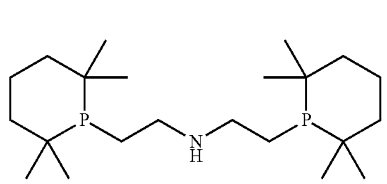 [SMILES: CC1(C)CCCC(C)(C)P1CCNCCP1C(C)(C)CCCC1(C)C]

TMP (2.80 g, 17.7 mmol) was dissolved in THF (40 mL). The mixture was cooled to −50° C. and n-BuLi (2.0M in cyclohexane, 9.73 mL, 19.5 mmol) was added dropwise. The clear yellow solution was allowed to warm to RT and stirred for 5 hours. After this time the mixture was again cooled to −50° C. and $(CH_3)_3SiN(CH_2CH_2Cl)_2$ (1.33 g, 6.2 mmol) in THF (5 mL) was added dropwise. After stirring for 15 minutes the mixture was allowed to warm to RT and then heated to 50° C. for 24 hours. The volatiles were then removed in vacuo and then heptane (40 mL) and DI $H_2O$ (40 mL) was added. The vigorously stirred biphasic mixture was heated at 60° C. for 72 hours. After this time the heptane layer was separated and then the aqueous portion was extracted with $Et_2O$ (2×30 mL). The combined organics were then dried ($MgSO_4$) and evaporated to yield an oil. The oil was subjected to vacuum distillation to give the product as a pale yellow viscous oil. Yield=1.25 g (52%). $^1H$ NMR (400 MHz, $CDCl_3$): δ2.91-2.65 (4H, m, $NCH_2$), 1.61 (4H, td, $^3J_{HH}$=8.2 Hz, $^2J_{HP}$=3.9 Hz, $PCH_2$), 1.56-1.35 (12H, m, $CH_2CH_2CH_2$), 1.10 (12H, d, $^3J_{HP}$=17.2 Hz, $CH_3$) and 1.04 ppm (12H, d, $^3J_{HP}$=7.2 Hz, $CH_3$). $^{13}C\{^1H\}$ NMR (101 MHz, $CDCl_3$): δ49.7 (d, $^2J_{CP}$=28.5 Hz, $NCH_2$), 39.8 (br. s, $CH_2C_q$), 31.1 (d, $^1J_{CP}$=26.9 Hz, $C(CH_3)_2$), 29.0 (d, $^2J_{CP}$=13.8 Hz, $CH_3$), 26.5 (br. s. $CH_3$), 21.5 (d, $^1J_{CP}$=21.8 Hz, $PCH_2$) and 20.4 ppm (d, $^3J_{Cp}$=1.1 Hz, $CH_2CH_2CH_2$). $^{31}P\{^1H\}$ NMR (162 MHz, $CDCl_3$): δ3.7 ppm. HR-MS (+ve ESI): m/z (calc.) $[M+H]^+$386.3106; found 386.3094.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Throughout this specification and the claims which follow, unless the context requires otherwise, the phrase "consisting essentially of", and variations such as "consists essentially of" will be understood to indicate that the recited element(s) is/are essential i.e. necessary elements of the invention. The phrase allows for the presence of other non-recited elements which do not materially affect the characteristics of the invention but excludes additional unspecified elements which would affect the basic and novel characteristics of the method defined.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of synthesising a phosphorus compound of Formula (I), a salt, solvate or isomer thereof:

(I)

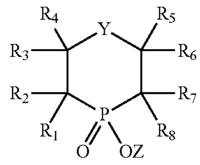

wherein Y is selected from an optionally substituted $C_{1-10}$ alkylene, optionally substituted $C_{1-10}$ alkenylene, optionally substituted silylene, optionally substituted aminoylene, acylene, thioacylene, sulfinylene, sulfonylene, —P(O)(OZ)— or —$P^{+}(R_9R_{10})$—;

Z is selected from H, optionally substituted alkyl or a metal cation;

$R_1$, $R_2$, $R_7$ and $R_8$ are independently selected from oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_5$ can be linked to form an optionally substituted cycloalkyl;

$R_3$, $R_4$, $R_5$, and $R_6$ are independently selected from H, oxo, halo, optionally substituted alkyl;

optionally substituted alkenyl; optionally substituted haloalkyl; optionally substituted alkynyl;

optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

$R_9$ and $R_{10}$ are independently selected from H, optionally substituted alkyl, optionally substituted cycloalkyl, optionally substituted heterocycloyl, optionally substituted aryl, optionally substituted heteroaryl;

the method comprising:

a) reacting a compound of Formula (A) with a hypophosphite ester, acid, salt or solvate thereof and an optional organosilicon compound, the compound of Formula (A) is (A)

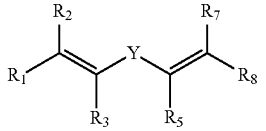

wherein Y is selected from an optionally substituted $C_{1-10}$ alkylene, optionally substituted $C_{1-10}$ alkenylene, optionally substituted silylene, optionally substituted amino, acylene, thioacylene, sulfinylene, sulfonylene, —P(O)(OZ)— or —$P^{+}(R_{13}R_{14})$—;

wherein $R_1$, $R_2$, $R_7$ and $R_8$ are independently selected from oxo, halo, optionally substituted alkyl;

optionally substituted alkenyl; optionally substituted haloalkyl; optionally substituted alkynyl;

optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl;

wherein $R_1$ and $R_8$ can be linked to form an optionally substituted cyclo moiety;

$R_3$ and $R_5$ are independently selected from H, oxo, halo, optionally substituted alkyl; optionally substituted alkenyl; optionally substituted haloalkyl; optionally substituted alkynyl; optionally substituted oxyalkyl; optionally substituted amino, optionally substituted thio, optionally substituted cycloalkyl, optionally substituted cycloalkenyl, optionally substituted heterocyclyl, optionally substituted heteroaryl, and optionally substituted aryl; and wherein $R^{13}$ and $R^{14}$ are independently selected from H, optionally substituted $C_1$-$C_{10}$ alkyl, optionally substituted $C_3$-$C_{10}$ cycloalkyl, optionally substituted $C_3$-$C_{10}$ heterocyclyl, optionally substituted aryl, or optionally substituted heteroaryl.

2. The method according to claim 1, wherein the hypophosphite ester, acid, salt or solvate thereof is selected from hypophosphorous acid ($H_3PO_2$), ammonium hypophosphite ($NH_4H_2PO_2$) and sodium hypophosphite ($NaPO_2H_2$), potassium hypophosphite, calcium bis (hypophosphite), copper hypophosphite, nickel (II) bis (hypophosphite), magnesium hypophosphite, anilinium hypophosphite, methyl hypophosphite, ethyl hypophosphite, or a combination thereof.

3. The method according to claim 1, wherein the organosilicon compound is selected from bis(trimethylsilyl)amine (HMDS), N,N-Bis (trimethylsilyl)methylamine, bis(dimethylamino)dimethylsilane, N,O-bis(trimethylsilyl)acetamide (BSA), N,O-bis(trimethylsilyl)trifluoroacetamide (BSTFA), N,N-dimethyltrimethylsilylamine, hexamethyldisiloxane, N,N-diethyltrimethylsilylamine 1-(trimethylsilyl) pyrrolidine trimethylsilyl chloride (TMSCl), trimethylsilyl bromide (TMSBr), chlorotriethylsilane, and a combination thereof.

4. The method according to claim 1, wherein a molar ratio of hypophosphite ester, acid, salt or solvate thereof to the organosilicon compound is about 1:10 to about 1:1.

5. The method according to claim 1, wherein the step of reacting a compound of Formula (A) with the hypophosphite ester, acid, salt or solvate thereof and the organosilicon compound further comprises a base.

6. The method according to claim 5, wherein the base is selected from triethylamine, diethylamine, Hünigs base, pyrrolidine, pyridine, lutidine, piperidine 1,8-diazabicyclo [5.4.0]undec-7-ene (DBU), 1,4-diazabicyclo[2.2.2]octane (DABCO), sodium hydroxide, potassium hydroxide, ammonium hydroxide, sodium carbonate, sodium hydrogen carbonate, barium hydroxide, calcium carbonate, caesium carbonate, or a combination thereof.

7. The method according to claim 1, wherein the step of reacting a compound of Formula (A) with the hypophosphite ester, acid, salt or solvate thereof and the organosilicon compound further comprises a solvent, wherein the solvent is selected from tetrahydrofuran (THF), toluene, xylenes, methylene chloride, dichloroethane, tetrachloroethane, ethers, dimethylacetamide (DMA), or a combination thereof.

8. The method according to claim 1, the method further comprises a step of treating a product of step (a) with an acid.

9. The method according to claim 1, wherein the compound of Formula (A) is reacted with the hypophosphite ester, acid, salt or solvate thereof and the organosilicon compound at a temperature of about 70° C. to about 150° C.

10. The method according to claim 1, the method further comprises a step (b) after (a) of modifying the compound of formula (I) at the Y moiety.

11. The method according to claim 1, the method further comprises a step (b) after (a) of modifying the compound of formula (I) with a protecting group compound.

12. The method according to claim 11, wherein the protecting group compound is selected from ethylene glycol, methanol, ethanol, propylene glycol, 2,2-dimethyl-1,3-propanediol (neopentylglycol), dimethyl hydrazine, 1,2-ethanedithiol and 1,3-propanedithiol.

13. The method according to claim 1, the method further comprises a step of reducing the compound of formula (I).

14. The method according to claim 1, the method further comprises a step reducing the phosphorus compound of Formula (I) in order to form a phosphorus compound of Formula (II):

(II)

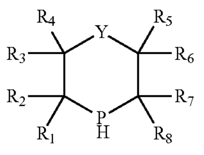

wherein $R_1$, $R_2$, $R_3$, $R_4$, $R_5$, $R_6$, $R_7$, $R_8$, $R_9$, $R_{10}$ and Y are as disclosed herein.

15. The method according to claim 1, the method further comprises of functionalising the compound of Formula (II) in order to form a phosphorus compound of Formula (III):

(III)

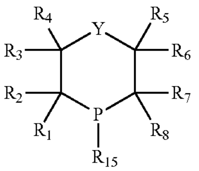

wherein $R_1$, $R_2$, $R_3$, $R_4$, $R_5$, $R_6$, $R_7$, $R_8$, $R_9$, $R_{10}$ and Y are as disclosed herein;

$R_{15}$ is selected from halo, oxo, optionally substituted amino, optionally substituted alkyl, optionally substituted alkenyl, optionally substituted cycloalkyl, optionally substituted cycloalkenyl, optionally substituted heterocyclyl, optionally substituted aryl, and optionally substituted heteroaryl.

16. The method according to claim 15, wherein the optional substituent at $R_{15}$ comprises another compound of Formula (III).

17. The method according to claim 15, wherein the optional substituent at $R_{15}$ is selected from:

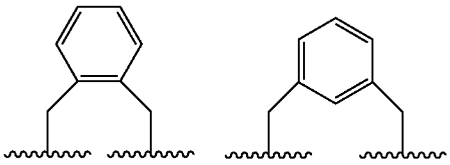

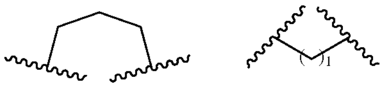

n = 1-20

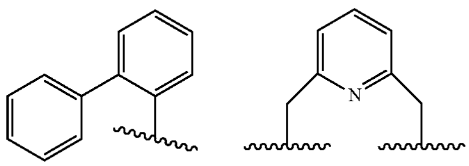

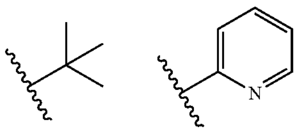

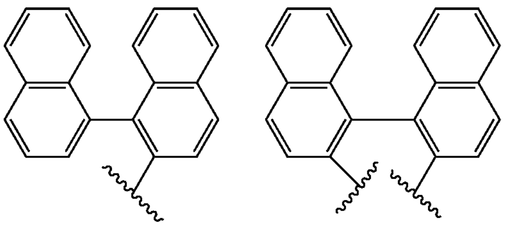

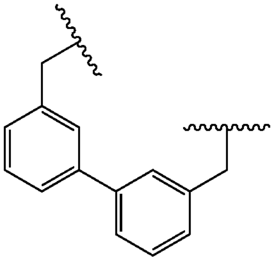

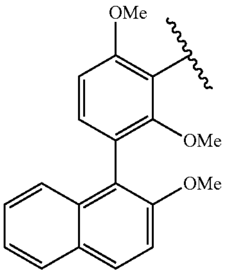

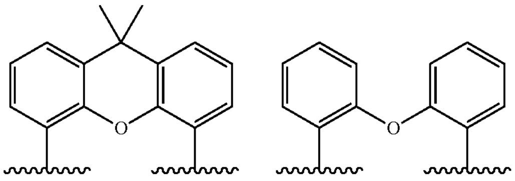

-continued
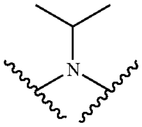
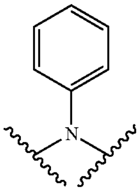
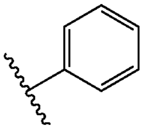
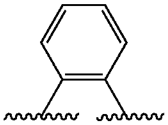
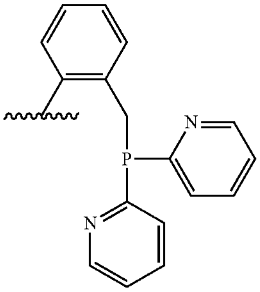
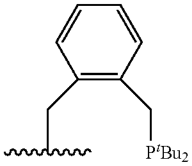
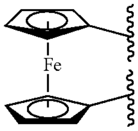
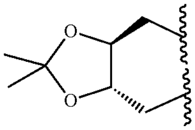
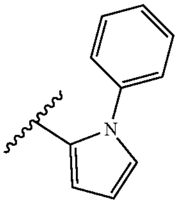
-continued
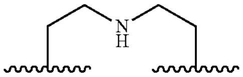
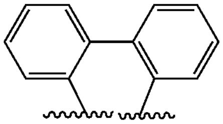
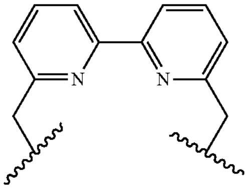
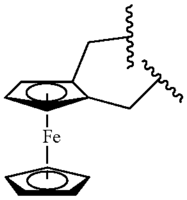
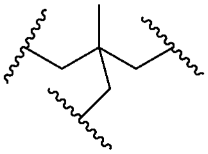
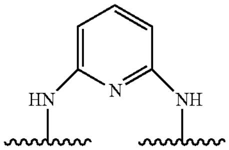
wherein represents a bond to $R_{15}$ of compound of Formula (III).
* * * * *